(12) United States Patent
Bignold

(10) Patent No.: US 11,587,003 B2
(45) Date of Patent: Feb. 21, 2023

(54) SYSTEM FOR CONSTRUCTION BASED PROPOSALS AND METHOD OF USE

(71) Applicant: Cost Certified Inc., Calgary (CA)

(72) Inventor: Michael James Bignold, Calgary (CA)

(73) Assignee: Cost Certified, Inc., Calgary (CA)

( * ) Notice: Subject to any disclaimer, the term of this patent is extended or adjusted under 35 U.S.C. 154(b) by 0 days.

(21) Appl. No.: 17/229,404

(22) Filed: Apr. 13, 2021

(65) Prior Publication Data

US 2021/0319382 A1    Oct. 14, 2021

Related U.S. Application Data

(60) Provisional application No. 63/009,060, filed on Apr. 13, 2020.

(51) Int. Cl.
*G06Q 10/06* (2012.01)
*G06Q 10/0631* (2023.01)

(52) U.S. Cl.
CPC .............................. *G06Q 10/06313* (2013.01)

(58) Field of Classification Search
None
See application file for complete search history.

(56) References Cited

U.S. PATENT DOCUMENTS

| | | |
|---|---|---|
| 6,446,053 B1 | 9/2002 | Elliott |
| 6,816,819 B1 | 11/2004 | Loveland |
| 8,515,820 B2 | 8/2013 | Lopez et al. |
| 2003/0225683 A1* | 12/2003 | Hill ........................ G06Q 10/06 705/37 |
| 2006/0058993 A1* | 3/2006 | Ulreich ................... G06Q 50/00 703/22 |
| 2012/0179570 A1* | 7/2012 | Blair .................. G06Q 30/0611 705/26.4 |
| 2012/0265692 A1 | 10/2012 | Gerber |
| 2014/0222608 A1 | 8/2014 | Cohen et al. |

OTHER PUBLICATIONS

Striker Immi (Does Usability Matter? An Analysis of the Impact of Usability on Technology Acceptance in ERP Settings, ACADEMIA, Accelerating the world's research, Interdisciplinary Journal of Information, Knowledge, and Management, vol. 11, 2016).*

* cited by examiner

*Primary Examiner* — Matthew D Henry
(74) *Attorney, Agent, or Firm* — Bold IP, PLLC; Houda El-Jarrah

(57) ABSTRACT

A method for creating highly accurate construction and renovation estimates and proposals for a client is described. The computer implemented method includes providing a platform to include all of the items and assemblies required in a construction project that make up the construction proposal, including all labor costs, material costs, and additional costs for taxes and mark ups. The method simplifies a highly complex and usually inaccurate process of having to calculate all of the costs associated with construction and renovation, in particular for residential properties, and allows clients to select desired items and receive a highly accurate, detailed estimate and proposal very quickly. The process further includes the ability to make any changes and upgrades quickly because of the unique system which includes linked dimensions, linked line items, and linked assemblies that allows a selection to affect multiple related elements, and further includes all hidden costs for better accuracy.

9 Claims, 32 Drawing Sheets

Estimating ← 330

- Item & assemblies ← 332
  Manage an existing database of 20,000+ construction items, import your own or add them one-by-one. Build re-usable assemblies to save time when quoting.

- Item import tool ← 334
  Upload or import your items list from excel with this tool.

- Custom dimensions ← 335
  Create, update and delete custom dimension types that you create to link quanitites to formulas using custom dimensions particular in your industry or company.

- Labor rates ← 336
  Once you've assigned a labor rate type to your items you can change their average costs here. This is for when you have workers and you know their aggregated average labor rates. If you're not sure, you can use our built-in rates.

- Estimating & presentation settings ← 338
  Set default markup, company-wide terms of Service, proposal settings, minimum margin threshold and any other costing/pricing settings relate to estimating.

- Tax rates management
  Manage your custom sales tax settings, add complex taxes by materials, labor, state ,/ prov etc.

Files ← 340

- Files ← 342
  Complete drag & drop file storage & management, in the cloud.

- Templates & presentations ← 344
  Create & manage proposal presentations, email templates and document templates for quotes, invoices, receipts & more.

Reporting

- Reports
  Visualize your proposals, clients and other data to track progress and measure success.

Team management ← 346

- Users ← 348
  Manage users, reset passwords, set roles & permissions.

- Groups ← 349
  Create groups for your users for different teams or lines of business. you can filter by groups in the pipeline, clients, proposals and reports.

- Roles ← 350
  Create, edit and manage user roles with sets of permissions assigned according to a user's position in your company

FIG. 3 (Cont..)

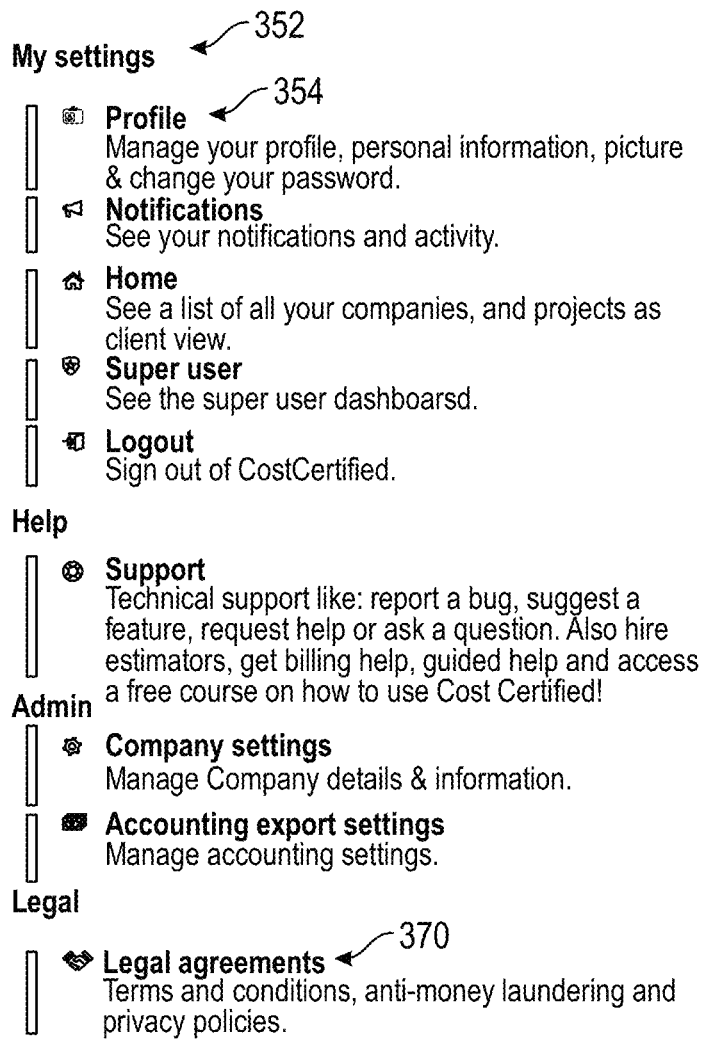
FIG. 3 (Cont..)

| | | |
|---|---|---|
| > | Living Room<br>In: Custom Home Build | 404.81 ft2 |
| > | Foyer<br>In: Custom Home Build | 157.70 ft2 |
| > | Den<br>In: Custom Home Build | 87.01 ft2 |
| > | Hallway<br>In: Custom Home Build | 87.01 ft2 |
| > | Stairway<br>In: Custom Home Build | 49' |
| > | Deck<br>In: Custom Home Build | 1.168 ft2 · 106' |
| > | Foundation<br>In: Custom Home Build · General Home Build | 3,000 ft2 |
| > | Roofing<br>In: Custom Home Build · Exterior | 6.102 ft2 · 442' |
| > | General Exterior<br>In: Custom Home Build · Exterior | 106' |
| > | Kitchen Cabinets/Countertop/Backsplash<br>In: Custom Home Build · Kitchen | 16' · 30 ft2 |
| > | Kitchen Island<br>In: Custom Home Build · Kitchen | 7' · 49 ft2 |
| > | Linen Closet Laundry<br>In: Custom Home Build · Laundry & Mud room | 3'5 1/16" · 8.55 ft2 |
| > | Ensuite Bathroom<br>In: Custom Home Build · Master Bedroom | 147.13 ft2 |
| > | Custom Vanity<br>In: Custom Home Build · 2 pc Bathroom | 7' 4" · 18,33 ft2 · 14.67 ft2 |
| > | Custom Vanity<br>In: Custom Home Build · 3 pc Bathroom | 7' 4" · 18,33 ft2 · 14.67 ft2 |
| > | Stone Exterior<br>In: Custom Home Build · Exterior · Siding | 312.5 ft2 |

| 204 | Required dimensions | All dimensions | | |
|---|---|---|---|---|
| 202 | > Custom Home Build — 702 | | 3,119 ft2 • 2,822 ft2 • 1,559.5 ft2 | |
| | ∨ Kitchen<br>In: Custom Home Build | | 545.41 ft2 | 706 |
| 226 | > Floor area | ⊗ Link to Custom Home Build (3,119 ft2) | 545.41  ft2 ▼ | 708 |
| 704 | ∨ Pantry<br>In: Custom Home Build — 230 | | 12"7 1/5" • 139.62 ft2 | 706 |
| | Interior Wall Perimeter | ⊗ Link to Custom Home Build (0) | 12"7 1/5"  ft ▼ | 708 |
| | Floor area ← 226 | ⊗ Link to Custom Home Build (3,119 ft2) | 139.62  ft2 ▼ | 708<br>706 |
| | ∨ Laundry & Mud room<br>In: Custom Home Build | | 362.12 ft2 | |
| | Floor area | ⊗ Link to Custom Home Build (3,119 ft2) | 362.12  ft2 ▼ | |
| | ∨ MasterBedroom<br>In: Custom Home Build | | 456.85 ft2 • 30' 13/20" | |
| | Floor area | ⊗ Link to Custom Home Build (3,119 ft2) | 456.85  ft2 ▼ | |
| | Interior Wall Perimeter | ⊗ Link to Custom Home Build (0) | 30,13/20"  ft ▼ | |
| | > Bedroom<br>In: Custom Home Build | | 215.50 ft2 • 9' 5/8" | |
| | > 2pc Bathroom<br>In: Custom Home Build | | 49.79 ft2 | |
| | > 3pc Bathroom<br>In: Custom Home Build | | 132 ft2 | |

FIG. 7

| | | | | |
|---|---|---|---|---|
| Windows items | | 218 | 814 | 816 |

Windows items

- 1'-0"x4'-1" WINDOW — 1 each — $433.50 / $528.27
- 2'-1"x4'-1" WINDOW — 3 each — $1,581.00 / $1,926.26
- 2'-7"x 4'-1" WINDOW — 1 each — $578.00 / $704.35
- 5'-0"x4'-1" WINDOW — 4 each — $3,094.00 / $3,770.37
- 5'-0"x5'-0" WINDOW — 3 each — $2,550.00 / $3,107.45
- 2'-7"x5'-0" WINDOW — 1 each — $654.50 / $797.58
- 2'-7"x3'-5" WINDOW — 1 each — $518.50 / $631.85
- 7'-5"x4'-1' WINDOW — 2 each — $1,989.00 / $2,423.81
- 5'-0"x 2'-7" WINDOW — 1 each — $654.50 / $797.58
- 6'-0"x 6'-0" WINDOW — 2 each — $2,040.00 / $2,485.96
- 11'-10"x 3'-1" WINDOW — 1 each — $1,275.00 / $1,553.72

FIG. 12

Edit item

| | |
|---|---|
| Item name | 1'-0" x 4'-1" WINDOW ◄─── 1202 |

Description
You can also add point-
form 'Attributes' (below)
Visible to client ◄─── 1002

Internal/production
notes
Not Visible to client

▤ Add xxxx xxxx    ⌗ Add pictures/files
☑ Add staged tasks

814 ─►
1104 ─► Quantity     [ 1 ]  each ▾

Construction stage
trade type Framing
labor type General Labour -      Windows ▾
Residential
labor rate 3494

☑ Includes labor?        ↓ Subcontracted ⓘ

☑ Includes materials?    ↓ Subcontracted ⓘ

1110 ─► ☑ Subcontractor
costs                              433.50 /each
total 433.50
hours 04h 62m 37s Subcontractor              [ Choose.. ▾ ]

1116 ─► Combined costs               433.50 /each
total 433.50

Markup
project-level markup
adjustment -0.41                   1.63 - 0.41
combined markup x1.22

Total price
What your client pays you.         528.27 /each
total 528.27

Sales tax on costs: from 48,049.07 to 59,830.75
Sales tax on profit: from 9,638.25 to 11,641.13
Sales tax on total: from 57,687.32 to 71,641.94
Actual total cost: from 960,981.38 to 1,196,614.94
-General Home Build
Price (Pre-tax, after discount): from 571,587.22 to 567,786.38
Price tax: from 28,579.36 to 28,389.32
Price (incl tax): from 600,166.58 to 596,175.70
Dimensions: Changed
Materials cost: from 432,873.13 to 429,754.13
Total cost: from 469,049.86 to 465,930.86
Total hours: from 4849h 32m 08s to 4814h 25m 02s
Subtotal:from 571,587.22 to 567,786.38
Actual materials cost: from 432,873.13 to 429,754.13
-Paint
Price (Pre-tax, after discount): from 19,004.17 to 15,203.33
Price (incl tax): from 19,954.38 to 15,963.50
Dimensions: Changed
Materials cost: from 15,595.00 to 12,476.00
Total cost: from 15,595.00 to 12,476.00
Total hours: from 175h 35m 30s to 140h 28m 24s
Subtotal:from 19,004.17 to 15,203.33
price (before any discount): from 19,004.17 to 15,203.33
Sales tax on costs: from 779.75 to 623.80
Sales tax on profit: from 170.46 to 136.37
Sales tax on total: from 950.21 to 760.17
-Calling Paint
Item Price : from 7,601.67 to 3,800.83
Quantity: from 3,119.00 to 1,559.50
Materials cost regular: from 6,238.00 to 3,119.00
Total combined item cost: from 6,238.00 to 3,119.00
Total item Materials cost: from 6,238.00 to 3,119.00
-Exterior
Price (Pre-tax, after discount): from 288,043.93 to 576,087.85
Price tax: from 14,402.20 to 28,804.39
Price (incl tax): from 302,446.13 to 604,892.24
Total cost: from 245,770.31 to 491,540.62

2006

<Pipeline / proposal

Proposal

Proposal never sent. Send quote now...

- Estimate
- Files
- Tasks
- Preview
- Send
- Budget
- Changes°
- Invoices
- Activities

| | | |
|---|---|---|
| | (+ Add) (+ Add optional) | |
| 2102 → | Totals | |
| 2104 → | Estimated labor hours ⓘ | 1049556h 51m 46s |
| 2106 → | Budgeted material/subcontractor costs ⓘ | 1,164,244.80 |
| 2108 → | Budgeted labor costs ⓘ | 36,980.4 |
| 2110 → | Total budgeted costs ⓘ (Hide details) | 1, 201, 225.14 |
| 2112 → | Discount | 0.00 |
| 2114 → | Total budgeted Profit ⓘ ⓘ | 233, 830.52 |
| 2116 → | Subtotal ⓘ | 1,435, 055.66 |
| 2118 → | Regular price | 1,875, 099.04 |
| 2120 → | price adjustment ⓧ adjusted down | -440, 043.38 |
| 284 → | Tax (GST (5%)) | 5% .71, 752.78 |
| 268 → | Total price | 1, 506, 808.44 |

SYSTEM FOR CONSTRUCTION BASED PROPOSALS AND METHOD OF USE

CROSS-REFERENCE TO RELATED APPLICATIONS

This application is a non-provisional application which claims priority to U.S. Provisional Patent Application No. 63/009,060 filed on Apr. 13, 2020, which is incorporated by reference in its entirety.

FIELD OF THE DISCLOSURE

This disclosure generally relates to computer implemented systems and methods for creating highly accurate estimates and proposals. More specifically, the present disclosure relates to computer implemented systems and methods for providing highly accurate and interactive estimates and proposals to clients or other relevant parties for various construction, renovation, and repair projects and services.

BACKGROUND

Currently, it is a frustrating and unresolved fact that most proposals and estimates for construction, renovation, or repair related projects and services are known for being inaccurate and vague in their overall details. Clients are usually not very sure as to what fixtures or services are being provided for each phase or stage of the construction project. Too often, clients are frequently left wondering whether they are being taken advantage of or whether they are working with a reliable general contractor and/or sub-contractors who is fulfilling the client's expectations or not. A contractor may honestly estimate a price initially and then during the project's course, the client wants to add upgrades or make changes that end up costing thousands of dollars more. The client may feel as if the contactor had not given them a correct or accurate price and may become frustrated with the contractor and entire construction and renovation project.

Several problems exist with the technologies and methods available for providing quotes or proposals for construction related projects and services. Such problems include the fact that accurate quoting and estimating of any construction work takes a long time and involves a great deal of manual calculations and tracking of these manual calculations. Accordingly, such quotes or estimates are prone to a great deal of human error. Further, the quotes or estimates that are provided by the proposal creator (e.g. usually the general contractor) to a client or other intended recipient are static and inflexible, meaning the estimate cannot be easily modified by the consumers or other party to reflect a quick change in real time. Rather, it is a time consuming, back and forth progress to finalize the quote to the satisfaction of the client in order to actually book the construction, renovation, or repair project.

Contractors and sub-contractors may do their best to provide accurate quotes, but the construction quotes and proposals using currently available options involve complex and inadequate technology. Under the conventionally available means for preparing a quote or a proposal, the general contractor (or other party) may manually prepare a quote or estimate by researching and collecting all required dimensions and estimated costs for the amounts of material, labor, and other costs, and then may share the quote or estimate with the client based on these manual calculations. The problem is that such estimates are extremely time consuming for a contractor to prepare because there are so many interconnected elements and values that have to be taken into account, including the markup costs and taxes for each material used and/or labor fee charged. Many errors are possible and may be included in the typical quotes and estimates provided to a client, because these elements are not always calculated correctly by the general contractor. Further, the quote or estimate requires the contractor to be aware that any change in quantity, sizing, or addition of an upgrade to the quote or estimate results in extensive time and effort to make sure all the other sections of the quote or estimate are also adjusted. Many contractors have to hire one or more costly professional estimators who are experienced enough in how to prepare these quotes and estimates for various construction projects, including in particular residential construction projects, in order to deliver somewhat accurate and reliable quotes.

Some technologies exist that attempt to solve the issue of how long it takes to prepare a construction quote by hand and to reduce the number of errors involved. Such previous technologies attempted to use drawings of a property focusing on specific locations where construction or renovation work is to occur. Using such previous technologies, the estimator would create drawings and attempt to include the cost of each item in the drawing. This is an overly complex process and still has the disadvantage that the consumer or laymen cannot modify an estimate based on this technology and see the change in real time. Any change to the quote requires the party who prepared the quote to go back in and spend a great deal of time to make the change.

Other technologies use flat templates with many phases of the construction or renovation project, but none of the phases relate the common dimensions together. Because the items are not related to the dimensions for the locations in a property where the construction, renovation, or repair is to occur, such quotes are very prone to error and miscalculation. Also, this option does not solve the problem of allowing consumers or other laymen to modify the quote or estimate easily and in real time.

Other technologies utilize a wizard or tutorial that asks a series of questions from which a quote or estimate may be produced. One important problem with such wizards or tutorials is that they are unidirectional and rigid, so that if a consumer or contractor or another party wants to edit and change the created estimate, they must go through the entire wizard again. Further, one would have to change the hard wired programming to change the wizard templates, which requires both programming knowledge and estimating knowledge.

Additional issues with existing proposals or quotes are that they do not often break down the projects so that it is clear which vendors are supplying which parts or which sub-contractors may be working on which projects, which would help the general contractor keep track of hours and labor spent and any costs associated with labor or materials for a project. Further, these quotes and proposals do not include the markup costs or profit margins in a clear way to the contractor or the client. Additionally, these quotes and proposals may not include pictures or images of the final result or the type of materials being used for the construction repair project.

Notably, if a client responds that they want to downgrade and remove features included in the quote or if they want to upgrade and include additional recommended fixtures or features to their construction project, the contractor has to go back and perform a re-estimate which will take several more hours, thus delaying the work and costing the contractor more money in labor before the contractor has even secured the bid for the project from the client.

Accordingly, there are still multiple deficiencies with the existing means for quoting clients for any construction repairs. Notably, there remains a great and urgent need for an improved system and method to prepare construction based quotes and proposals that would be reliable and trusted by the client so as to improve the client's experience with construction, renovation, or repair related projects and services. Additionally, it would be beneficial to have a construction management program that allows the contractor to efficiently manage these projects and proposals.

SUMMARY

The present description includes one or more non-limiting embodiments for a computer implemented method for creating and providing a construction proposal to a client or other party using a cost estimator application. The computer implemented method may include displaying one or more interfaces for an initial template of the construction proposal on the cost estimator application and receiving selections for one or more assemblies and one or more line items. The one or more assemblies are labels that identify a specific part or area of a house or building or other location for a construction, renovation, or repair project, and the one or more assemblies may further represent and act as a header for a group of one or more line items. The one or more line items are labels that further identify services or materials or equipment or other features to be provided by a contractor or subcontractor or vendor to the client of the construction, renovation, or repair project.

The process may include, in one or more non-limiting embodiments, receiving pricing for each line item of the one or more line items, whereby the pricing reflects costs associated with materials or labor or a combination of materials and labor and mark up for each line item. The process may further include receiving a first set of entered dimensions in designated fields in the construction proposal for one or more parameters, wherein the one or more parameters represent specific measurements and linking the designated fields for the one or more parameters for each line item of the one or more line items that utilizes the one or more parameters in a cost calculation. Any change made to the first set of entered dimensions in the linked designated fields updates the pricing and costs for each line item in a same or different assembly of the one or more assemblies. The process may further include receiving a second set of entered dimensions in designated fields in the construction proposal for one or more parameters having unlinked dimensions for the one or more line items, whereby the one or more parameters having unlinked dimensions are not linked or coupled together. The process may further include calculating the individual cost for each line item and calculating total costs for the construction proposal, including any taxes, adjustments, or discounts.

Additionally, the computer implemented method may include displaying optional upgrade line items to the client or the other party as selectable options within the construction proposal. If the client or the other party selects one of the optional upgrade line items, the construction proposal reflects inclusion of the optional upgrade line item and any changes to the calculated total costs of the construction proposal in real-time to the client or the other party.

Other aspects and advantages of the invention will be apparent from the following description and the appended claims.

BRIEF DESCRIPTION OF THE DRAWINGS

The preceding and following embodiments and descriptions are for illustrative purposes only and are not intended to limit the scope of this disclosure. Other aspects and advantages of this disclosure will become apparent from the following detailed description.

Embodiments of the present disclosure are described in detail below with reference to the following drawings. The drawings described herein are for illustrative purposes only of selected embodiments and not all possible implementations and are not intended to limit the scope of the present disclosure.

FIG. 6 is a pictorial illustration of an interface with a set of additional sample assemblies that may be available in cost estimator platform in accordance with an illustrative embodiment.

FIG. 7 is a pictorial illustration of an interface showing linked dimensions that may be associated with one or more assemblies in accordance with an illustrative embodiment.

FIG. 12 is a pictorial illustration of an interface in cost estimator platform displaying an example of line items having unlinked dimensions in accordance with an illustrative embodiment.

FIG. 13 is a pictorial illustration of an interface in cost estimator platform displaying a line item from FIG. 12 having unlinked dimensions and including the costs for labor, materials, and markup in accordance with an illustrative embodiment.

FIG. 20 is a pictorial illustration of an interface displaying the effect of any changes made in a proposal using cost estimator platform in accordance with an illustrative embodiment.

FIG. 21 is a pictorial illustration of an interface showing a summary of various total costs of relevance to the proposal creator and the client in accordance with an illustrative embodiment.

FIG. 23 is a pictorial illustration of an interface in cost estimator platform for managing payments and tracking payments for vendors and subcontractors in accordance with an illustrative embodiment.

DETAILED DESCRIPTION

Figure 1:
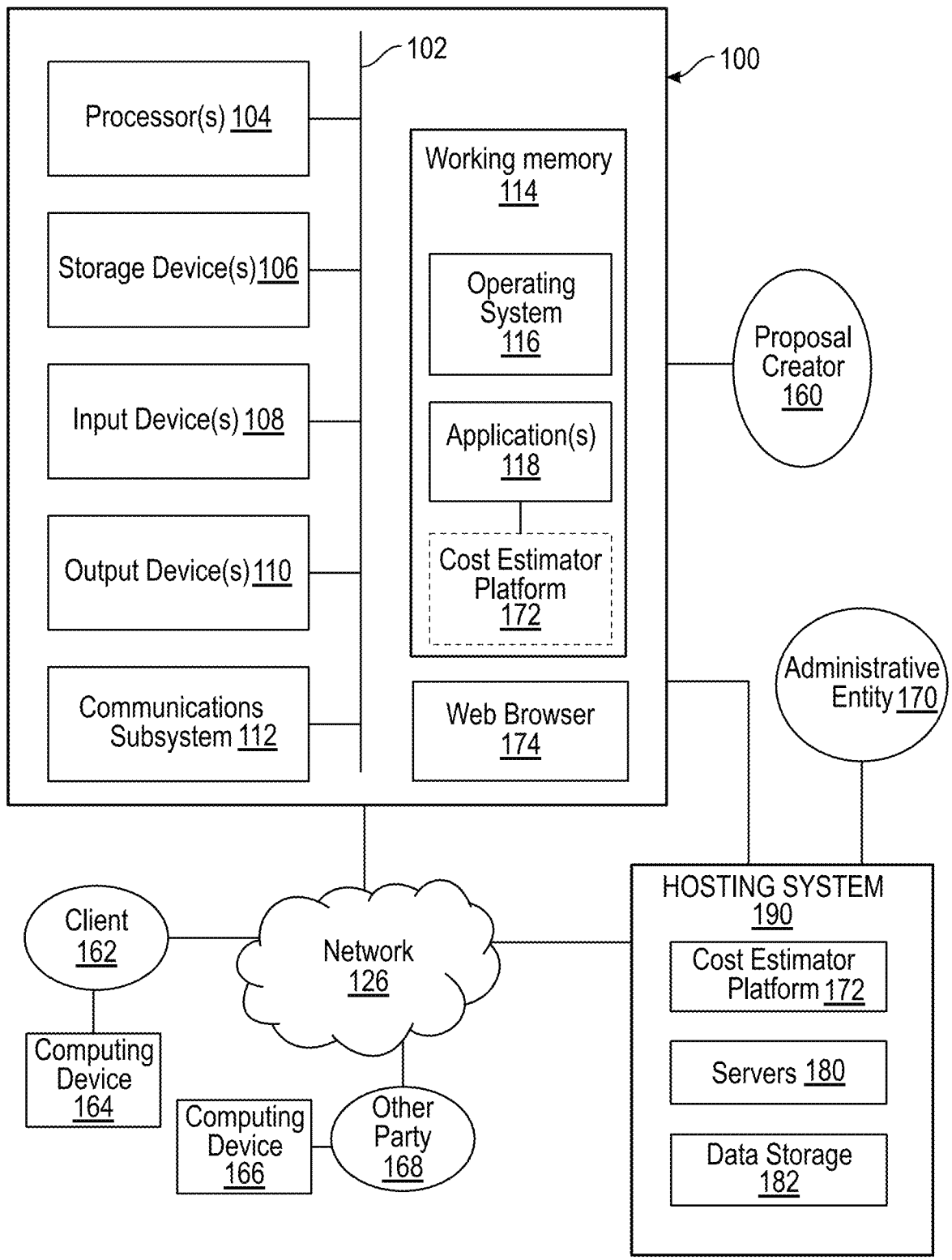
FIG. 1 depicts exemplary computing devices, components, and systems in accordance with one or more illustrative embodiment.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with; and/or in the context of other particular aspects and embodiments of the invention; and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

The term "set" as used herein may refer to one or more. Accordingly, a set may include one item or several items.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item, or may indicate more items. Thus, the term "set" may be equivalent to "one or more" as used herein.

As noted above, construction estimates are notoriously inaccurate and often include errors and omissions. Consumers usually tend to have little faith and confidence in the proposals (also known as a quote or estimate) they receive from their general contractors who are responsible for managing their construction based projects because they are told beforehand that it is an estimate and that additional costs may be factored in at a later time. Many times, the contractor may only verbally inform the consumer about the general costs including labor and materials and provide a written quote when the project is nearly complete. The consumer may not fully understand the work that is to be done based on these types of quotes. Accordingly, there are frequent disputes and misunderstandings about the work and cost involved on a construction project.

In addition to these problems, when contractors prepare a proposal, it usually takes several hours to attempt to provide an accurate proposal of the expected materials and labor and other costs. Many elements go into providing a quote using conventionally available means and adding up all the costs accurately is a difficult process. Errors and omissions can frequently be a problem with many construction proposals because every calculation has to take into account the proper measurements of a space to be worked on and factor in all of the correct labor costs, material costs, markups, taxes, and other base costs. When a client seeks to add upgrades or downgrade, the re-estimating process and preparing the proposal again can take a considerable amount of time and expense to the contractor. Further, when the client does receive the proposal, it is usually a standard document that may have been typed on a computer or may be an email using a basic word processing program. There is no ability for the client to interact in real-time and make changes by adding or removing quoted items and seeing the price changes for doing so in real-time. Rather, the client has to notify the contractor who has to make the corresponding changes and re-calculate the effect on the entire proposal from start to finish, and the contractor may then send the updated estimate to the client. The current process is usually time consuming, prone to frequent errors in calculations and omissions with respect to the total costs of the construction project, and frustrating for contractors, sub-contractors, and the client alike.

Accordingly, one or more embodiments described in the present description relate to a system and method for a computer based service and/or software module (e.g. cost estimator platform 172 as shown in FIG. 1) that is adapted to create construction based proposals for construction, renovation, and repair projects that are highly accurate, interactive, and can easily reflect changes to the initial proposal and re-estimates for many reasons, including because they include built in modules that allow the contractor to add key dimensions and costs and to relate the two together so that any potential change (e.g. addition or deletion of items or services) causes the entire proposal to change, thus saving the contractor the time and effort in having to calculate the effect of a change (e.g. addition or deletion of items or services) on the entire proposal.

Further, the computer based software program is interactive and provides results in real time so that the client can quickly view the effect on the total costs of a project if the client wants to make any type of change from the client's computing device.

In addition to the above, in one or more non-limiting embodiments, the computer based software program described herein further includes many beneficial features that benefit both the general contractor, subcontractor, vendors (e.g., manufacturers or sellers), and client alike. For example, the computer based software program may include a payment tracking system that allows the general contractor to track the hours and costs for any services provided by a sub-contractor or vendor and to send payment to the sub-contractor or vendor upon completion of their services directly using an escrow style funding process. Upon completion of a particular phase of a construction project and upon documenting the hours and costs in the computer based software program by the vendor or subcontractor, the general contractor may approve the costs and transfer the funds in the proper amount from the escrow style account to the vendor or sub-contractor directly.

Advantageously, the construction proposal software application (e.g., cost estimator platform 172 as shown in FIG. 1) makes it possible for a general contractor to create proposals that include clear entries for any costs for materials, labor, taxes, markup, and any other type of costs. Further, the general contractor can easily include photos and images of the intended materials or anticipated final results of the construction project in the proposal for the client to easily view. Notably, the general contractor can include optional items and/or upgrades in the proposal in an easy and simple to understand manner that the client can then easily incorporate by adding them or removing them, and the total costs of the proposal will almost instantaneously adjust in real-time so that the client can view the effects of such a change. None of the existing prior art methods of preparing construction projects, renovations, or repairs include all of these features and allow for interactive, real-time changes to be made by either the general contractor (or a subcontractor) or the client in such a quick and accurate manner.

Many benefits and advantages are provided by the one or more non-limiting embodiments of a computer based software program as described herein for managing construction projects (e.g., residential based construction projects or commercial based construction projects) and creating accurate and interactive construction proposals and estimates. Further details and information about the one or more illustrative embodiments for using a cost estimator platform, such as cost estimator platform 172 shown in FIG. 1, to create and manage construction related proposals on one's computing device is provided below in association with the corresponding Figures.

Turning to FIG. 1, FIG. 1 illustrates an exemplary system for one or more computing devices and the various exemplary components that may be employed in practicing one or more non-limiting embodiments of the invention as described herein. Computing device 100 may be any type of computing device known or to be created in the future. This may include, without limitation, fixed in place computers, such as desktop computers or mobile computing devices. Mobile computing devices may include, but are not limited to, laptop computers, smartphones and mobile phones, tablets, wearable electronic computing devices such as watches or glasses, or any other type of mobile electronic, computing device.

FIG. 1 provides a schematic illustration of one embodiment of a computing device 100 that can perform the methods provided by the various other listed embodiments, as described herein, and/or can function as the host computer system, a remote kiosk/terminal, a point-of-sale device, a mobile device, a set-top box and/or a computer system. FIG. 1 is meant only to provide a generalized illustration of various components, any or all of which may be utilized as appropriate. FIG. 1, therefore, broadly illustrates how individual system elements may be implemented in a relatively separated or relatively more integrated manner.

Computing device 100 may be any type of information handling system, including, but not limited to, any type of computing device as noted above. To reiterate, this may include small handheld devices, such as handheld computer/mobile telephones or may include large mainframe systems, such as a mainframe computer. Further examples of handheld computing devices may include personal digital assistants (PDAs), personal entertainment devices, such as MP3 players, portable televisions, and compact disc players. Other examples of computing devices 100 may include, but are not limited to, laptops, notebooks, workstation computers, personal computer systems, as well as servers (e.g., servers 180). Computing devices (e.g., computing device 100, 164, and 166) can be used by various parties described herein and may be connected on a computer network, such as computer network 126. Types of computer networks that can be used to interconnect the various information handling systems may include, but are not limited to, Local Area Networks (LANs), Wireless Local Area Networks (WLANs), the Internet (e.g. World Wide Web), the Public Switched Telephone Network (PSTN), other wireless networks, and any other network topology that can be used to interconnect the information handling systems.

The computing device or system 100 is shown comprising hardware elements that can be electrically coupled via a bus 102 (or may otherwise be in communication, as appropriate). It is noted that computing devices 164 and 166 may function in accordance with computing device 100 and include the same components operating in the same manner as computing device 100.

The hardware elements of computing device 100 may include one or more processors 104, including without limitation one or more general-purpose processors and/or one or more special-purpose processors (such as digital signal processing chips, graphics acceleration processors, and/or the like). Computing device 100 may further include one or more input devices 108, which can include without limitation one or more cameras, sensors (including inertial sensors), a mouse, a keyboard and/or the like. Further, computing device 100 may include one or more output devices 110 such as the device display. Furthermore, in some embodiments an input device 108 and an output device 110 of computing device 100 may be integrated, for example, in a touch screen or capacitive display as commonly found on mobile computing devices as well as desktop computers and laptops.

The computing device 100 may further include (and/or be in communication with) one or more non-transitory storage devices 106, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. Device storage may be used in a number of embodiments discussed herein. Further, the storage devices 106 may be non-volatile data storage devices in one or more non-limiting embodiments. Further, computing device 100 may be able to access removable nonvolatile storage devices 106 that can be shared among two or more information handling systems (e.g., computing devices) using various techniques, such as connecting the removable nonvolatile storage device 106 to a USB port or other connector of the information handling systems.

The computing system 100 might also include a communications subsystem 112, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 112 may permit data to be exchanged with a network (e.g., such as network 126), other computer systems, and/or any other devices. In many embodiments, the computer system 100 will further comprise a non-transitory working memory 114, which can include a RAM or ROM device, as described above.

The computing device or system 100 also can comprise software elements, shown as being currently located within the working memory 114, including an operating system 116, device drivers, executable libraries, and/or other code, such as one or more application programs 118, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer). In an aspect, then, such code and/or instructions can be used to configure and/or adapt computing devices 100, 164, and 166 to perform one or more operations in accordance with the described methods.

A set of these instructions and/or code might be stored on a computer-readable storage medium, such as the storage device(s) 106 described above. In some cases, the storage medium might be incorporated within a computer system, such as computing device 100,164, and 166. In other embodiments, the storage medium might be separate from computing device 100, 164, and 166 (e.g., a removable medium, such as a compact disc or USB stick), and/or provided in an installation package, such that the storage medium can be used to program, configure and/or adapt a general purpose computer with the instructions/code stored thereon. These instructions might take the form of executable code, which is executable by the computing device 100,164, and 166 and/or might take the form of source and/or installable code, which, upon compilation and/or installation on the computing device 100,164, and 166 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computing device 100) to perform methods in accordance with the disclosure. For example, some or all of the procedures of the described methods may be performed by the computing device 100 in response to one or more processors 104 executing one or more sequences of one or more instructions (which might be incorporated into the operating system 116 and/or other code, such as an application program 118) contained in the working memory 114. Such instructions may be read into the working memory 114 from another computer-readable medium, such as one or more of the storage device(s) 106. Merely by way of example, execution of the sequences of instructions contained in the working memory 114 might cause the one or more processors 104 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 100, 164, and 166 various computer-readable media might be involved in providing instructions/code to the one or more processors 104 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media may include, for example, optical and/or magnetic disks, such as the storage device(s) 106. Volatile media include, without limitation, dynamic memory, such as the working memory 114. Transmission media may include, without limitation, coaxial cables, copper wire and fiber optics, including the wires that comprise the bus 102, as well as the various components of the communications subsystem 112 (and/or the media by which the communications subsystem 112 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 104 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 112 (and/or components thereof) generally will receive the signals, and the bus 102 then might carry the signals (and/or the data, instructions, etc. carried by the signals) to the working memory 114, from which the one or more processors 104 retrieves and executes the instructions. The instructions received by the working memory 114 may optionally be stored on a non-transitory storage device 106 either before or after execution by the processor(s) 104.

In one or more embodiments, computing device 100 is in communication with one or more networks, such as network 126. Network 126 may include a local area network (LAN), such as a company Intranet, a metropolitan area network (MAN), or a wide area network (WAN), such as the Internet or World Wide Web. Network 126 may be a private network, a public network, or a combination thereof. Network 126 may be any type of network known in the art, including a telecommunications network, a wireless network (including Wi-Fi), and a wireline network. Network 126 may include mobile telephone networks utilizing any protocol or protocols used to communicate among mobile digital computing devices (e.g., computing devices 100, 164, and 166), such as GSM, GPRS, UMTS, AMPS, TDMA, or CDMA. In one or more non-limiting embodiments, different types of data may be transmitted via network 126 via different protocols. In further non-limiting other embodiments, computing device 100, 164, and 166 may act as a standalone device or may operate as a peer machine in a peer-to-peer (or distributed) network environment.

Network 126 may further include a system of terminals, gateways, and routers. Network 126 may employ one or more cellular access technologies including but not limited to: 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if, for instance, they are in a remote location not accessible by other networks.

In one or more non-limiting embodiments, a computing device, such as computing device 100 may include a web browser such as web browser 174. Web browser 174 may be any type of web browser known in the art that may be used to access one or more web applications (e.g., cost estimator platform 172) on user computing devices 100, 164, 166, or the like. Web applications are software based applications that are accessible by network 126 and may be located on the Internet or World Wide Web. Web browser 174 may include a variety of hardware, software, and/or firmware generally operative to present a web application to a user via a display device 110 (e.g., touchscreen or other type of monitor or display device) on a computing device. Examples of suitable web browsers include, but are not limited to, MICROSOFT EXPLORER, MOZILLA FIREFOX, and APPLE SAFARI. Web browser 174 may be previously installed by the manufacturer or company associated with the computing device 100, or alternatively, may be downloaded onto computing device 100 or any other computing device.

In one or more non-limiting embodiment, cost estimator platform 172 may be a software program or module configured to create interactive and accurate construction estimates and proposals for construction based services (e.g., residential and/or commercial construction services and projects). Cost estimator platform 172 may provide an interactive computer based platform or software module that allows contractors, including general contractors or sub-contractors, clients, vendors, and other parties to create construction proposals that include the costs of any material, labor, or services involved in one or more construction projects in one's home or other location. Further, cost estimator platform 172 may be an integrated management system that allows the user (e.g., contractors, sub-contractors, or other parties) to keep track of projects that are in progress including keeping track of the stages of work performed by various contractors or subcontractors. Further, cost estimator platform 172 may be configured to manage any client intake, contact information for clients and other parties, and to manage payment delivery to subcontractors and vendors. Further information about cost estimator platform 172, in one or more non-limiting embodiments, is provided below with respect to FIG. 2-FIG. 26.

In one or more non-limiting embodiments, cost estimator platform 172 may be implemented as a web service. As known in the art, a web service may be a software module or software program (e.g., cost estimator platform 172) that is designed to implement a set of tasks that is accessible from multiple computing devices, such as computing device 100, 164, and 166 over a network, such as network 126. In particular, cost estimator platform 172 may be implemented as a web service accessible using the World Wide Web as the connecting network 126, although any alternative type of network may be used. Cost estimator platform 172, when implemented as a web service, can be searched by any user (e.g., proposal creator 160, client 162, other party 168) using web browser 174. Cost estimator platform 172 when implemented as a web service can be searched for over the network 126 using the input devices 108 of a computing device and can also be invoked accordingly. Further, cost estimator platform 172 when invoked as a web service would be able to provide functionality to the client or user which invokes that web service.

When cost estimator platform 172 is implemented as a web service, a client or party may invoke a series of web service calls via requests to one or more servers 180 that are part of the hosting system 190 which would host the actual web service. In one or more non-limiting embodiments, hosting system 190 may be a cloud-based type hosting system. "Cloud-based" is a term that refers to applications, services or resources (e.g., cost estimator platform 172) made available to users on demand via a network, such as network 126, from a cloud computing provider's server. Administrative entity 170 may be the cloud computing provider and may use servers 180 to provide access to cost estimate platform 172.

Hosting system 190 may include data storage systems 182 that can provide access to stored data by applications running on computing devices (e.g., 100, 164, 166, etc.) that may be geographically separate from each other, provide offsite data backup and restore functionality, provide data storage to a computing device with limited storage capabilities, and/or provide storage functionality not implemented on a computing device (e.g., 100, 164, 166, etc.).

The hosting system 190 may be a service that can be implemented as a web service, in one or more non-limiting embodiments, with a corresponding set of Web Service Application Programming Interfaces (APIs). The Web Service APIs may be implemented, for example, as a Representational State Transfer (REST)-based Hypertext Transfer Protocol (HTTP) interface or a Simple Object Access Protocol (SOAP)-based interface. Any programming languages may be used to create or operate cost estimator platform 172 as a web service, including, but not limited to .Net, Java, and XML. Further, cost estimator platform 172 as a web service may use standardized industry protocol for the communication and may include well-defined protocols, such as Service Transport, XML Messaging, Service Description, and Service Discovery layers in the web services protocol stack.

For instance, the hosting system can be implemented such that client applications (for example, executing on computing devices 100, 164, 166, etc.) can store, retrieve, or otherwise manipulate data objects in the hosting system 190. The hosting system 190 can be implemented by one or more server devices 180, which can be implemented using any type of computing device.

In one or more non-limiting embodiments, administrative entity 170 is the provider and creator of cost estimator platform 172. Administrative entity 170 may make cost estimator platform 172 available to any client, such as proposal creator 160, client 162, or other party 168, without limitation, who wants to use cost estimator platform 172. Administrative entity 170 may be able to manipulate and alter cost estimator platform 172 to affect the operation and maintenance of cost estimator platform 172 on server(s) 180 and as stored on one or more data storage devices 182 that are part of the hosting system 190. While administrative entity 170 is depicted as a single element communicating over network 126 and through the hosting system 190, it is noted that administrative entity 170, in one or more non-limiting embodiments, may be distributed over network 126 in any number of physical locations.

In one or more non-limiting embodiments, cost estimator platform 172 may alternatively be a downloadable software module that is capable of being stored directly on a computing device, such as computing devices 100, 164, or 166, rather than acting as a web service accessible through a computing device's web browser 174. Accordingly, any user may be able to download and store cost estimator platform 172 on computing device 100 (or 164 or 166 or the like) as a computer based application (e.g., such as application 118) and software module that runs using the working engines and modules on the computing device. In some embodiments, cost estimator platform 172 may be preinstalled on computing device 100 or any other computing device by the manufacturer or designer or other entity. Cost estimator platform 172 may be innate, built into, or otherwise integrated into existing platforms such as, without limitation thereto, a website, third-party program, iOS™, Android™, Snapchat™, Getty Images™, Instagram™ Facebook™, or any other platform capable transmitting, receiving, and presenting data.

Cost estimator platform 172 may be stored on computing device 100 or any other computing devices (e.g., 164, 166) and may also be stored or otherwise accessible by one or more servers 180 over network 126 by any party. The storage devices 106 may include a non-transitory computer readable medium including instructions, which when executed by a computer or processor (such as processors 104) may cause the computer or processor to perform operations to implement cost estimator platform 172.

As shown in FIG. 1, computing device 100 may belong to a user referred to in FIG. 1 as proposal creator 160. Proposal creator 160 may be a user that intends to access cost estimator platform 172 using his or computing device 100 to create one or more construction, renovation, and/or repair related proposals. In one or more non-limiting embodiments, proposal creator 160 may be the general contractor assigned a construction, renovation, or repair project. Also shown in FIG. 1, client 162 may represent a client of proposal creator 160. Proposal creator 160 may intend to create a construction related proposal using cost estimator platform 172 and provide it to client 162. Client 162 may access cost estimator platform 172 using his or her computing device 164. Other parties, such as other party 168, may also access the one or more proposals created by proposal creator 160 using cost estimator platform 172 via their computing devices 166. In one or more non-limiting embodiments, other parties 168 may include sub-contractors, vendors, or other parties other than client 162 needing access to the proposals created by proposal creator 160 using cost estimator platform 172.

As noted above, in one non-limiting embodiment, cost estimator platform 172 may be implemented as a web service as described above. Accordingly, proposal creator 160, client 162, and other party 168 may access cost estimator platform 172 over the computer network 126 using their web browsers 174 to view one or more proposals or to use other features included with cost estimator platform 172. Further information about other components of cost estimator platform 172 are included below with respect to FIG. 2-FIG. 26.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Figure 2:
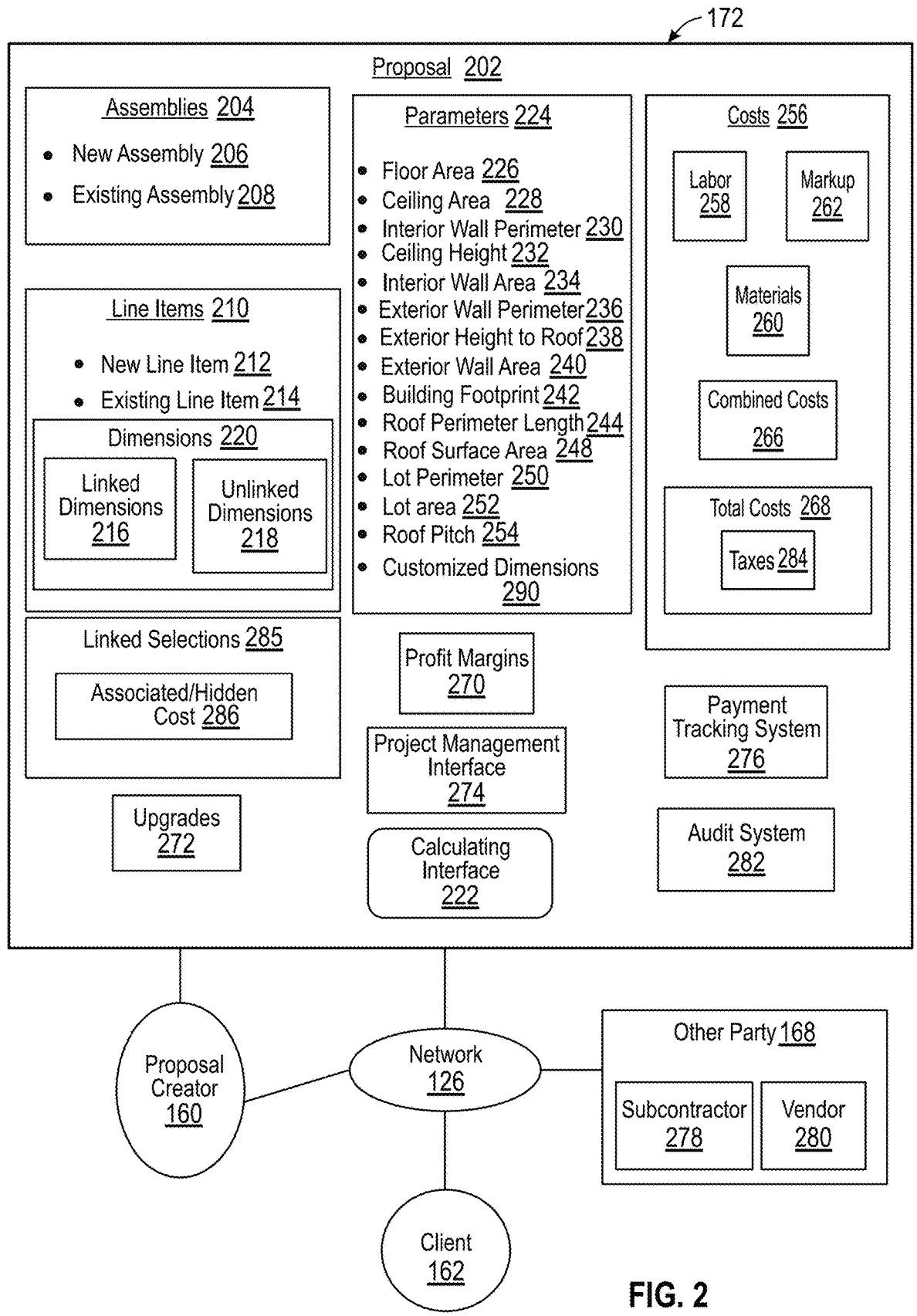
FIG. 2 depicts a block diagram of exemplary components of a computer implemented cost estimator platform in accordance with an illustrative embodiment.

Turning to FIG. 2, FIG. 2 is a block diagram of various components that may be involved in one or more embodiments of a computer based estimator platform, such as cost estimator platform 172, that may be used to create construction related quotes and estimates as well as to implement many other useful features and functions. As used herein, the terms "proposal", "estimates", and "quotes" may be used interchangeably to describe a document that includes an approximate calculation or judgment of the value, number, quantity, or extent of any costs and other information relevant to construction related projects, renovations, repairs, and services needed by or provided to one party by another.

As shown in FIG. 2, proposal 202 may also be described as a quote or estimate of construction related projects, services, and repairs. Proposal 202 may be, preferably, sent to the intended recipient (e.g., proposal creator 160, client 162, or other party 168 as shown in FIGS. 1-2) or made available for viewing by the intended recipient in a digital format viewable on a computing device, such as computing devices 100, 164, and 166 shown in FIG. 1. Accordingly, proposal 202 may be available for viewing on a web site (e.g., using the web browser 174 of one's computing devices 100, 164, and 166 as shown in FIG. 1) or may be viewable separately as an attachment or link in one's email or via any other form of electronic transmission. As noted below in FIGS. 25A-25B, at times proposal 202 may be visible on a third party website 2502 that uses and integrates features and components of cost estimator platform 172 and may display a proposal 202 (in a simplified or complex form) to the viewer. It is also always possible for a recipient to print out proposal 202 as a hardcopy for viewing on printed paper. Ultimately, cost estimator platform 172 is a computer based software program that may be used by one or more parties to create and view any number of proposals 202 for any type of construction related work or repairs on a specific property, whether the construction work relates to residential properties or non-residential properties.

In one or more non-limiting embodiment, a proposal creator, such as proposal creator 160 shown in FIG. 1 and FIG. 2, may be a general contractor (also known as a contractor). General contractors may be described as the party (e.g., person and/or business) with the responsibility to oversee a construction, renovation, or repair project and is the party who enters into the primary contract with the client/property owner. The general contractor is also the person or business entity that contracts to oversee a building or construction project usually involving the use of subcontractors. The general contractor tends to be the party that provides the proposal 202 to the client 162, and further informs the client 162 details about how long a construction project may take and what phases are involved in any property repairs and construction work on the property.

The client 162 has the capacity to contract with and engage the general contractor (e.g., proposal creator 160) to work on a particular property location. The client 162 is generally the owner of a property needing repairs and construction work. The client 162 may also be a party responsible for a property even if the client 162 is not the owner of the property.

In one or more non-limiting embodiments, the proposal creator 160 may work with one or more additional other parties 168, which may include any number of subcontractors 278 and/or vendors 280. In one or more non-limiting embodiments, subcontractor 278 may be described as an individual or business contracting to perform part or all of another's contract with a property owner. Accordingly, subcontractor 278 may work and be managed by the general contractor (e.g., proposal creator 160) to ensure certain requested construction work is completed properly. Examples of services provided by subcontractors 278 may include, but are not limited to, plumbing, electrical, drywalling, carpeting, insulation, masonry, roofing, flooring, landscaping, carpentry, among many other possible types of services provided by subcontractors 278.

In some cases, subcontractors 278 may also act as vendors 280, but in other cases, vendors 280 may not necessarily be sub-contractors 278. Vendors 280 are entities that sell or otherwise provide materials or goods needed to complete a construction project. Examples of vendors 280 may include hardware stores, such as, Home Depot®, Lowe's®, or any other store or entity providing necessary materials or goods necessary for completing construction services. As noted above, in some cases, such entities may also provide services related to the installation of such materials or goods and may be classified in some cases as both sub-contractors 278 and/or vendors 280 depending on the services provided.

Accordingly, proposal 202 may be a sum of the expected costs (e.g., total costs 268) for the labor 258, materials 260, and markup 262, as well as many other costs (e.g., taxes 284 and other adjustments to the total costs 268 including any applied discounts as shown below in FIG. 16) associated with the entire construction project for a property. The costs of any labor 258 and materials 260 involved in the construction project for a property may be obtained from any subcontractors 278 and/or vendors 280 associated with the construction project or any other relevant party 168. A general contractor may also obtain the data related to the costs 256 of any labor 258, materials 260, and markup 262, as well as other costs 256 for use in the proposal 202.

In one or more non-limiting embodiments, cost estimator platform 172 is made up of assemblies, such as assemblies 204. Assemblies 204 are assigned groupings or categories. Assemblies 204 may often be a word or phrase that represents a specific room or area of a property, such as for example "Kitchen" or "Basement" or "Exterior Fence.", but assemblies 204 are not limited solely to this designation. In some cases, assemblies 204 may represent specific fixtures or features or sub-elements of a construction, renovation, or repair project. In other words, assemblies 204 are overarching labels for a task or phase of the construction work to be performed on a property.

More specifically, assemblies 204 may be a grouping of line items 210, as shown in FIG. 2, whereby the selected line items 210 within an assembly 204 are necessary and desirable to complete that services associated with the assembly 204. Line items 210 grouped together in an assembly 204 typically go together for a particular phase or type of work performed for a construction project. Notably, assemblies 204 can be arranged and labeled anything that the general contractor (e.g., proposal creator 160) wants for each assembly 204. Advantageously, the proposal creator 160 can create or select from as many assemblies 204 as the proposal creator 160 would like. Further, proposal creator 160 may have sub-assemblies within parent assemblies 204. Another word for a sub-assembly is a child assembly. For example, without limitation thereto, an assembly 204 may be created or selected to represent a "kitchen", "master bathroom", "vanity", "flooring," "den", "skylight", or "garage" or any other location or feature of a house or building. Advantageously, there is no limit to the number of parent assemblies and sub-assemblies 204 that may be created in a proposal 202 to best suit the needs of the proposal creator 160 and/or client 162 or other party 168. In other words, the assemblies 204 are infinitely nestable and reusable within one another in a hierarchical arrangement to best suit the needs of the proposal creator 160, client 162, and/or other party 168. Assemblies 204 may also be reusable groups of items, including line items 210, that are commonly sold or built together, and which can be re-used in different contexts.

Keeping these groups of line items 210 together in an assembly 204 or more than one assembly 204 may ensure that the proposal creator 160 does not forget something that needs to be included in the cost 256 calculation of the proposal 202. Further, if the proposal creator 160 has to make any kind of change to one of the line items 210, every other parent assembly 204 that uses that group of line items 210 will also have to changes and that initial change may affect these other grouped line items 210.

Figure 8:
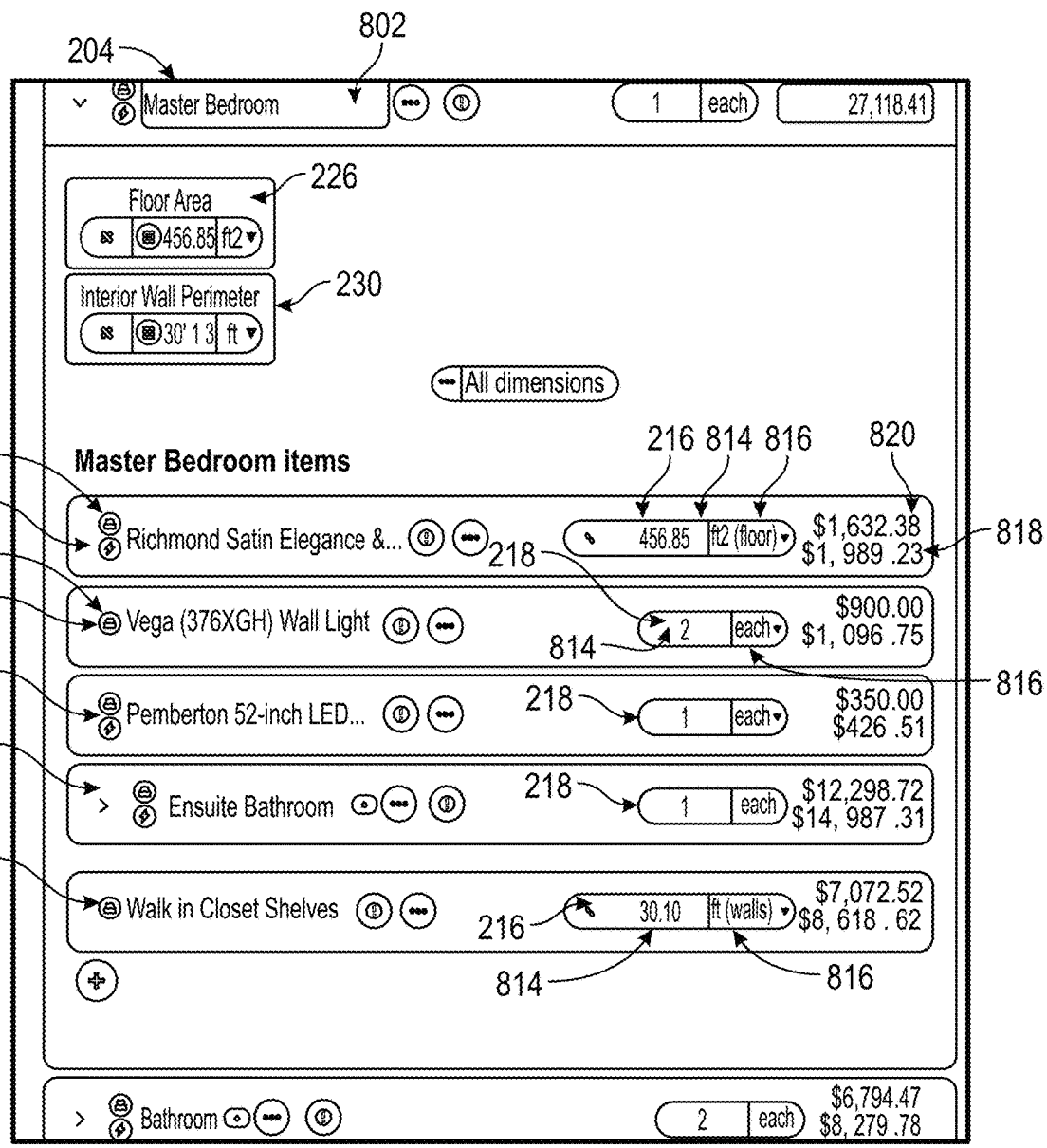
FIG. 8 is a pictorial illustration of an interface in cost estimator platform displaying one or more line items and one or more linked and unlinked dimensions in accordance with an illustrative embodiment.

In one or more non-limiting embodiments, assemblies 204 have an interface that appears to the user and allows the user to categorize all of the listed line items 210 (e.g., as shown in FIG. 8 and FIG. 12) that go into the requested construction and renovation work to be performed on a property. It is noted that cost proposal estimator 172 may be particularly suited for residential construction based projects, but may also be easily adapted to non-residential, commercial construction based projects.

Assemblies 204 are titles or labels that act to identify and group together line items, such as line items 210, under a general heading or category. The line items 210 are also labels or titles that identify and describe a specific fixture, feature, and/or service to be provided by the contractor (e.g., proposal creator 160) for the specific assembly 204. Line items 210 may refer to any component or element or needed to complete the construction, renovation, or repair work associated with each assembly 204. For example, the client 162 would like to hire a general contractor to provide construction, renovation, or repair work in his or her kitchen. The general contractor may be the proposal creator 160 and use cost estimator platform 172 to provide a proposal 202 with cost estimates associated with the renovation of the client's 162 kitchen. Accordingly, the proposal creator 160 may select from an existing assembly 208 labeled "kitchen." Alternatively, the proposal creator 160 may create and build a new assembly 206 to be labeled "kitchen" in cost estimator platform 172.

Next, the proposal creator 160 may fill in the necessary line items 210 needed to complete the construction, renovation, or repair work on the kitchen. An example of a line items, such as line item 210, may be "cabinets", whereby that specific line item 210 will include the costs for everything related to the construction, installation, repairs, or other type of work on cabinets in the kitchen of the client's 162 respective property. Another example of line items 210 that may be included under the assembly 204 labeled as "Kitchen" may include "Kitchen Island" which may include the costs for everything related to the construction, installation, repairs, or other type of work on the kitchen island in the kitchen of the client 162. Other examples of line items 210 for the kitchen based assembly 204 may include "drawers," "faucets", "backsplash", "flooring", "countertops," or any other type of work that is commonly performed when repair or renovating one's kitchen.

As noted above, cost estimator platform 172 allows the user to build a new assembly 206 or select from pre-existing assemblies 208 (e.g., already created and/or customized for the user) as shown in FIG. 2. If the proposal creator 160 desires to build a new assembly 206, then the proposal creator 160 may create multiple modules with their own specific labels and contents for each new assembly 206. The new assembly 206 can be created within cost estimator platform 172 using the user's computing device (e.g., 100) such that the new assembly 206 can include any line items 210 the user would like to associate with the new assembly 206, and any associated costs 256, pictures, tasks, notes, and any other information to be included in the new assembly 206. Advantageously, cost estimator platform 172 may already include thousands of existing assemblies 208 for the user to choose from and customize as needed.

With respect to line items 210, the user can also either create a new line item 212, as shown in FIG. 2, or select from existing line items 214 when preparing the proposal 202 for the client 162. The user has the option to select from hundreds of thousands of existing line items 210 that may suit the user's needs. Such line items 210 may already include all of the relevant costs 256 pertinent to the construction work to be performed on the client's 162 property for any particular assembly 204. For example, a user may have provided a similar proposal 202 to another client and seeks to reuse all or part of the proposal 202 from the client 162 by cutting and editing existing line items 214 that already include the relevant costs 256 for providing the materials or services associated with that existing line item 214.

As noted above, assemblies 204 can be organized in an unlimited hierarchy of assemblies, with sub-assemblies arranged inside more general, parent assemblies 204. Each assembly 204 can be saved, managed, and modified separately. If changes are made to one sub-assembly located within a larger assembly 204, the modified values or items may trigger changes in the parent assembly 204 for any connected line items 210.

Line items 210 are closely linked to the various costs 256 quoted in the proposal 202. Line items 210 allow the user to enter in any relevant costs 256 associated with, but not limited to, the cost of labor 258, materials 260, and any markup 262 included with such costs 256. Any other type of cost 256 other than those listed above may also be included and entered using one or more interfaces available in the cost estimator platform 172 provided to the user for each line item 210 (e.g., as shown in FIG. 8 and FIG. 12).

Labor costs 258 may relate to any costs 256 involved for a specific type of trade work and/or services associated with a specific line item 210. In one non-limiting embodiment, labor costs 258 may reflect the costs 256 of the work to be performed by subcontractors 278 or vendors 280 who provide the labor to complete the construction, renovation, or repair services on a property associated with the proposal 202.

Material costs 260 may relate to the specific costs 256 for requested or desired materials and/or goods. Such materials may be selected by the proposal creator 160, the client 162, or another party 168, including the subcontractor 278. An example of a material included in the proposal 202 for a "Kitchen" assembly 204, may be a faucet for the kitchen sink. Accordingly, the material costs 260 for the purchase of the faucet for the kitchen sink may be included in the interface associated with the line items 210 in cost estimator platform 172.

Typically, a general contractor (e.g., proposal creator 160) will include an additional cost to a specific line item 210 that may be known as the markup cost 262. Markup costs 262 may relate to the amount added to the cost price of goods to cover overhead and profit by the general contractor. Accordingly, the general contractor or other proposal creator 160, if desired, may include the markup cost 262 for each line item 210 or even for the whole proposal 202. The markup cost 262 can be built in, default, or instead be an adjusted markup cost 262 when used to determine the total costs 268 per line item 210 or for the whole proposal 202. It is noted, that, in some cases, there may not be any cost included for the markup cost 262 if this is what the proposal creator 160 wants or each markup may be adjustable.

Figure 11:
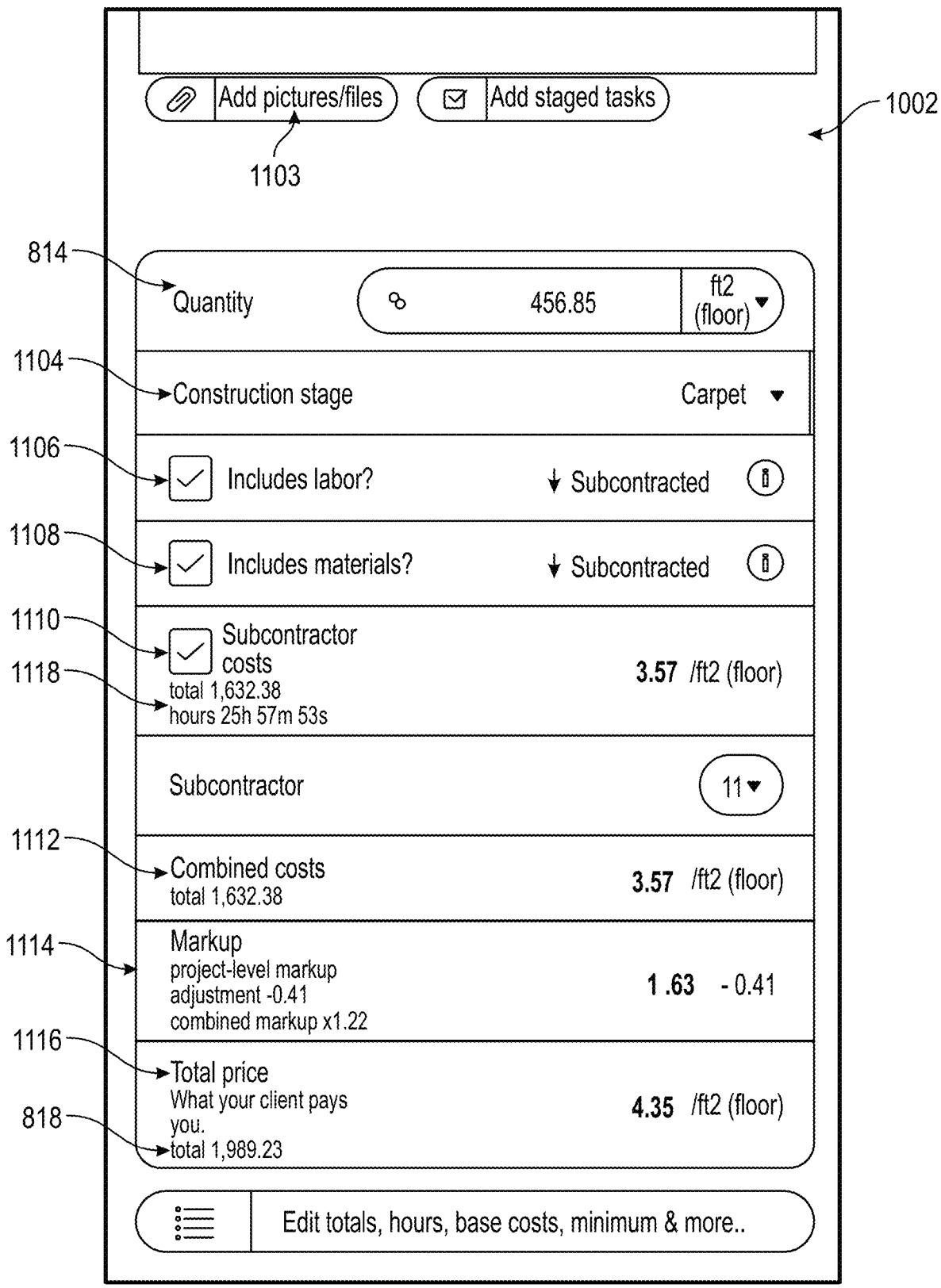
FIG. 11 is a pictorial illustration of an interface in cost estimator platform displaying a line item shown in FIG. 8 having linked dimensions and including the costs for labor, materials, and markup in accordance with an illustrative embodiment.

The combined costs 266 may be a sum of one or more of the costs for labor 258, materials 260, the markup 262, as well as other costs that may be included in the total costs 268 (e.g., combined costs 1112 in FIG. 11). Taxes 284 may represent any taxes and/or government fees associated with the services included in the proposal 202. Total costs 268 may be the sum of all of the above costs 256 and may also take into account the amount owed with taxes 284 (e.g., as shown in FIG. 21).

Cost estimator platform 172 may include an interface or display 2102 for total costs 268 (e.g., as shown in FIG. 21) that includes a myriad of other features. For example, total costs 268 may also show the user the estimated amount of labor hours 2104, the budgeted materials/subcontractor costs 2106, the budgeted labor costs 2108, total budgeted costs 2110, any relevant discounts 2112, total budgeted profit 2114, subtotals 2116, regular price 2118, any price adjustments 2120 as shown in FIG. 21, as well as the taxes 284, and the total price 268 of the sum of all of these components as well as sum of the individual costs (e.g., individual costs 818 of each line item 210 as shown in FIG. 8.

In using the cost estimator platform 172, it is intended that the proposal 202 provided to a client 162 (or any other intended recipient) have an accurate and detailed listing of all of the anticipated costs 256 as they relate to any construction, renovation, or repairs to be performed on a specific property. Further, as the construction project progresses, cost estimator platform 172 is configured to allow any changes to various costs 256 to be easily made by entering in the new or correct values in their corresponding locations in the appropriate line items 210 (e.g., as shown in FIG. 11) with at least one or more assemblies 204 and the total costs 268 will factor in these changes automatically and in an accurate manner.

Figure 10:
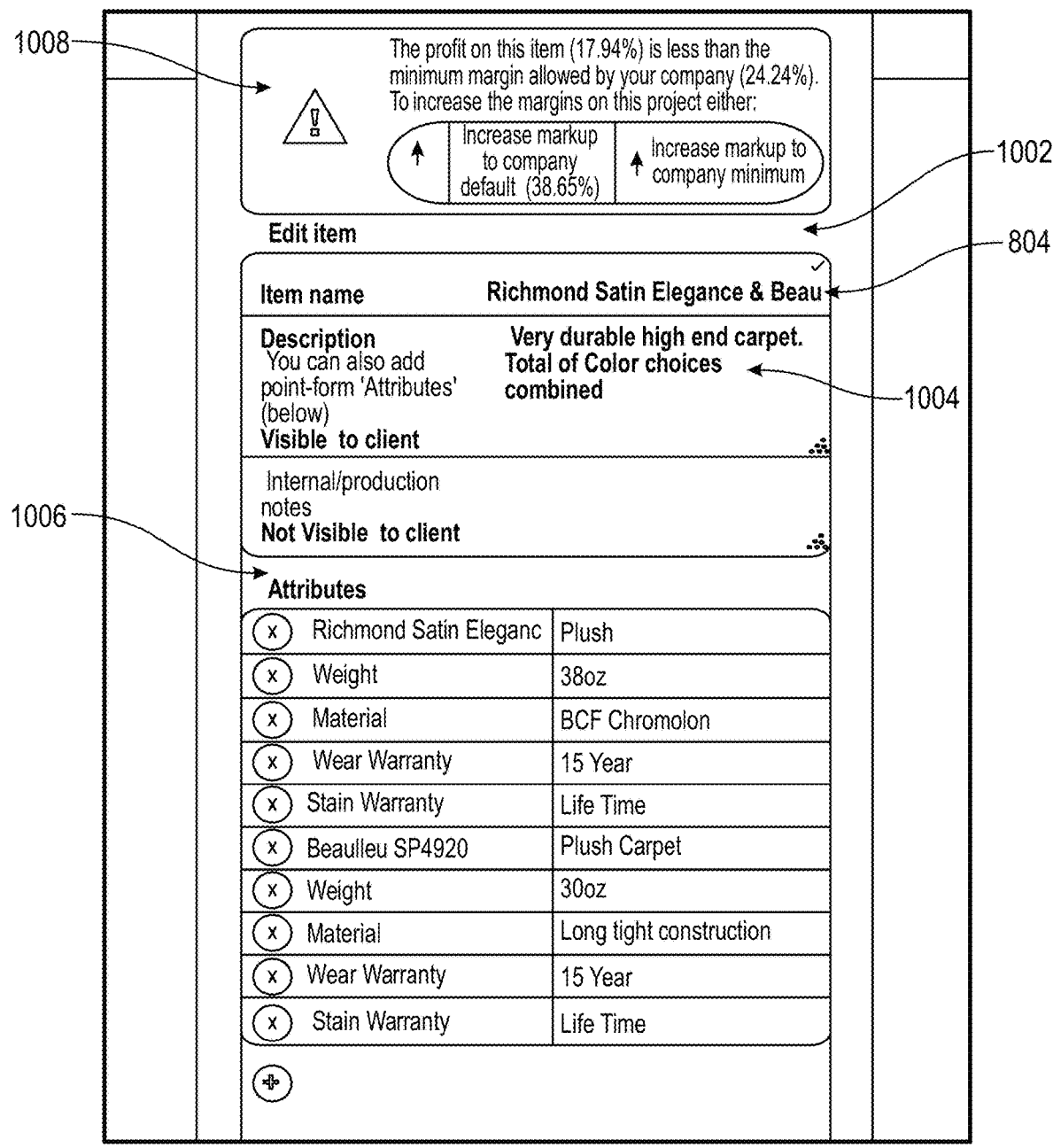
FIG. 10 is a pictorial illustration of an interface in cost estimator platform displaying one or more line items from FIG. 8 and relevant attributes or features in accordance with an illustrative embodiment.

With respect to line items 210, one or more interfaces for the line items 210 in cost estimator platform 172 allows the proposal creator 160 or other user to provide any relevant information for each line item 210. Such relevant information may include any attributes, features, notes, as well as any images or pictures that the proposal creator 160 would like to include to visually show the end result once the construction, renovation, or repair has taken place (e.g., as shown in FIG. 10 and FIG. 11). For example, if the line item 210 relates to a backsplash in a kitchen, then the images of the intended backsplash and final result in a kitchen can be uploaded and available for viewing by the client 162. The client 162 may open the interface for that particular line item 210 (e.g., "backsplash") and see the displayed image and relevant information about the backsplash. Any special notes about the attributes and unique key features for that item, object, or fixture can also be detailed in the line item 210 interface (e.g., as shown in FIG. 11, FIG. 13, and FIGS. 22A-22B).

Line items 210 may be categorized and listed in terms of quantities in some cases. Line items 210 may also be categorized and listed in a manner closest to how that fixture or service included in the line item 210 is traditionally understood (e.g., as shown by unit type 816 in FIG. 8). Many fixtures or materials or services may be listed based on the cost 256 associated with that fixture, material, or service. For example, line items 210 may be displayed and listed based on unit cost (e.g., per square foot, per meter, per cubic yard, etc.) (e.g., as shown in FIG. 8-FIG. 14B). As further explained below, line items 210 are also configured to receive and process values entered for important dimensions 220 (e.g., linked dimensions 216 or unlinked dimensions 218) that are used to determine the costs 256 for each line item 210, which is one of the distinguishing and unique features of cost estimator platform 172 in its operation and method of use.

In preparing construction related quotes or proposals, such as proposal 202, it is standard for the proposal creator 160 or another user to enter the values for all required dimensions 220 needed to measure a particular aspect of a fixture or area to be worked on in the construction, renovation, or repair project. In one or more non-limiting embodiments, a unique innovation of what sets cost estimator platform 172 apart is its use of linked dimensions 216. The use of linked dimensions 216 can drastically reduce the time needed and manual calculations performed to determine all associated costs, such as costs 256, for each line item 210 and reduce miscalculations or errors in the proposal 202.

Linked dimensions 216 refers to the dimensions entered for particular parameters 224 whereby any change made at any time to values entered in the listed dimension for a parameter 224 affects the pricing for labor 258, materials 260, and other combined costs 266 for multiple line items 210 and/or assemblies 204. Parameters 224 refers to particular units of measurements that may be relevant to the construction, renovation, and repair projects associated with the proposal 202. Parameters 224 may include, but are not limited to, the parameters 226-254 shown in FIG. 2 (as well as those parameters 2512 and 2514 shown in FIG. 25B). These exemplary parameters 224 may be "linked" or coupled to the calculation of the costs 256 for multiple line items 210. It is noted that the term "parameter" as used herein may be used interchangeably with the term "variable."

In order to provide an accurate construction proposal 202, the general contractor 160 preparing the proposal 202 has to enter and display all costs 256 for each line item 210. Cost estimator platform 172 utilizes a unit price type contract presentation in order to ensure that the proposal creator 160 includes all relevant costs 256, including any straightforward, obvious and non-obvious costs (e.g., hidden costs) into the final total costs 268 calculation. Under a unit price contract, such as proposal 202, a contractor (e.g., proposal creator 160) is paid for the actual quantity of each line item 210 performed as measured in the field during construction. Each unit price includes all costs associated with labor, material, equipment, overhead, and profit attributable to that scope of work.

One of the distinguishing elements of cost estimator platform 172 is the integration of linked dimensions 216 to the relevant parameters 224 which may need to be calculated if any change is made to any line item 210 in terms of quantity or amount or type. Accordingly, the unit price of each line item 210 is automatically updated using accurate and correct calculations that utilize the parameters 224.

For example, in order to calculate costs for an assembly 204 for a "Kitchen", as noted above, the proposal creator 160 would want the kitchen assembly 204 to have the dimensions for the ceiling height parameter 232, as shown in FIG. 2 entered for the whole house so that the kitchen adopts the same ceiling height parameter 232 as the containing house, thus avoiding the error of miscalculating costs related to wall area, cabinet height, and other items included in the kitchen assembly 204 that require the correct ceiling height 232 parameter and associated dimensions. Thus, any change made to the ceiling height parameter 232 (e.g., changing the value entered for the ceiling height parameter 232 to be smaller or greater than originally listed in the proposal 202) causes the proposal 202 to almost automatically (e.g., in real time) show the changes in cost for any line items 210 that include the original ceiling height parameter 232, regardless of whether the line items 210 are listed in the same assembly 204 or not. Under conventional methods, if the client 162 or another party 168 tells the proposal creator 160 that the dimensions used a ceiling height originally used to calculate a variety of costs associated with a variety of line items 210 for a proposal 202 has to be changed (e.g., increased or reduced), it would take a great deal of time for the proposal creator 160 to go back and redo the calculations to calculate the costs 256 associated with every line item 210 that he or she can remember is associated with or dependent upon the correct calculation and use of the correct dimension for the ceiling height 232. Usually, when this occurs, the professional estimator or contractor has to go in and change the entire proposal to make what should be a quick fix and usually manually makes the calculations (which is why conventional construction proposals are very error prone).

The proposal creator 160 would have to take into account the affect a change that one single variable or parameter 224, such as the ceiling height 232, may cause to any materials costs 260 for any materials used, as well as to the costs associated with labor 258, and markup 264 for each line item 210. One of ordinary skill in the art may appreciate now why the proposals 202 take such a great deal of time to generate if they are supposed to be accurate as there are numerous parameters 224 that are interlinked and have to be checked over and over again to ensure accurate calculations of the costs 256.

It is noted that if for some reason, the ceiling height 232 of the kitchen assembly 204 differs from the ceiling height 232 of the whole containing house or other building then the user can unlink that particular dimension, as further explained below with respect to unlinked dimensions 218. Further explanation is also provided below of how each parameter 224 is defined in one or more non-limiting embodiments.

Line items 210 may also include unlinked dimensions 218 to calculate costs 210. Unlinked dimensions 218 may be used in a couple of different situations. For one, unlinked dimensions 218 may commonly be used when a line item 210 has a fixed quantity or dimension, whereby the dimension can be unlinked from a particular parameter 224. For example, when calculating the cost of a window, the size of the window tends to determine the fixed cost of the window. The size (e.g., dimension) of the window does not have to be linked to the parameters 224 listed in FIG. 2. This example is shown in FIG. 12 with respect to itemizing costs 256 for each window that requires services and/or repair or construction in a construction proposal 202. To determine the costs 256 for installing and changing the windows, all the relevant material costs 260, labor costs 258, and other costs are included and associated with the amount or number of windows of that particular size to determine total costs 268. Notably, the interfaces for cost estimator platform 172 include some standard or default dimensions that are listed as linked dimensions 216 for certain line items 210, but the proposal creator 160 can choose to unlink them for an assembly 204 as desired.

Further, an advantage of cost proposal estimator 172 is that the cost proposal estimator application 172 prompts the proposal creator 160 with queries whether the proposal creator 160 wants to link particular parameters 224 or not for multiple line items 210 and assemblies 204. In a sense, the cost proposal estimator application 172 includes artificial intelligence/machine learning that can anticipate when it would be beneficial for parameters 224 t be linked with particular line items 210 depending on the type of line item 210.

Due to the inclusion of linked dimensions 216 and unlinked dimensions 218, the calculation of the costs 256 using cost estimator platform 172 may be described as being "dimension based." That is, after having entered in all of the standard costs 256 as noted above, simply by entering in the required linked dimensions 216 and unlinked dimensions 218, the proposal creator 160, client 162, or another party 168 can easily view the costs 256 for each line item 210, and ultimately the total costs 268 for the proposal 202. The linked dimensions 216 take into account important parameters 224 (e.g., such as ceiling height 232 and many others) when calculating the cost of certain line items 210. The chance for miscalculating and having an inaccurate proposal 202 is reduced because of the use of the necessary linked dimensions 216 to determine costs for each line item 210.

Linked dimensions 218 may be considered to represent dimensions 220 that are unique only to that assembly 204 and its descendants, and that are not relevant to other assemblies 204 of the hierarchy therefore no linking is necessary. FIGS. 8-12 have examples of linked 216 and unlinked dimensions 218.

As noted above, parameters 224 included in cost estimator platform 172 may include any or all of the parameters 224 listed in FIG. 2. Other parameters 224 other than those shown may also be utilized in alternative embodiments. In this case, the parameters 224 or the variables shown in FIG. 2 allow the user to provide values for a measurement of a particular region or location of the underlying property or residence. The parameters 224 shown in FIG. 2 are some of the most common parameters used by contractors (e.g., proposal creators 160) and necessary information for most construction, renovation, and repair projects. However, it is noted that the parameters 224 listed in FIG. 2 is non-limiting and any other parameters 224 may be included in one or more non-limiting embodiments.

The following parameters 224 may be relevant in determining the cost or price of one or more line items 210: floor area 226, ceiling area 228, interior wall perimeter 230, ceiling height 232, interior wall area 234, exterior wall perimeter 236, exterior height to roof 238, an exterior wall area 240, building footprint 242, a roof perimeter length 244, roof surface area 248, lot perimeter 250, lot area 252, and roof pitch 254. Many other parameters 224 other than those listed above may also be included in cost estimator platform 172.

Floor area 226 may relate to a measurement of the area of a floor in either square feet or square meters. Ceiling area 228 may relate to a measurement of the area of a ceiling as calculated in either square feet or square meters. Interior wall perimeter 230 may relate to a measurement of the linear length of an interior wall in either feet or meters. Ceiling height 232 may relate to a measurement for a linear height of a ceiling in either feet or meters. Interior wall area 234 may relate to a measurement for an area of an interior wall as calculated in either square feet or square meters. Exterior wall perimeter 236 may relate to a measurement of the linear length of an exterior wall in either feet or meters. Exterior height to roof 238 may relate to a measurement of the linear height of an exterior wall in either feet or meters. Exterior wall area 240 may relate to a measurement of the area of an exterior wall as calculated in either square feet or square meters. Building footprint 242 may relate to a measurement taken for the area of a building footprint as calculated in either square feet or square meters. Roof perimeter length 244 may relate to a measurement of the linear length of a roof perimeter in either feet or meters. Roof surface area 248 may relate to a measurement taken of the area of a roof surface as calculated in either square feet or square meters. Lot perimeter 250 may relate to measurement of the linear perimeter of a lot as taken in either feet or meters. Lot area 252 may relate to a measurement of the area of a lot as calculated in either square feet or square meters. Roof pitch 254 may relate to a measurement of the roof pitch.

In some cases, one parameter 224 may be determined by using other parameters 224. For example, the interior wall area 234 may be determined by multiplying the measurement entered for the interior wall perimeter 230 by the measurement entered for the ceiling height 232. Similarly, the value for the exterior wall area 240 may be calculated by multiplying the value entered for the exterior wall perimeter 236 by the value entered for the exterior height to roof 238.

Any system of measurement and any unit type may be used in cost estimator platform 172 for any of the parameters 224 and/or dimensions 220 or costs 256. For example, the metric system, which includes the use of meters, grams, and liters, as well as other metric units of measurement, may be used. Alternatively, or additionally, the imperial system, which includes the use of feet, pounds, and gallons, as well as other imperial units of measurement, may also be used. Cost estimator platform 172 may include hundreds of examples of dimensions types that reflect the area, length, volume, height, count, depth, or any other measurement that may be provided, whether it is provided using the metric or the imperial system of measurement. Any area dimension and measurement may be factored in and used in cost estimator platform 172. Further, if a dimensions 220 is entered in one unit of measurement, and a line items 210 that links to it uses a different unit of measurement, cost proposal estimator 172 can automatically convert the original unit of measurement. For example, if you have a lot area as 100 ft$^2$ and a fill depth of 3 inches, then you have an item called fill volume with an equation of (lot area×fill depth) but calculated in cubic yards, cost estimator platform 172 may convert 100 ft$^2$ to yard$^2$ and convert 3 inches to linear yards, and then multiply the two together to reveal the cubic yards of fill required.

Thus, cost estimator platform 172 is capable of performing calculations and has embedded equations that can calculate many significant measurements needed by contractors and other parties when performing a construction, renovation, and repair project. The fields in cost estimator platform 172 may include an embedded equation that provides a correct output once the correct units are entered. Further, calculating interface 222 may include some embedded equations and can calculate the correct output to be include in the fields (e.g., 814 as shown in FIG. 8 or 226 or 230).

Other parameters may include customized dimensions 290, which may relate to any type of parameter or unit of measurement the proposal creator 160 seeks to include in the proposal 202.

Advantageously, in one or more non-limiting embodiments, cost estimator platform 172 includes a converter that can convert measurements entered in the metric system or the imperial system. Further, cost estimator platform 172 can harmonize between calculations that use metric and imperial units of measurement. For example, if a line item 210 calculates the area based on square millimeters (mm$^2$) and the only available measurements is based on square feet (ft$^2$), then cost estimator platform 172 is able to convert the value provided in square feet to square millimeters.

Figure 9:
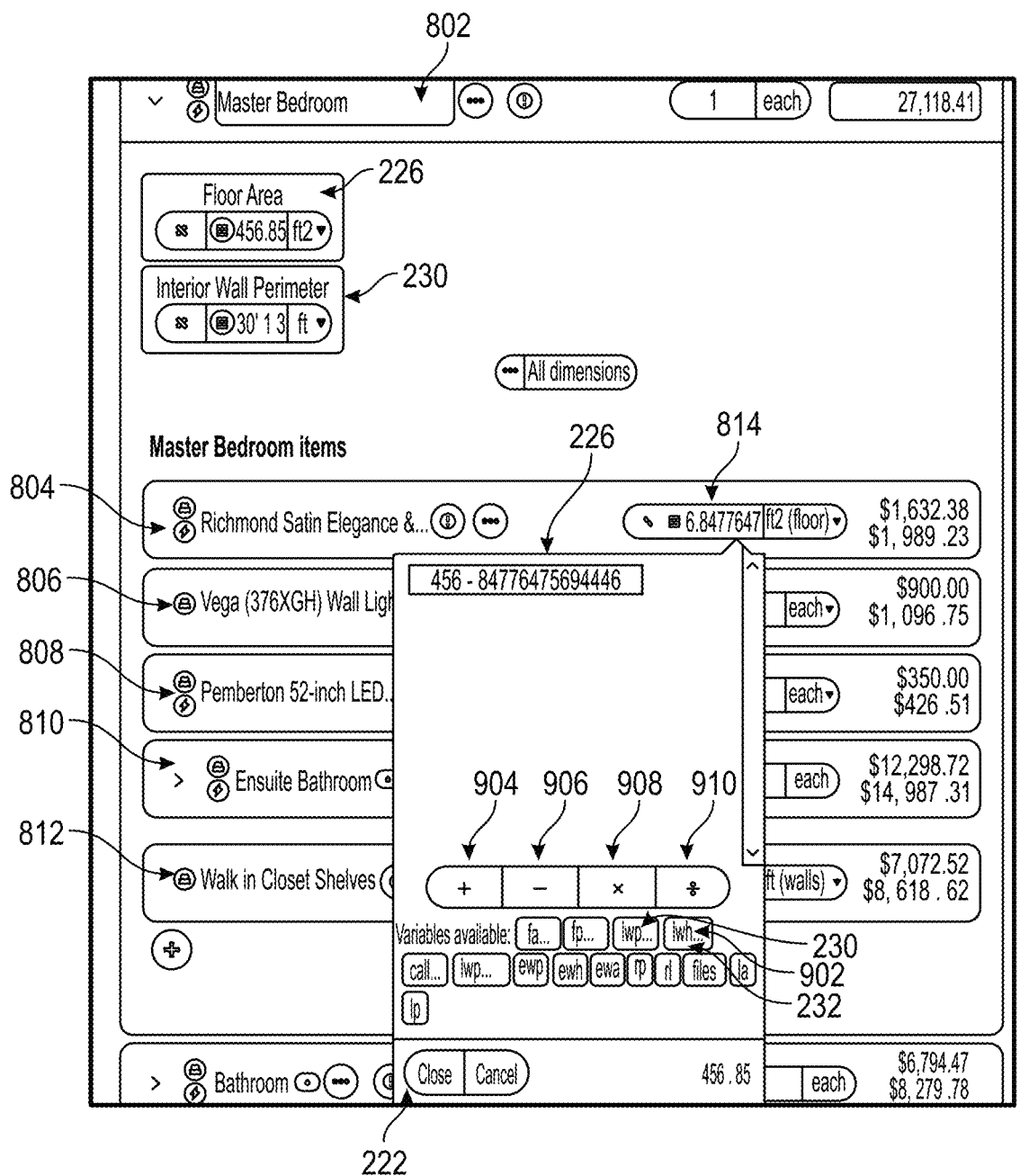
FIG. 9 is a pictorial illustration of an interface in cost estimator platform displaying one or more line items from FIG. 8 and a calculating interface for use in cost estimator platform in accordance with an illustrative embodiment.

Another unique aspect of the cost estimator platform 172 is the calculating interface 222 included in the cost estimator platform 172. Calculating interface 222 (e.g., as shown in FIG. 9 and FIG. 25B) includes multiple unique features that differ from a standard computing calculator. First, the calculating interface 222 includes symbols, such as symbols 902 shown in FIG. 9, that represent one or more parameters 224 shown in FIG. 2. This means that the user may select any one symbol 902, which causes the entered value provided for each parameter 224 selected (e.g., parameters 226-254) to be included and calculated in the specific calculation that is being performed just by including the symbol 902. For example, as shown in FIG. 9, the parameter for ceiling height 232 is shown as "iwh" on the illustrated calculating interface 222, in a non-limiting example. As also shown in FIG. 9, the parameter for "interior wall perimeter" 230 is shown as "iwp" on the illustrated calculating interface 222, in a non-limiting example. Accordingly, each parameter 224 includes an associated symbol (e.g., symbol 902 in FIG. 9) that represents this value or measurement in the calculating interface 222.

Second, calculating interface 222 may appear in any of the entries for the line items 210 and be used to calculate any costs 256 for the line items 210 or any other type of calculation by the user. In addition to the symbols 902 noted above, the calculating interface 222 also includes standard elements and functions of a calculator, including, but not limited to, addition 904, subtraction 906, multiplication 908, and division 910. FIG. 9 shows the calculating interface with these elements.

In addition to the above, the user may add any notes or words to the calculator to visually indicate to the user what any dimensions may refer to. For example, the user may type in both the particular dimensions assigned to parameters 224 and also type in any notes in the calculating interface 222 that help remind the user of the locations or projects that correspond with the entered dimensions. The calculating interface 222 will calculate the numbers and overlook the entered words, but the inclusion of such words or terms may be useful to the proposal creator 160 or another user.

Accordingly, cost estimator platform 172 has organized and integrated the main components necessary for the general contractor (e.g., proposal creator 160) to include all the necessary elements for a proposal 202 for a construction related project with the inclusion of the user of the assemblies 204, line items 210, parameters 224, and costs 256. The use of these modules to organize and include all the necessary dimensions 220 and costs 256 for each line item 210 ensures that the proposal 202 is thoroughly thought out and as accurate as possible.

It is noted that the child line items 210 and child assemblies 204 can both link to either other child line items 210 or other child assemblies 204 or to multiple parent assemblies 204. Further, any dimensions 220 can link to either other child line items 210 or other child assemblies 204 or to multiple parent assemblies 204, such that the dimensions 220 may be linked dimensions 216. Further, any such linking of dimensions 216 may be used in any complex formula such as for example (wall perimeter×wall height (which may be examples of parameters 224)) divided by 2.

Figure 22A:
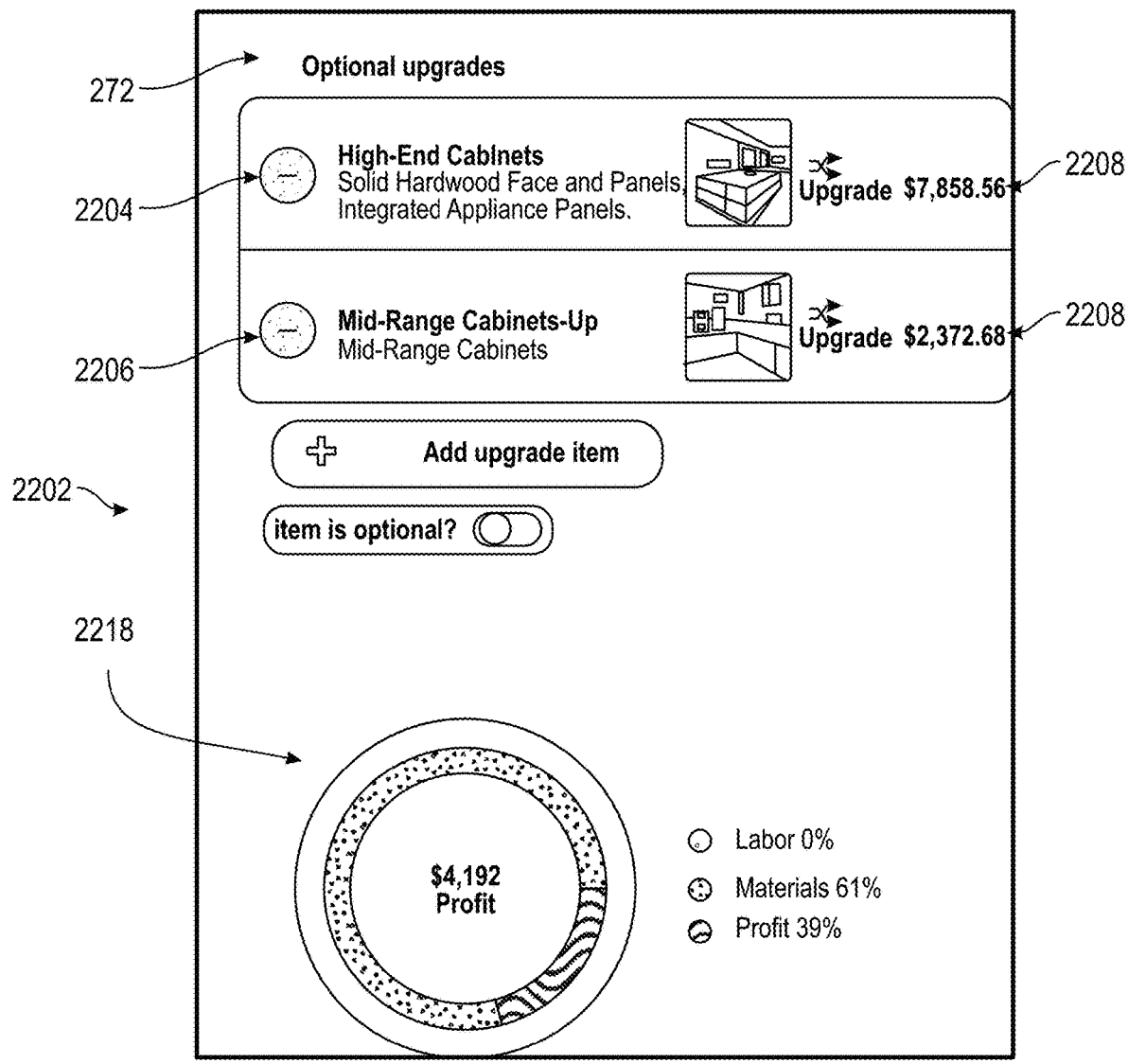
FIG. 22A is a pictorial illustration of an interface displaying optional upgrades in cost estimator platform in accordance with an illustrative embodiment.
Figure 22B:
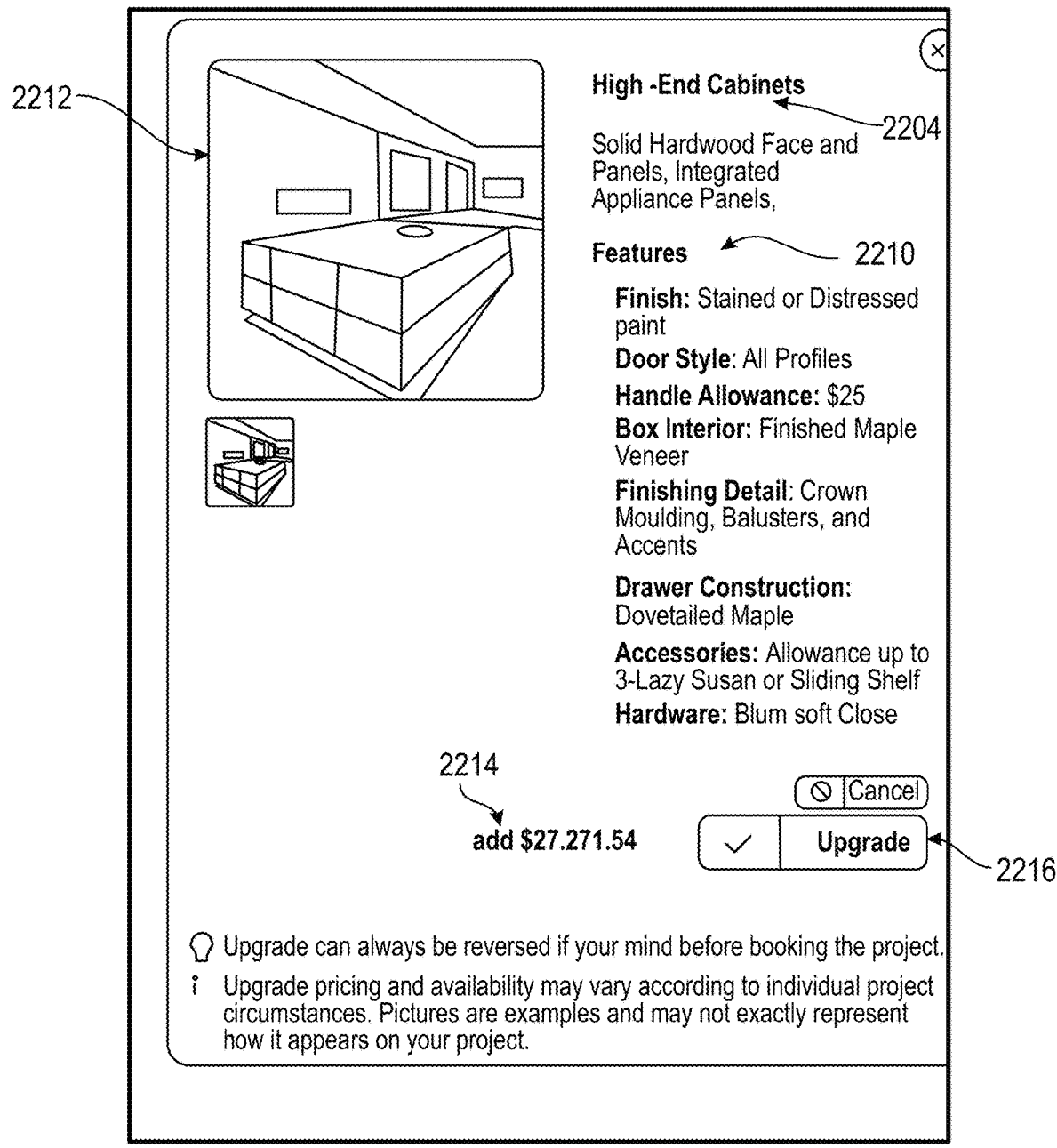
FIG. 22B is a pictorial illustration of an interface displaying an optional upgrade shown in FIG. 22A in detail in accordance with an illustrative embodiment.

Additionally, cost estimator platform 172 allows the proposal creator 160 to easily view and monitor profit margins 270 in the proposal 202 (e.g., as shown in examples shown in FIG. 21 and FIG. 22B). Because each line item 210 may include the markup cost 262, as well as the clear division between labor costs 258 and cost of materials 260 (and any other included costs), cost estimator platform 172 is able to provide interfaces that easily break down the costs 256 and organize them to reflect each cost 256 and the overall expected profit margins 270.

Advantageously, cost estimator platform 172 may also easily allow for the inclusion of upgrades 272 for any assembly 204 and/or line item 210. Upgrades 272 may be set up in the proposal 202 separately or within an assembly 204. The client 162 or another party may easily view the cost addition to the whole proposal 202 when viewing the upgrade 272 and may make the determination whether to add or remove the optional upgrade 272 (e.g., as shown in FIGS. 22A-22B). As noted above, cost estimator platform 172 is intended to be interactive and allows the client 162 to add or remove items, including upgrades 272, and to view the effect of doing so on the total costs 268 for the construction project in real time from the client's 162 computing device 164. This is unheard of for most construction proposals that do not incorporate the system implemented with cost estimator platform 172 in which any upgrades 272 can be easily integrated into an originally quoted price. Anytime re-estimates or changes to an initial construction proposal is made, using conventional methods, a professional estimator or contractor has to separately go back and factor in all of the affected costs in the originally offered construction proposal. With cost estimator platform 172, because the upgrades 272 may be presented as optional line items 210 with linked dimensions 216, the proposal 202 can automatically reflect any cost changes to the client 162 if upgrades 272 are included or are removed.

Upgrades 272 (also referred to as optional line items 210) may also be calculated based on dimensions 220, including linked dimensions 216 and unlinked dimensions 218), so that a unique line item 210 can conform to the specifications of the construction, renovation, or repair project. This is how the proposal 202 can show an accurate total costs 268 and individual costs 266 in real time.

Figure 15:
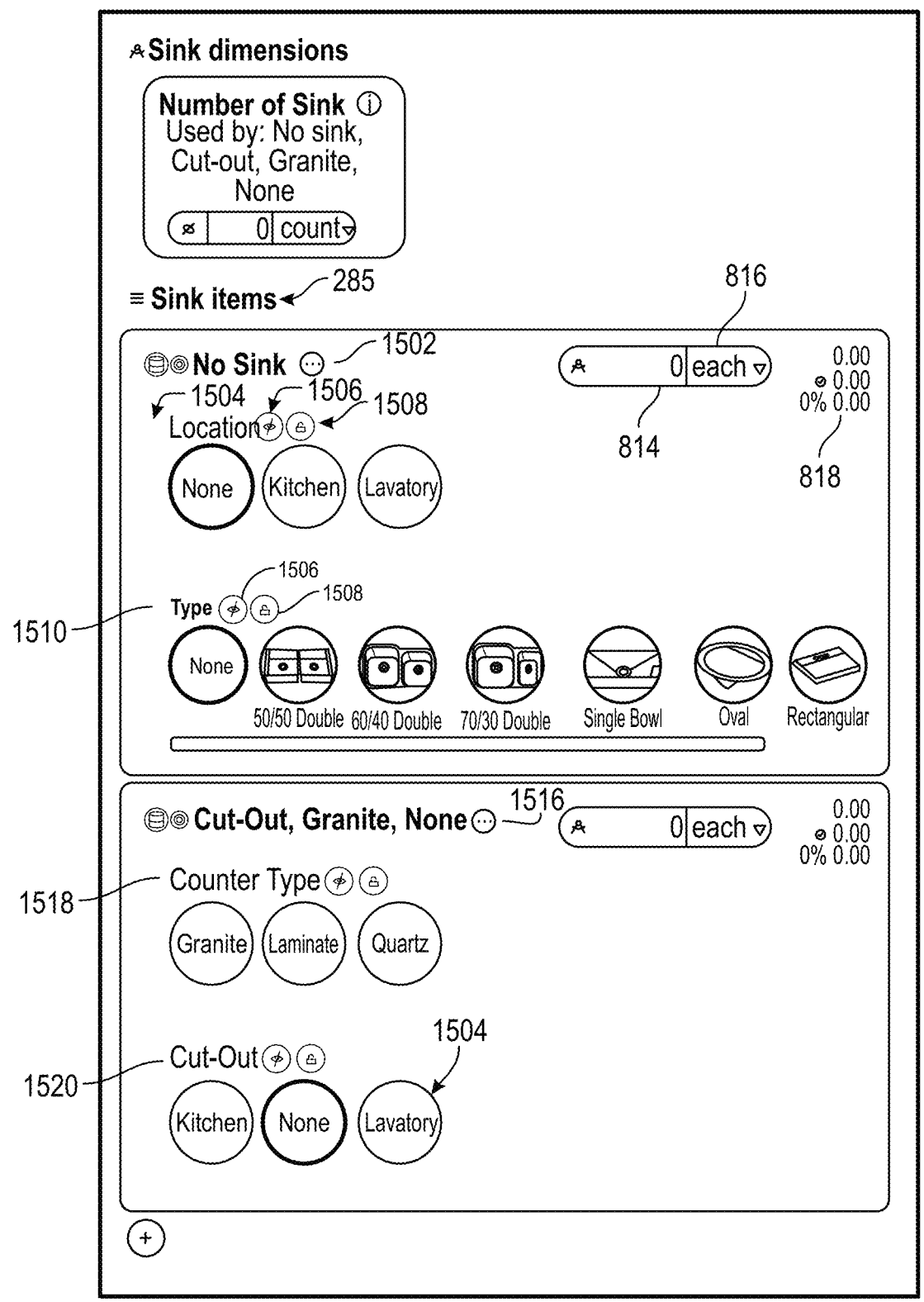
FIG. 15 is a pictorial illustration of an interface for a contractor's perspective on a set of linked selections and built in features in accordance with an illustrative embodiment.

Advantageously, cost estimator platform 172 incorporates linked selections 285. Linked selections 285 may refer to the process of triggering the inclusion or omission of one or more pieces of equipment or materials for a particular line item 210 and/or assembly 204. The inclusion or omission of the one or more pieces of equipment or materials may be in response to a client 162 or other party selecting (or not selecting) a particular selection as provided by the contractor and/or subcontractor 278 (e.g., proposal creator 160). FIGS. 15-17 further show and describe relate to the linked selections 285 and any associated/hidden costs 286 that may need to be accounted for in cost estimator platform 172 so that the proposal 202 is as accurate as possible.

Cost estimator platform 172 may include many other additional beneficial and useful features. In one non-limiting embodiment, cost estimator platform 172 includes a project management interface 274 that allows the user to easily track and monitor any proposal 202 or project. The project management interface 274, as shown in a non-limiting example in FIG. 3, may include multiple embedded interfaces that allow a user to manage and store information related to one's clients 162, subcontractors 278, and vendors 280. Further, the user is able to manage all templates for assemblies 204 and line items 210, including building new assemblies 206 or new line items 212. Further, the user is able to edit and modify any existing assemblies 208 or existing line items 214. In addition, the user is able to monitor any leads, whereby the term "leads" refers to a person or entity that may become a client, but that has not committed to a construction proposal 202 yet.

Further, the user may use the project management interface 274 to monitor any booked proposals 202 and booked projects. Additionally, the user may use the project management interface 274 to view and access any invoices sent or that need to be sent and finalized. Further, the user may use the project management interface 274 to access administrative settings in order to determine who may use cost estimator platform 172 and grant access rights to clients 162 or other parties 168.

Figure 23:
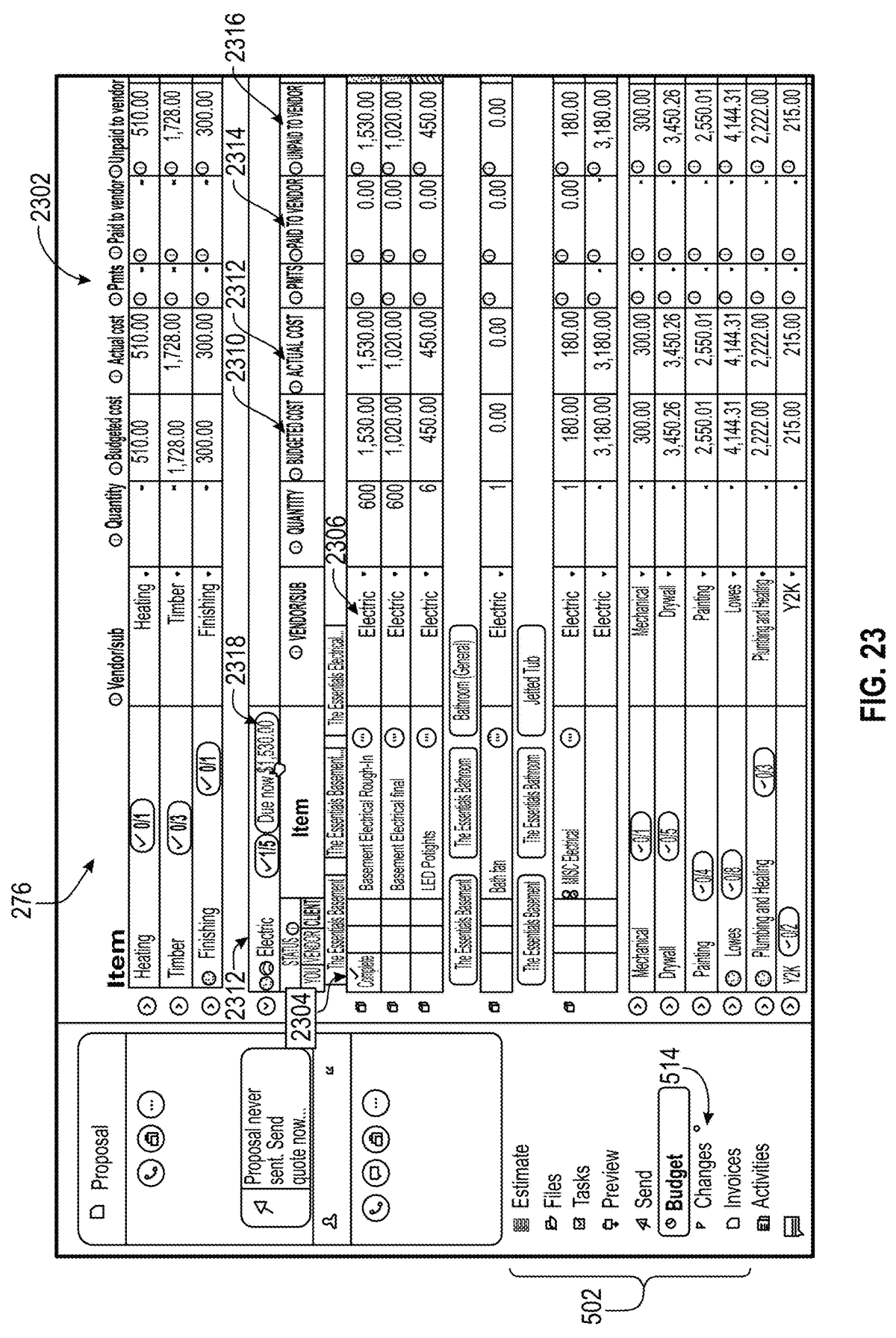

In addition to the above, in one or more non-limiting embodiments, cost estimator platform 172 may provide a payment tracking system 276. Payment tracking system 276 may provide the user with the ability to monitor and track a variety of features related to completion of a construction, renovation, or repair project or job, including amount of hours worked by any subcontractor 278 and/or vendor 280, any phases completed in the overall project as well as amount paid by client 162 to a general contractor (e.g. proposal creator 160) and the amount to be paid to the subcontractor 278 or vendor 280. The user may allow other parties 168, such as subcontractors 278 and vendors 280, to either enter in the information relating to the number of hours and labor provided for any phase of the project or the proposal creator 160 (e.g., general contractor) may enter in that information (e.g., as shown in FIG. 23). Upon completion of any phase of the project and with the inclusion of the number of hours and costs to be paid to a subcontractor 278 or vendor 280, the proposal creator 160 can transfer funds directly to either or both parties. This is a notable advantage of cost estimator platform 172 that any funds from the client may be clearly allocated for each subcontractor 278 or vendor 280 and transferred to the subcontractor 278 or vendor 280 once the work is completed or payment is due. The cost estimator platform 172 may thus include an interface for tracking the performance of each phase of a construction project on a property and the completion of one or line item 210 for any assembly 204. Further, the user may monitor the number of hours, the labor, and the materials purchased for the construction project and determine when to send the payment to the appropriate party.

Further, in one non-limiting embodiment, the payment tracking system 276 may be set up as an escrow style payment tracking system. Accordingly, the client 162 may direct the general funds to a bank account associated with the proposal creator 160. Once the proposal creator 160 has received and approved the labor rates, number of hours, and/or costs 256 provided from a subcontractor 278 or vendor 280 that still needs to be paid, the approval of the entered information in cost estimator platform (e.g., via the payment tracking system 276 interfaces) may cause the necessary funds to be routed from the bank account of a general contractor or another account where client funds are stored to the corresponding subcontractor 278 or vendor 280. Accordingly, this reduces the hassle in having separate computer programs or systems dedicated to monitoring costs associated with labor 258 and materials 260 for subcontractors 278 and vendors 280. Further, this may reduce disputes between the general contractors and the subcontractors 278 and/or vendors 280 about payment, because payment may be ensured to be provided to the designated party once the work has been completed and logged into cost estimator platform 172.

Another unique feature of the cost estimator platform 172 is its audit system 282. Cost estimator platform 172 includes its own audit system 282 that verifies the accuracy of individual costs of each line item (e.g., individual cost 818 shown in FIG. 8) and the total costs 268 calculated for the proposal 202 (e.g., as shown in FIG. 21). Further, the audit system 282 may use, in one or more non-limiting embodiment, a cascading audit system that can adjust any changes in a hierarchical way. Accordingly, any needed changes may travel or cascade up or down the different assemblies 202 in the proposal 202 in a hierarchical and logical manner so that the changes in cost and price for each assembly 204 are reflected appropriately. In some cases, partial audits may be calculated, so that an audit is performed only partially in certain assemblies 204 in order to save time and memory. The audit system 282 may thus skip certain assemblies 204 and included line items 210 in some cases that do not need to be audited.

It is noted that there may be a presentation of proposal 202 specific to each intended user. For example, there may be a version of proposal 202 that is visible only to the general contractor (e.g., proposal creator 160) or anyone authorized by the general contractor. Further, there may be a version of the proposal 202 specifically intended to be visible to the client 162. The authorized version of the proposal 202 accessible by the client 162 may differ in some respects. For example, in one or more non-limiting embodiments, the client version of the proposal 202 may not necessarily show the markup cost in detail for each item as the client 162 does not need to know this information in detail. Other features better suited to the general contractor's knowledge or that need to be kept private may also not be included or visible to the client 162. Many other unique feature and advantages are included in cost estimator platform 172 and will be discussed further below with respect to FIG. 3-FIG. 26.

Figure 3:
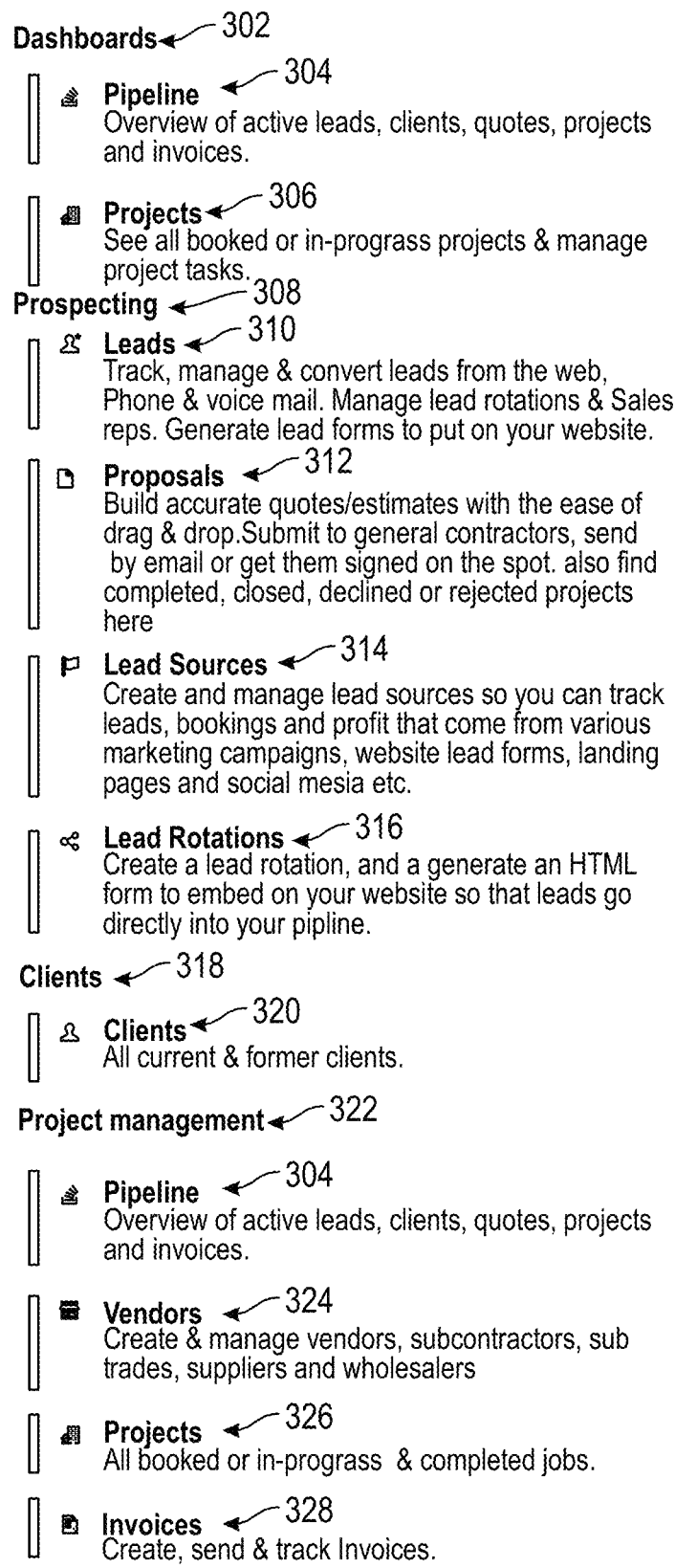
FIG. 3 is a pictorial illustration of an example project management interface that may be available in cost estimator platform in accordance with an illustrative embodiment.

Turning to FIG. 3, FIG. 3 provides a pictorial illustration of an exemplary management interface that may be used in one or more non-limiting embodiments. The management interface provided in FIG. 3 may be an example of project management interface 274 as described above in FIG. 2.

As shown by the various items in project management interface 274 in FIG. 3 and as further discussed below, cost estimator platform 172 may also be considered a Customer Relationship Management (CRM) tool and acts as key technology for managing the user's (e.g., proposal creator 160) relationships and interactions with clients 162 and any other party of relevance to the user.

Project management interface 274, in one or more non-limiting embodiments, may include a selectable interface with selectable tabs or built-in modules for various general features of relevance to the proposal creator 160 or another user. In one or more non-limiting embodiments, these selectable interfaces and/or built in modules may be listed as dashboard 302, prospecting 308, clients 318, project management 322, estimating 330, files 340, team management 346, and "my settings" 352. Further there may be additional sections in the project management interface 274 for legal agreements 370.

Dashboard 302 may include pipeline 304, which may be an overview of any active leads, clients, quotes, projects, or invoices. Projects 306 may include any booked or in-progress projects and allow the user to manage any project related tasks.

Prospecting 308 may include leads 310, proposals 312, lead sources 314, and lead rotations 316. Prospecting 308 may be the tab or interface that the proposal creator 160 refers to in order to manage and obtain information related to any leads. Leads 310, for example, may allow the user to track, manage, and convert leads from the internet, phone, or voicemail and include any forms related to leads. Proposals 312 may be the tab in cost estimator platform 172 that the user refers to in order to build and set up a proposal, such as proposal 202 shown and described with respect to FIG. 2 above. Once created, the user is able to send the preferred version of proposal 202 to the client 162 for review and approval or further editing.

Lead sources 314 may allow the user to create and manage lead sources in order to track leads, bookings, and profit that comes from various marketing campaigns, website lead forms, social media, or other sources of leads and lead information. Lead rotations 316 may allow the user to create a lead rotation and generate a form that is embeddable in the user's website that allows an information provided from leads to be entered directly in cost estimator platform 172, and in pipeline 304 in particular.

Clients 318 may be the tab or interface the user selects to obtain and manage any contact information or other saved information relating to one's current and former clients.

The project management tab 322 may include another reference to pipeline 304, vendors 324, projects 326, and invoices 328. In the vendors 324 tab, the user may be able to enter and manage any relevant information regarding vendors, such as vendors 280 as shown in FIG. 2 and discussed above. Projects 326 may provide a tab or interface for the user to view all booked, in-progress, and completed projects or jobs. Invoices 328 may allow the user (e.g., a contractor or subcontractor) to create, manage, send, and track any invoices, including, invoices that may be sent to clients 162, as shown in FIG. 1, or other parties.

The estimating 330 interface may include a designated area for line items and assemblies 332. In one non-limiting embodiment, line items and assemblies 332 may be an interface that allows the user to manage an existing database of construction related line items, such as line items 210 in FIG. 2 and assemblies, such as assemblies 204 in FIG. 2. As noted above, cost estimator platform 172 may include thousands of existing assemblies 208 and line items 214 templates for the user to view and add to. Further, the user may create their own new assemblies 206 or new line items 212 as desired. In addition, it is possible for the user to turn off certain assemblies 204 that are not needed by the user to save time when searching through the cost estimator platform 172. Similarly, item collections 334 allows the user to manage the collection of assemblies 204 and line items 210 that are most relevant to the user's business or purpose.

Labor rates 336 may allow the user to assign a labor rate type to certain line items 210 and to include average labor costs. This may be useful for the user who knows what the aggregated average labor rates are for a given project. If this is unknown, cost estimator platform 172 may provide built in rates that the user may refer to instead or provide on his or her own.

Estimating and presentation settings 338 may allow the user to set default markup costs 262. Further, estimating and presentation settings 338 may allow the user to set up default proposal 202 settings as well as minimum margin thresholds and any other price settings related to estimating as needed.

Files 340 may be a tab that allows the user to access and manage relevant files. Files 342 may allow the user to drag and drop file storage and management in the cloud. Templates and presentations 344 may allow the user to create and manage proposal presentations, email templates, and document templates for proposals, such as proposal 202, invoices, receipts, or any other item that the user would like to create a template for.

Team management 346 may include users 348 and roles 350. The proposal creator 160 and/or another administrative entity (e.g., administrative entity 170 as shown in FIG. 1) may manage authorized users, reset passwords, and set roles and permissions. In roles 350, the user may create, edit, and manage and user roles with the set of permissions assigned according to position and authorization in one's company or based on other relevant criteria.

The "my settings" 352 tab allows the user to manage his or her profile information and any visible information related to the user. The "help" tab may allow the user to access technical support and assistance from the administrative entity 170 who may provide assistance to the proposal creator 160, client 162 or other party 168, such as a subcontractor 278 or vendor 280 who has been given access to cost estimator platform 172.

Project management interface 274 as shown in FIG. 3 is an example of an interface that may be provided to manage and track the various tasks and projects created using Cost Estimator Platform 172. One of ordinary skill in the art may foresee other items and features being included in other embodiments of the project management interface 274 that are within the scope of the present invention, as well as alternative ways for displaying any of the above items included in project management interface 274.

Figure 4:
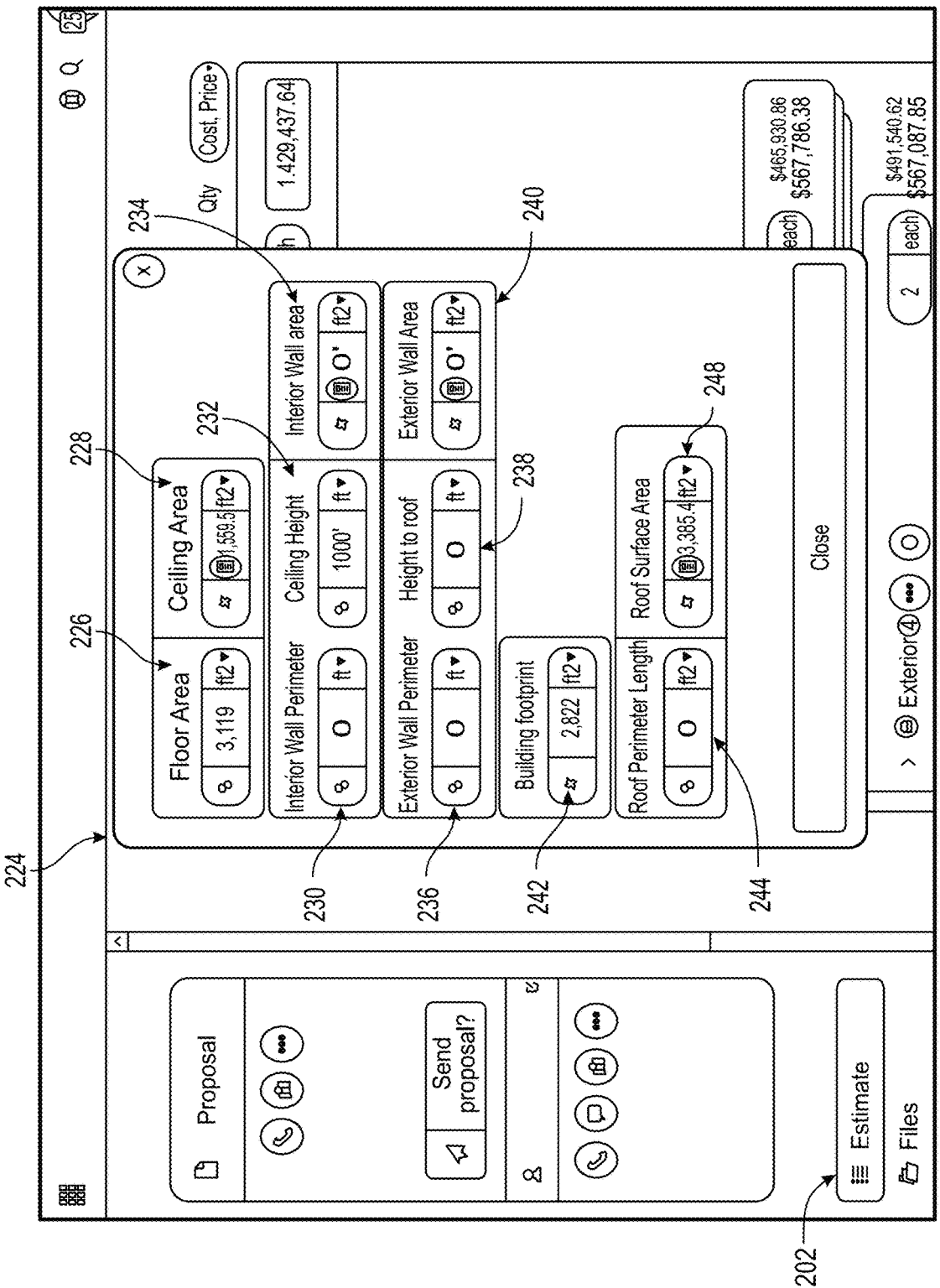
FIG. 4 is a pictorial illustration of a set of displayed parameters in an interface that may be available in cost estimator platform in accordance with an illustrative embodiment.

Turning to FIG. 4, FIG. 4 shows an exemplary view of an interface displaying various parameters, such as parameters 224. As shown in FIG. 4, proposal 202 may include an interface that displays the parameters 224 for any assembly 204 and/or line item 210, as shown in FIG. 2 and previously discussed above. Parameters 226-248 are shown in FIG. 4 with associated fields that can be used to enter the relevant field values (e.g., numbers) for these parameters 226-248. Such interfaces may be accessible throughout the proposal 202 when using cost estimator platform 172 so that the user can clearly see what values have been entered for any relevant parameters 224 in an assembly 204 and for each specific line item 210 (e.g., as discussed below with respect to FIGS. 8-14B).

Figure 5:
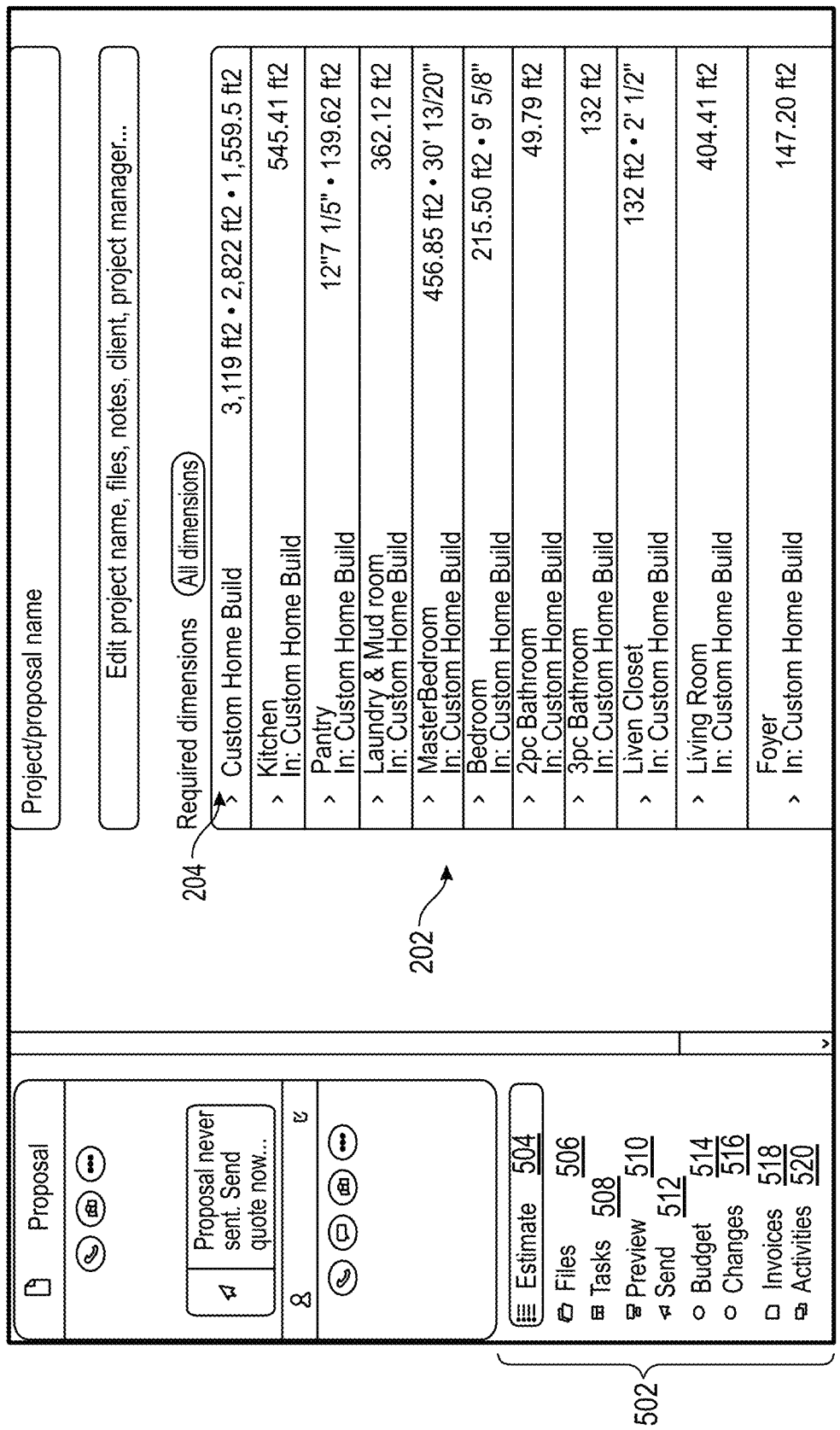
FIG. 5 is a pictorial illustration of an interface with a set of sample assemblies that may be available in cost estimator platform in accordance with an illustrative embodiment.

Turning to FIG. 5 and FIG. 6, FIG. 5 and FIG. 6 show examples of assemblies that may be selected or created using cost estimator platform 172. The listed assemblies 204 are merely examples of thousands of potential assemblies 204 that may be selected in cost estimator platform 172. As noted above, the user may choose to build a new assembly 206 using a model in cost estimator platform 172 (e.g., by accessing the items and assemblies 332 tab in the project management interface 272 as shown in FIG. 3). Alternatively, the user can select from an existing assembly 208 that may have the useful descriptions and features for any relevant line items 210 the user wants to include for a specific construction project.

As shown in FIGS. 5-6, the user may include assemblies 204 whether they relate to interior or exterior locations of a house or other building. The interface shown in FIG. 5 shows that assemblies 204 each have labels or titles assigned to them representing a particular area of a house or other location or a phase of a project. Examples of assemblies 204 that may be relevant to a construction project include, but are not limited to, an assembly for a custom home build, a kitchen, a pantry, a laundry and mud room, a master bedroom, a regular bedroom, bathrooms, linen closets, living rooms, foyers, dens, hallways, stairways. Examples of exterior assemblies of relevance to a user (e.g., proposal creator 160) may include assemblies 204 specific to the foundation, general exterior, decks, or any other description for an exterior based construction project. As noted above, there is no rule as to what label may qualify as either an assembly or line item 210 per se. The user is free to label any assembly 204 as desired and any line item 210 as desired. Further, cost estimator platform 172 may have template assemblies 204 the user can choose from in building a proposal 202. Nevertheless, it may be logical for the user to label the assemblies 204 to relate to a specific location or room in a property or a specific phase or stage of construction, and for the line items 210 to represent a fixture or service needed to complete the construction, renovation, or repair of that assembly 204.

FIG. 5 also shows that the user may quickly access various tabs via a menu bar such as menu bar 502 with relevant headings that may be of interest to a proposal creator 160 or another user. For example, estimate 504 may allow a user to access any proposal 202 of interest to the user. Files 506 may allow the user to access one or more files saved and stored in cost estimator platform 172. Tasks 508 may allow the user to access an interface that lists any pending or completed tasks of interest to the user. Preview 510 may allow the user to preview how the proposal 202 will appear to a client 162 or another party 168. Send 512 may take the user to the interface that allow the user to send the proposal 202 to a client 162 or another party 168 (e.g., a subcontractor 278 or vendor 280).

Figure 18:
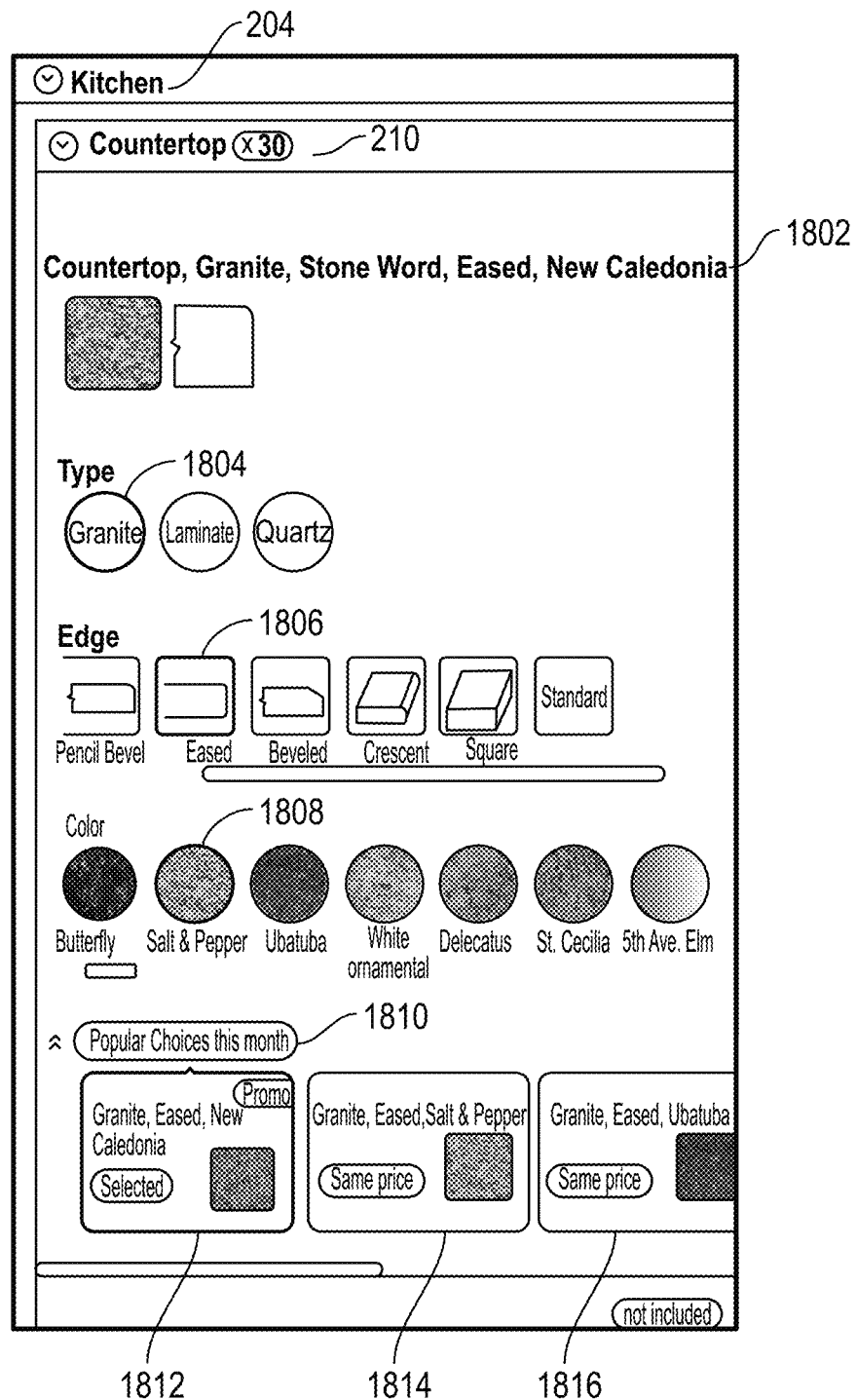
FIG. 18 is a pictorial illustration of a set of options available to the customer included in the cost estimator platform in accordance with an illustrative embodiment.

Budget 514 may take the user to an interface that includes details about the budget of the proposal 202 including details about any cash flow and payments that need to be made to subcontractors 278 or vendors 280 (e.g., as shown in FIG. 18).

Changes 516 may allow the user to view the effects of any changes had on a proposal 202 including any changes to the values to any of the parameters 224, linked dimensions 216, and unlinked dimensions 218. Further, the changes tab 516 may allow the user to see the effect of changes to various costs, as further discussed below with respect to FIG. 20.

Invoices 518 tab in menu bar 502 may provide the user, such as proposal creator 160 or another interested user (e.g., subcontractors 278 and vendors 280) with access to the invoices 518 section of cost estimator platform 172 to view the invoices or make any necessary changes to any invoices.

Turning to FIG. 7, FIG. 7 is a pictorial illustration of an interface that may appear to the user in cost estimator platform 172 that displays various required linked dimensions and the corresponding assemblies that the linked dimensions may be found in. Kitchen 702 and Pantry 704 are some examples of the type of assemblies 204 that may be set up in a proposal 202.

As shown in FIG. 7, kitchen 702 is an example of an assembly 204 where it may be important to know what the values for certain parameters 224 are in order to properly calculate the costs associated with the construction, renovation, or repair of kitchen 702. Accordingly, an interface in cost estimator platform 172 may include a cell or field, such as field 706, to enter in the value for the floor area parameter 226 associated with the kitchen 702. As shown in this example, the value "545.41" is entered into the field 706 for the floor area parameter 226 alongside the unit of measurement type 708 used to describe the floor area parameter 226, which is shown as being in square feet. As noted above, the metric system may be selected instead, and this entered value 706 may be converted to square meters.

The "545.41" square feet value in field 706 may have been obtained by proposal creator 160, a subcontractor 278, or another party taking measurements of the floor area of the kitchen 702. The proposal creator 160 may be the one responsible for obtaining any necessary measurements and entering them into the proposal 202, however, these measurements may also be entered or provided by a subcontractor 278, vendor 280, or even in some cases, the client 162.

Pantry assembly 704 is another example of an assembly 204, whereby in order to determine the costs for any construction, renovation, or repair work of the pantry assembly 704, it is important to know the interior wall perimeter parameter 230 and the floor area 226, as shown in FIG. 7. These are examples of parameters 224 that may be used without limitation thereto. The user may enter in the obtained measurements in the respective fields 706 for the interior wall perimeter parameter 230 and floor area parameter 226. As further discussed below, these parameters 224 may be linked to fields (e.g., fields 814 in FIG. 8) in one or more line items 210 that may be used to calculate the costs of each line item 210 listed under each assembly 204.

Turning to FIGS. 8-11, FIGS. 8-11 relate to the same example assembly, namely "Master Bedroom" assembly 802 and its listed line items 804-812, and various example interfaces that may be provided in cost estimator platform 172 for such assemblies and line items. In the interface shown in FIG. 8, "Master Bedroom" 802 is an example of an assembly 204 on which construction, renovation, or repairs are needed. In this assembly 802, any costs associated with the work for the construction work specifically related to "Master Bedroom" 802 may be specifically detailed and outlined for the client 160 or other party 168. The interface shown in FIG. 8 shows a listing of line items 804-812 that relate to one or more phases or stages of the construction, renovation, and/or repair work for "Master Bedroom" 802. Line items 804-812 correspond to line items 210 as discussed above with respect to FIG. 2.

The interface in FIG. 8 shows the relevant required parameters 224, namely parameters 226 and 230, needed to calculate one or more costs for one or more line items 804-812 as listed in assembly 802. Each line item 804-812 has a corresponding dimension field 814 in which the user may enter in a value that corresponds with a linked dimension, such as linked dimension 216, or an unlinked dimension, such as unlinked dimensions 218. The dimensions field 814 corresponds to an entry in cost estimator interface 172 for the user to enter in the necessary dimensions 220 as discussed above with respect to FIG. 2. Each dimension field 814 allows the user to either enter in an amount or quantity needed for the line item or to link the dimension to an existing parameter 224, such as the existing parameters 226 and 230 shown in FIG. 8. The unit of measurement type 816 is also displayed next to the dimensions field 814.

Line item 804 (i.e., "Richmond Satin Elegance") refers to a specific type of carpet that the client 162 or other user wants to have installed in the "Master Bedroom". In the carpet line item 804, the dimension field 814 has a value of "456.85" and the unit of measurement type 816 is displayed in square feet. The value "456.85" corresponds and is linked to the floor area parameter 226 noted in the same interface and included with "Master Bedroom" assembly 802, which indicates that the floor area of the "Master Bedroom" assembly 802 is "456.85" square feet. Similarly, walk in closet shelves 812 is another line item with a linked dimension field 814, because line item 812 is linked to the value entered and shown in the same interface for the interior wall perimeter 230, namely, "30.10" feet, which indicates that the interior wall perimeter of the closet shelves is "30.10" feet. These measurements are very relevant to determining the labor and material costs, and other costs, needed to calculate the individual costs for the associated line item.

Line items 806-810 also have quantity values entered in their respective dimension fields 814. Line items 806-810 are examples of unlinked dimensions 218, because these dimensions are not linked to any particular parameter 224. Rather, a user may enter a quantity or amount needed for each line item 806-810. For example, line item 806 shows that 2 wall lights are needed for the "Master Bedroom" assembly 802. For unlinked dimensions 218, the user may enter and change the quantities needed as desired as shown, for example, in the dimension fields 814 for line items 806-810 and also shown in FIGS. 12-13 and discussed further below.

It is noted that if the user desires, the user can always choose to link or unlink a value entered into a dimension field 814 to a parameter 224 or another dimension even if the template or existing model does not initially have it set up that way. The user is provided with the freedom to make these changes within cost estimator platform 172 to link and unlink dimensions to parameters 224 or other variables or fields.

FIG. 8 also shows the individual costs 818 associated with each line item 804-812. The individual costs 818 are the total cost of each line item as paid by the client 162, whereas the value represented by the displayed entry 820 is the amount paid by the proposal creator 160, who is usually the general contractor. Advantageously, cost estimator platform 172 may display the cost that the client pays, shown as displayed entry 818 and the cost that the general contractor is responsible for, shown as displayed entry 820, without the built in profit or markup. Accordingly, in one or more non-limiting embodiments, the individual costs 818 for each line item 210 (e.g., 804-812) are displayed having the combined costs of labor 258, materials 260, and markup 262 included in the calculation to achieve the individual costs 818, which is further discussed below with respect to FIG. 11.

FIG. 9 shows the same assembly 804 and line items 804-812 of FIG. 8. FIG. 9 further shows an example of a calculating interface that may be used to calculate one or more calculations. Calculating interface 902 may function and operate in accordance with calculating interface 222 as described above with respect to FIG. 2.

Calculating interface 902 is a calculator designed specifically for cost estimator platform 172. Calculating interface 902 includes standard elements to represent addition 904, subtraction 906, multiplication 908, and division 910, all of which are functions that may be performed using calculating interface 902.

Notably, calculating interface 902 further includes symbols, such as symbols 902 that correspond to each parameter 224. For example, "iwh" displayed in calculating interface 902 is a type of symbol 902 that may correspond to the ceiling height 232 parameter. As another example, "iwp" displayed in calculating interface 902 is a type of symbol 902 that may correspond to the interior wall perimeter parameter 230. In a non-limiting embodiment, a user may select each symbol 902 in lieu of typing in a numerical value, and the calculating interface 902 can link to the corresponding parameter 224 and draw from the value entered elsewhere for the corresponding parameter 224. Additionally, or alternatively, calculating interface 902 may use numerical values, as shown in FIG. 9.

A calculator, such as calculating interface 902, may conveniently be selectable from any field that includes a numerical value and/or calculation so that the user may use the functions 904-910 of the calculator 902 and connect with any parameters 224 as needed or make any calculations as needed when preparing or editing proposal 202.

Turning to FIG. 10, FIG. 10 shows an example of another more detailed interface, such as interface 1002, that may be selected for any line item 210. Interface 1002 as shown in FIG. 10 serves various functions. First, interface 1002 may allow the user (e.g., general contractor 160) to provide specific details regarding each line item 210. As shown in FIG. 10, the line item 804 for the carpet that will be included in the Master Bedroom assembly 802 includes the same item name or title as the title for the line item 804 as shown in the interface of FIG. 8 and FIG. 9 that generally lists line item 804 without all of the details of interface 1002.

In the interface 1002, a user may also provide further relevant and helpful information such as a general description 1004 of the carpet line item 804. Further, the user may provide more details about the attributes 1006 of the line item 804 (e.g., weight, type of material, warranties, etc.). These relevant pieces of information for each line item 210 may be particularly appreciated by the client 162 when viewing the proposal 202 because it provides greater detail and understanding for the client 162 about what they are getting and what the construction, renovation, and/or repair in their home or other property entails. Such level of fine details is often lacking from existing construction related proposals and estimates and may ensure there is less confusion and misunderstanding between proposal creators 160 and clients 162 as well as the subcontractors 278 and vendors 280.

In one or more non-limiting embodiments, the interface 1002 shown in FIG. 10 is the upper half of interface 1002 for a line item 210 (e.g., line item 804). Turning to FIG. 11, FIG. 11 is a pictorial illustration of a lower half of interface 1002. FIG. 11 displays an important piece of cost estimator platform 172, because FIG. 11 shows how various important costs 256 related to the labor 258, materials 260, and markup 262 for each line item 210 may be accounted for. Interface 1002 for any line item 210 may include a number of additional elements, as shown in FIG. 11. Further, it is noted that interface 1002 as shown in FIG. 11 may include one or more selectors 1103 for adding any pictures or files relating to the material goods or services described in line item 804.

As shown in FIG. 11, interface 1002 may display the dimension field 814 entered in FIG. 8 for the specific line item 210 (e.g., line item 804). As explained above with respect to FIG. 8, the dimension field 814 draws from a value entered for an existing parameter 224 included in the assembly 204 or from the entered quantity provided in the dimension field 814.

Interface 1002 may further include a selectable field 1104 for the construction stage or type of line item. For example, as shown in FIG. 11, line item 804 is associated with the "Carpet" construction stage 1104. Cost estimator platform 172 may include a great number of general categories or phases of construction that may be used to describe any line item 210 (e.g., Windows, Foundation, Landscaping, Flooring, etc.).

Notably, interface 1002 includes the necessary costs 256 associated with labor 258 and materials 260. Element 1106 and element 1108 may relate, respectively, with the costs of labor 258 and materials 260 for each line item 210. Element 1110 may reflect the subcontractor costs for completing a line item in terms of the combined cost of labor 258 and materials 260 per unit of measurement type (e.g., unit of measurement type 816 as shown in FIG. 8). Accordingly, in FIG. 11, the subcontractor costs amount to $3.57 per square feet of carpet installed. Additionally, the interface 1002 includes an entry for total anticipated or estimated hours 1118 of labor. The interface 1002 may be able to draw from this provided estimated hours 1118 of labor as entered in another interface within cost estimator platform 172, or alternatively, as entered in the same interface 1002.

The combined costs 1112 of labor and materials may be the same as subcontractor costs 1110 or they may differ in some instances. Notably, the user (e.g., general contractor 160) may include his or her markup costs 1114 to generate the total price 1116 for each line item 210 as calculated in cost per unit type. For example, the "$4.35" per square foot value shown in FIG. 11 for the total price 1116 may reflect the cost to install the carpet in the "Master Bedroom" 804 with the markup costs 1114 included. It is noted that markup 1114 may correspond with markup costs 262 as described above in FIG. 2.

Advantageously, the line item interface 1002 shown in FIG. 10-11 displays the individual cost 818 of the line item 210, whereby the individual cost 818 of the line item 210 is the total cost in dollars (or another type of currency). Accordingly, each field for the individual cost 818 of each line item may include a formula that multiples the values provided in the dimension field 814 (e.g., shown in FIG. 8 and FIG. 11) by the value provided in the total price field 1116 for each line item 210. In the case of carpet line item 804, the "456.85" square feet value (i.e. the floor area parameter 226) is multiplied by the total price field 1116 after labor 258, materials 260, and markup 262 are included to produce the "$1,989.23" individual cost 818 shown in FIG. 8.

To reiterate, the "$1,928.23" is the cost the client (e.g., client 160) pays to the general contractor (e.g. proposal creator 160) with the cost of labor, materials, and markup included. The markup cost 262 is usually included so that the general contractor or other user can make a profit. Advantageously, cost estimator platform 172, can help the user determine if the profit based on the markup 262 is too low for any one line item 210 or assembly 204. For example, the interface 1002 may include a display box, such as display box 1008 shown in FIG. 10, that indicates when the profit on a line item, such as line item 804, is less than the minimum margin allowed by the user (e.g. proposal creator 160). The user may always increase the entered default minimum margins or otherwise edit them as the user pleases, for example, by accessing the corresponding tabs in project management interface 274 of cost estimator platform 172.

Thus, FIGS. 8-11 show how cost estimator platform 172 may use values associated with parameters 224 to link to dimension fields (e.g., dimension field 814 shown in FIG. 8) in combination with the determined costs 256 for labor 258, materials 260, and markup costs 262 (e.g., 1112 shown in FIG. 11) for each line item 210 to calculate the individual costs 818 of each line item 210.

FIG. 12-13 shows how cost estimator platform 172 may also perform a similar calculation when quantities are entered in dimension fields 814 that are not linked to parameters 224 and are thus considered unlinked dimensions 218. In FIG. 12, assembly 204 relates to any windows in a house or property that may need repair or installation. Each line item in the proposal 202 related to windows assembly 204 may be grouped together if desired as shown in FIG. 12. Alternatively, it is noted that a user may rather list any windows that need repair and/or installation as line items 210 associated with the specific room or location in one's home or property in the proposal 202. The user has the freedom to choose how to display such details.

Line item 1202, which relates to a particular window size and type and is an example of line item 210 shown in FIG. 2 and discussed above, may include a dimension field 814 for the user to enter a quantity value (e.g. "1" as shown in FIG. 12 and FIG. 13 for line item 1202) to represent the number of windows needed in that particular size and type of window associated with the line item 1202. The field value 816 may indicate the unit to describe the dimension field 814. As shown in FIG. 13, an interface, such as interface 1002, and as described with respect to FIG. 11, may include the total price 1116 after including costs related to labor 258, materials 260, and markup costs 262 for the window based line item 1202. The individual cost 818 of the line item 1202 may be obtained by multiplying the quantity value entered in the dimension field 814 with the total price 1116 shown in the interface 1002 (e.g., 1 multiplied by $528.27). Accordingly, cost estimator platform 172 may calculate the individual costs of line items 210 whether they use linked dimensions 216 (e.g., as shown in FIGS. 8-11) or unlinked dimensions 218 (e.g., as shown in FIGS. 12-13).

Notably, cost estimator platform 172 is uniquely and purposefully structured in a way that any changes that affect the individual costs 818 of a line item 210 may be shown in real time to the proposal creator 160, client 162, or any other party (e.g., other party 168), which has not been an option available before with construction proposals that are not created using cost estimator platform 172.

Figure 14A:
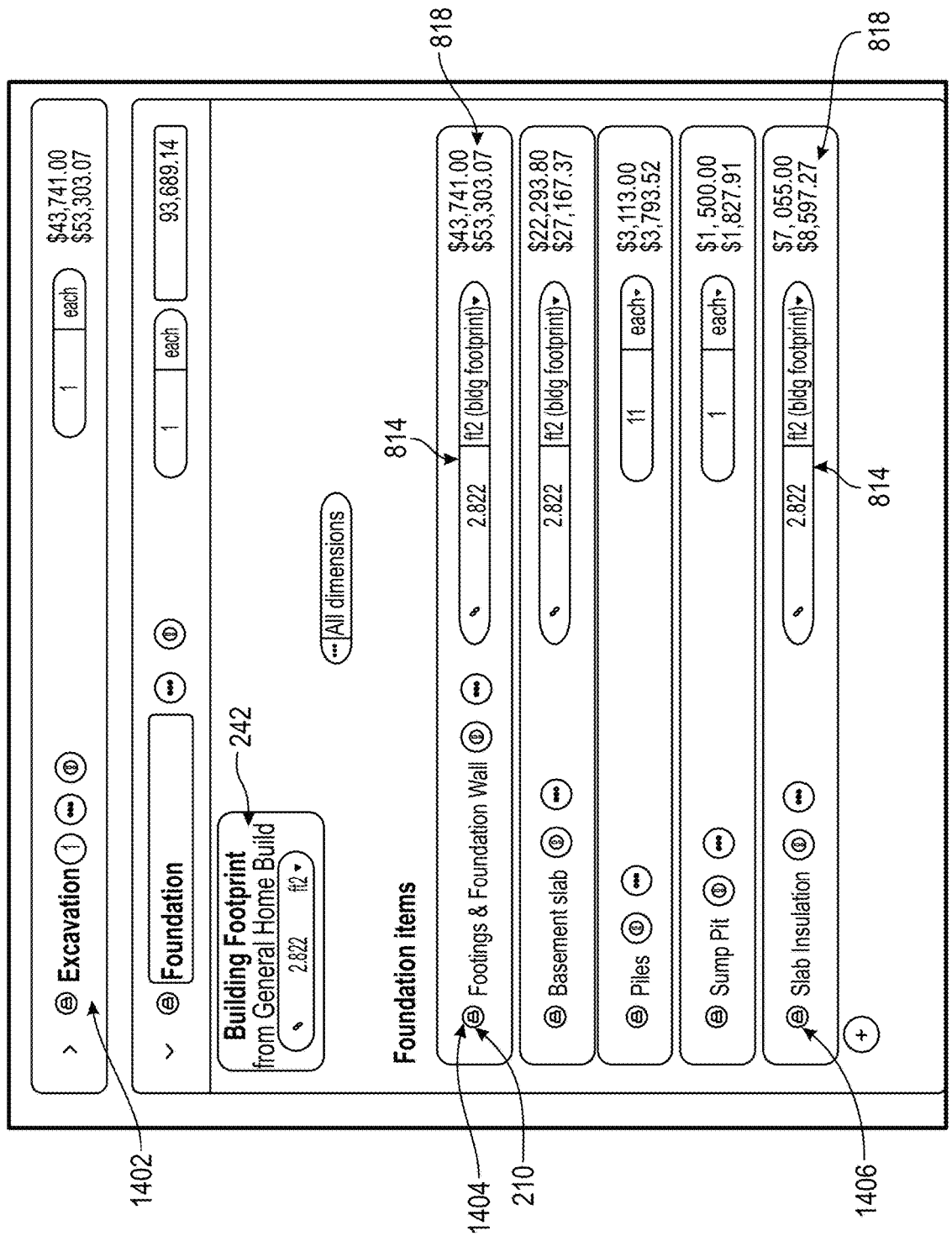
FIG. 14A is a pictorial illustration of an assembly having examples of entered field values of relevance to each line item in accordance with an illustrative embodiment.
Figure 14B:
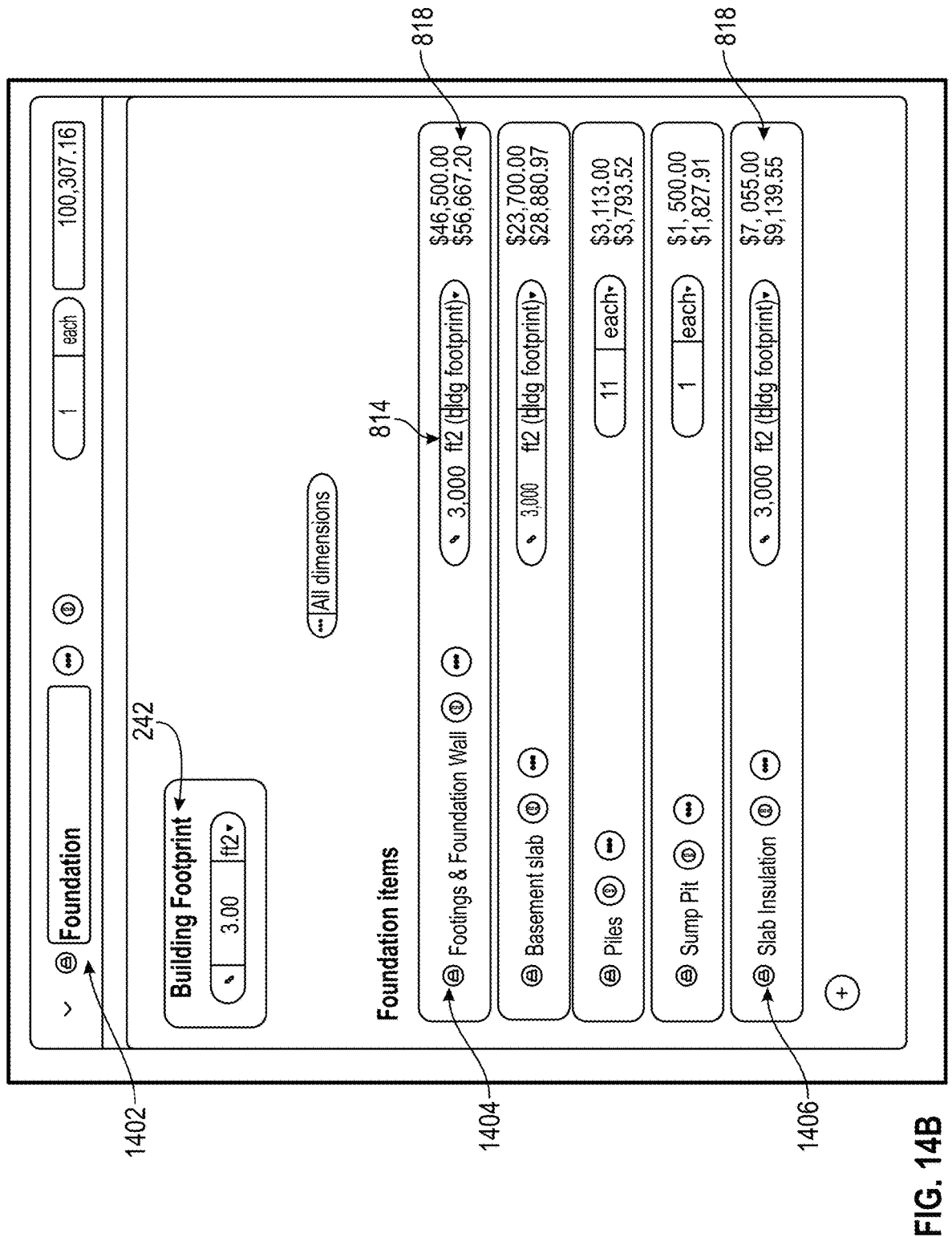
FIG. 14B is a pictorial illustration of the assembly shown in FIG. 14A with different entered field values and the change in real time to the individual costs of the line items in accordance with an illustrative embodiment.

FIGS. 14A-14B are pictorial illustrations that show how the change of a value of a dimension field 814 may advantageously be reflected in real time to the user. Further, FIGS. 14A-14B shows how time-saving and effective it is for cost estimator platform 172 to have linked dimensions 216 that are connected to parameters 224.

In FIG. 14A, the line item 1404 (which is an example of line item 210 shown in FIG. 2) relates to construction work or services to be provided for a "footings and foundation wall" that is part of the "foundation" construction or assembly 1402 of a construction proposal (e.g. proposal 202). Line item 1406 relates to construction work or services to be provided for a "Slab Insulation" for assembly 1402.

Line item 1404 and line item 1406 both use the value provided for the building footprint parameter 242. As shown in FIG. 14A, the building footprint parameter 242 is shown to be "2,822" square feet. For example purposes, if the original value for the building footprint parameter 242 is wrong and the user needs to change this value to "3,000" square feet instead, as shown in FIG. 14B, then the individual costs 818 for line items 1404 and 1406 are each updated to reflect the effect of such a change. Thus, FIG. 14A and FIG. 14B demonstrate how any changes and their effects on one or more costs 256 may be shown in real time to the user. Further, these figures demonstrate how interactive and dynamic cost estimator platform 172 is in comparison with conventional methods for providing construction quotes and estimates.

Notably, it is very common that a proposal creator 160 discovers values provided for measurements related to parameters 224 or other fields have to be changed, and using conventional means, it takes the proposal creator 160 a great deal of time and effort to fix such issues in a proposal. Beneficially, the structure of cost estimator platform 172 clearly saves the proposal creator 160 a great deal of time and effort that would have to be spent in recalculating such individual costs 818 and helps to minimize and avoid the errors and mistakes in calculation that comes with such changes, as further illustrated by FIG. 20. This is the case whether the change is to a linked dimension 216 linked to a parameter 224 (e.g., for line items 1404 and 1406) or whether the change is to an unlinked dimension 218 that includes a quantity value (e.g. for line item 1202 shown in FIG. 12 and FIG. 13).

Figure 16:
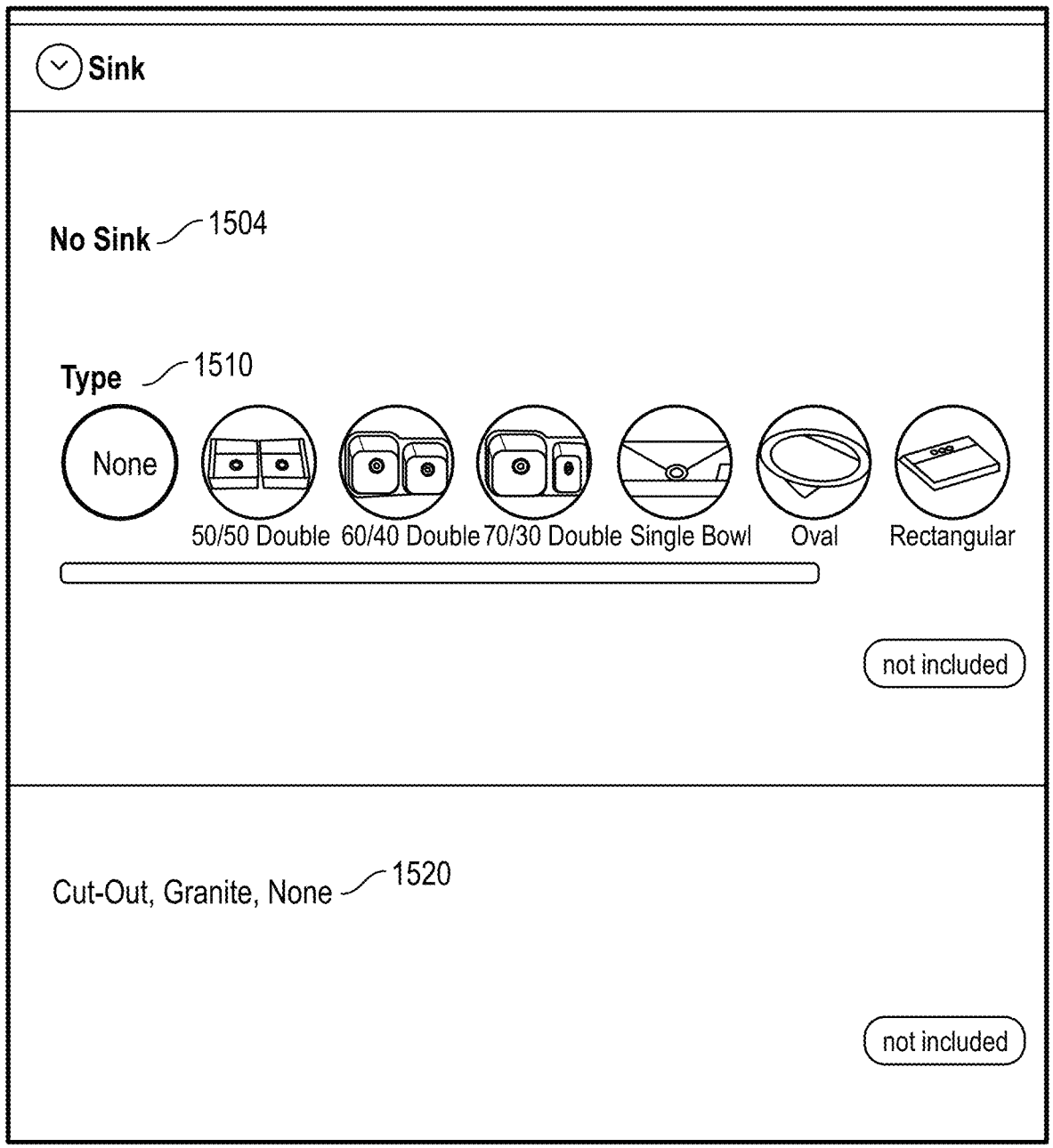
FIG. 16 is a pictorial illustration of an interface from the client's perspective for viewing the set of linked selections and built in features shown in FIG. 15 in accordance with an illustrative embodiment.
Figure 17:
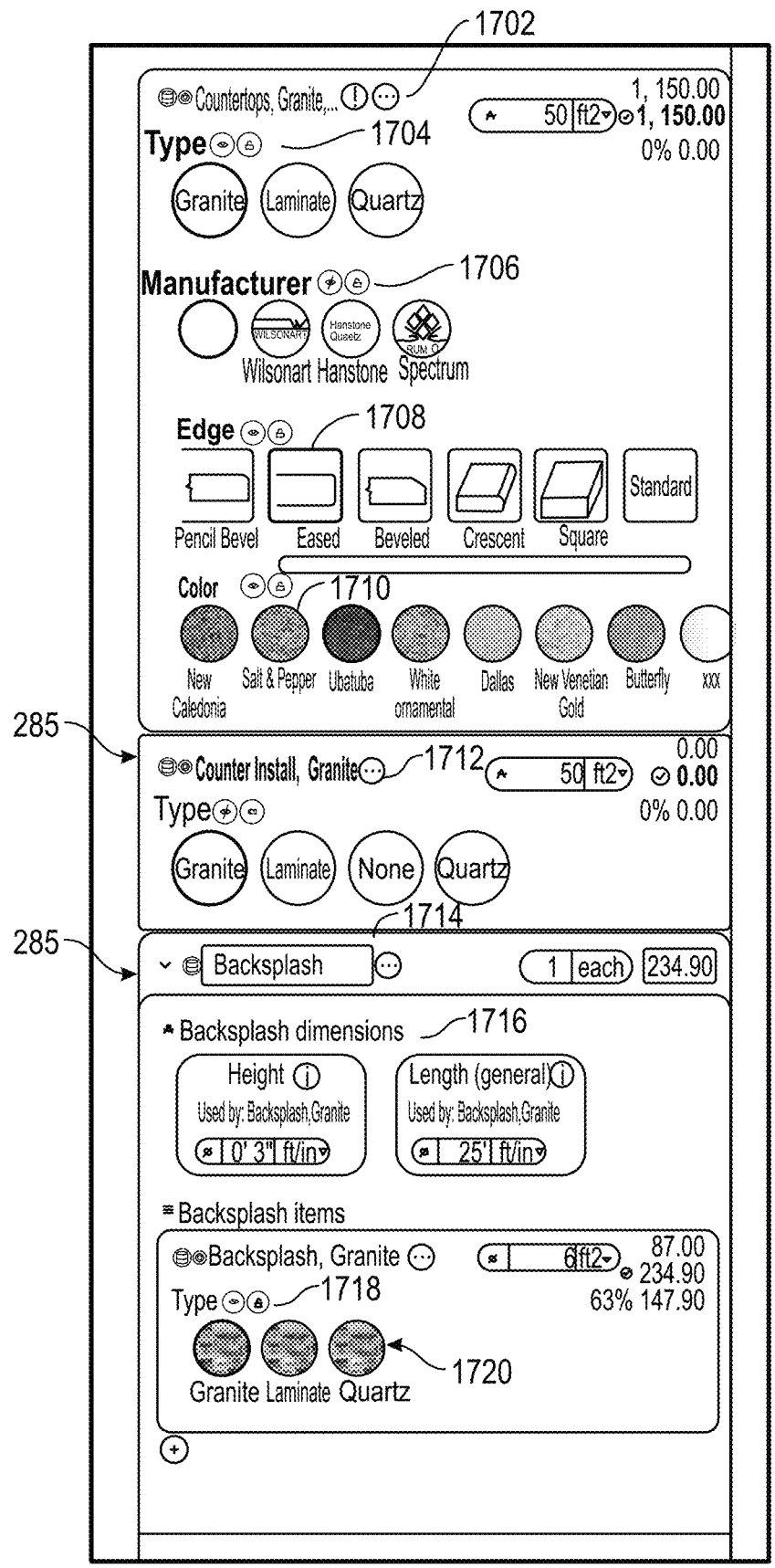
FIG. 17 is a pictorial illustration of another example of a contractor's perspective of a set of linked selections and built in features in accordance with an illustrative embodiment.

FIGS. 15-18 show various interfaces that are a part of cost estimator platform 172 and that relate to linked selections 285 and any associated/hidden costs 286 that need to be accounted for. Linked selections 285 may refer to the process of triggering the inclusion or omission of one or more pieces of equipment or materials for a particular line item 210 and/or assembly 204. The inclusion or omission of the one or more pieces of equipment or materials may be in response to a client 162 or other party selecting (or not selecting) a particular selection as provided by the contractor and/or subcontractor 278 (e.g., proposal creator 160). FIGS. 15-17 further show and describe relate to the linked selections 285 and any associated/hidden costs 286 that may need to be accounted for in cost estimator platform 172 so that the proposal 202 is as accurate as possible. While linked selections 285 may relate to primarily additional equipment or materials to be added to a line item 210 or assembly 204, the labor 258 associated with the price for installation and any costs of purchase of materials 260 (including equipment) may also be factored in.

FIG. 15 shows an example of linked selection 285 in the form of a selection of sinks. The proposal creator 160 is able to provide multiple options for sinks 1502, which is an example of a line item 210 as described above in FIG. 2 and elsewhere. Each sink 1502 may have various relevant characterizations and categorizations that the proposal creator 160 has to factor in to the proposal 202 in order to have an accurate value for the combined costs 266 and total costs 268 for the installation of such sinks 1502. Examples of categorizations and characterizations are included in FIG. 15 as location 1504, type 1510, counter-type 1518, and cut-out 1520.

The sinks 1502 may be categorized based on location 1504 and type 1510 for example. As shown in FIG. 15, the location 1504 for sinks may be set to "none" if no sinks are needed or selected, or "kitchen" or "lavatory." Under type 1510, there are multiple types of sinks that may be selectable by either the original proposal creator 160 or client 162. Some example of types of sinks are a 50/50 double sink, 60/40 double sink, 70/30 double sink, oval sink, rectangular sink, etc. These various types of sinks (e.g., which is an example of materials 260 and equipment needed in a construction, renovation, repair project) may be included as an option for selection under type 1510, as shown in FIG. 15. Further, a user may select any of the provided types 1510 of sinks 1502 and be provided with any available images, description, features, pricing, information about manufacturer or vendor 280, and any other relevant description related to the type 1510 of sink 1502.

Once the user has selected a type 1506 of sink 1502, the proposal creator 160 is aware that he or she must also factor in what counter type 1518 and what kind of cut-out 1520 must be selected or factored into the cost of installation of the original sink 1502. For example, as shown in FIG. 15, if the client 162 desires a sink 1502 to be located in the kitchen, then the cut out 1520 type must be linked to the location 1502 characterization in order for the proposal 202 to reflect the logical order of work and services required to install that specific type 1510 of sink 1502 in that specific location 1504. Further, it matters whether the client 162 or proposal creator 160 chooses a granite, laminate, or quartz counter type 1518 as a type of sink 1502 (and will greatly affect the combined costs 266 and total costs 268 for any number of sinks 1502 installed).

Further, the dimension field 814 and unit type 816 fields, as explained above in FIG. 8, are included in the interface related to the linked selections 285 are provided which relate to the number and characterization of sinks 1502 shown in FIG. 15. One or more of the dimension fields 814 may be linked to another linked dimension 216 and/or relevant parameter 224 as needed to factor in any changes to multiple line items 210 and assemblies 204. Further, the fields 818 and 820, as explained above with respect to FIG. 8, showing a cost of a linked selection 285 or item 1502 to the contractor and to the client is also displayed on the exemplary interface shown in FIG. 15.

FIG. 15 shows two icons, visibility icon 1506 and locking icon 1508 next to location 1504 and type 1506. The first visibility icon 1506 looks like a symbol of an eye while the second locking icon 1508 relates to a lock symbol. Accordingly, the first icon 1506 relates to whether related information is visible or not (e.g., visible to the eye) on cost estimator platform 172 to the client 162 and the second icon 1508 relates to whether the selected option as selected by the proposal creator 160 is locked or can be altered. Accordingly, the proposal creator 160 may want to set up the initial number of sinks between zero and a greater number and may want to limit the factors that may be altered or varied by the client 162, when the client 162 reviews the proposal 202. As noted above, one of the beneficial features of proposal 202 is that when the proposal creator 160 (e.g., contractor) sends a first version to the client 162, the client 162 can make changes as well and see how the total costs 268 are affected in real time. If a proposal creator 160 chooses to toggle over or select the visibility icon 1506, then cost estimator platform 172 will make the options provided under that particular line characterization or categorization (e.g., location 1504, type 1510, counter type 1518, and cut-out 1520) invisible to the client 162. Accordingly, the proposal creator 160 does not want that particular client 162 to be able to view the options for this specific linked selection 285 and/or line item 210. However, as noted above, proposal 202 may be used for multiple clients 162 with different needs and may be used as a template and a proposal creator 160 may choose to embed all the different characterizations and categories (e.g., e.g., location 1504, type 1510, counter type 1518, and cut-out 1520) whether or not they are selected and whether or not they are visible to a particular client 162 in case the proposal creator 160 wants to make changes in the future to this proposal 202 for this client 162 or for another client.

FIG. 16 provides a view of how the interface shown in FIG. 15 appears to a client 162. As noted above, the elements associated with sink 1502, such as 1504, 1510, and other elements related to 1518 and 1520 are marked as invisible to the client 162 once the proposal creator 160 selects the visibility icon 1506, as shown in FIG. 15. Accordingly, a proposal 202 may have built in linked selections 285 that factor in important costs that may be described as associated or hidden costs 286 for a particular line item 210. Further, the proposal creator 160 can set up his or her proposal 202 or a template of the proposal 202 to include all possible important characterizations or categorizations or required steps to complete a particular line item 210, and then selectively choose which elements are made visible to the client 162 and/or are locked so as to not to be changed or altered by the client 162.

FIG. 17 shows another example of linked selections 285. In the example shown in FIG. 17, a proposal 202 includes a number of line items 210, such as counter tops 1702, counter top installation 1712, and backsplash 1714. These line items 210 may all be part of a proposal 202 to be provided by a general contractor to the client 162 as part of a construction or renovation project associated with the client 162's countertops. The proposal creator 160 is aware that it is not sufficient to merely select the relevant features and characterization or categorization of the counter top alone, because the type of counter top selected affects the labor and services associated with the installation (e.g., 1712) of the counter top. Further, the type of backsplash 1714 selected will be greatly affected by the type of counter top 1702 selected and any associated features or characterizations of the backsplash 174. Accordingly, the proposal creator 160 is able to selectively link and create linked selections 285 among various line items 210 in various assemblies 204 in the proposal 202 that require special consideration and factoring in of not just changes to cost but also the changes to type, location, type of manufacturer or vendor, special attributes such as shape and color, and other relevant factors.

As shown in FIG. 17, the type 1704 of countertop 1702, manufacturer 1706, type of edge 1708 of counter top 1702, and color 1710 of the countertop 1702 can all be included in the proposal 202 and associated with costs and considerations for the countertop 1702 line item 210. Any dimensions 1716 associated with the backsplash 1714 may also be accounted for as well as the type 1718 of backsplash. Further, images 1720 of the available types of backsplash 1714 may also be displayed in the proposal 202. As with FIGS. 15-16, the proposal creator 160 can toggle on and off the visibility icons 1506 and locking icons 1508 to determine which elements are visible to a client 162 and which can or cannot be altered by a client 162.

Linked selections 285 allows the contractor or other proposal creator 160 or client 162 to make one selection, and various other hidden costs 286 (e.g., as they relate to a countertop 1702 or backsplash 1714 or cut out 1520 as shown in FIGS. 15-17) are updated instantly for the contractor and client 162. This is another element to save time to the contractor who does not have to keep re-entering related items and to also provide a more accurate proposal 202 to the client 162.

FIG. 18 shows additional examples of features and attributes that may be selectable and relevant to a client 162. The proposal creator 160 may choose to make such features visible and/or locked using icons 1506 and 1508. Such features may also include additional details regarding the countertops 1702, such as a specific type 1802 and 1804, type of edge 1806, and color 1808. Further, the proposal 202 may include promotions 1810 for popular choices or selections that the general contractor and/or vendor 280 or other party want to feature or highlight to the client 162.

Figure 19:
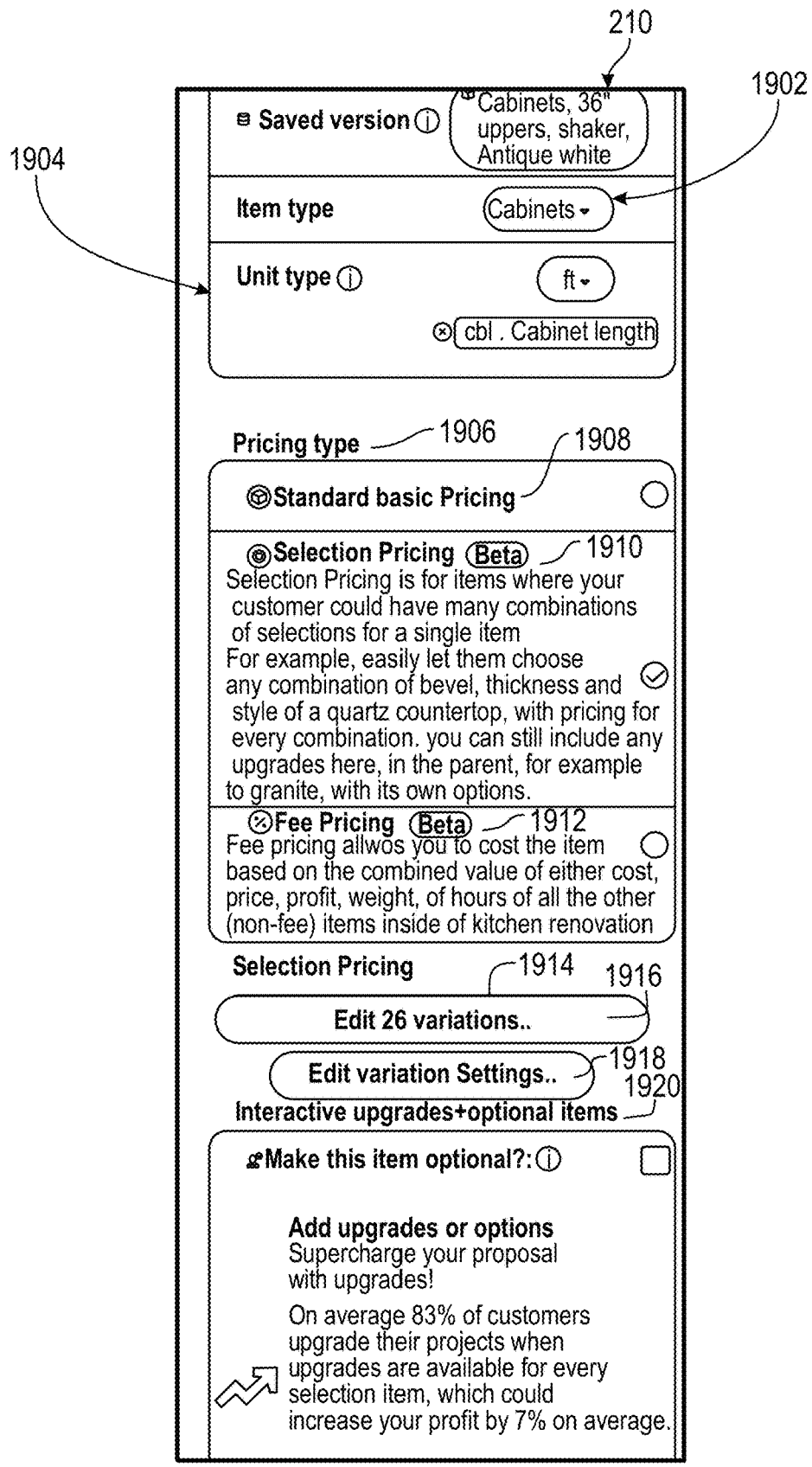
FIG. 19 is a pictorial illustration of an interface for displaying a variety of pricing models in the cost estimator platform in accordance with an illustrative embodiment.

FIG. 19 shows an interface for specific pricing options. For example, for cabinets 1902, which may be a type of line item 210 included in the proposal 202 having a particular unit type 1904, the pricing type 1906 may be selected from a standard basic pricing 1908, selection pricing 1910, or fee based pricing 1912. With the selection based pricing 1910, this type of pricing 1906 may be selected when a client 162 can have many combinations of selections for a single line item 210. The selection pricing 1910 may relate to 1914 where the general contractor may include any number of variations 1916 and variation settings 1918. Further, any optional items or upgrades 1920 (which may relate to the upgrades 272 as described and shown in FIG. 2) may also be entered and displayed using one or more interfaces of proposal 202.

FIG. 20 is a pictorial illustration of the "Changes" interface 2002 that may be included in cost estimator platform 172. The "Changes" interface 2002 may be in accordance with the changes interface 516 shown in FIG. 5.

Notably, interface 2002 displays to the user in an easy to read display 2006 the effects of any changes made to a proposal, such as proposal 202. The changes interface 2002 may display, in one or more non-limiting embodiments, the effect of a change, whether the change occurred due to a change in dimensions or costs, to each assembly 204 included in the proposal 202.

As shown in FIG. 20, there are multiple changes that occur to the price pre-tax, with tax, total cost, total hours, and sales tax, actual total cost, actual materials cost for each assembly 204, as well as other costs and elements. Conventional methods for creating construction based proposals require the proposal creator 160 (e.g., general contractor) to manually calculate each element anytime a change is made. Importantly, none of the existing options are as interactive as cost estimator platform 172 or provide the results of any changes in real time (e.g. as shown in FIG. 14A-14B) in accordance with cost estimator platform 172 and as shown in FIG. 20.

In addition to the above, cost estimator platform 172 may display how many versions of a proposal 202 have been shared between the proposal creator 160 and the client 162 or other party 168, and what changes were made in each version so as to keep track of such relevant information.

Turning to FIG. 21, FIG. 21 shows an interface or display 2102 for total costs 268 of a proposal 202 and various elements included in the calculation of such total costs 268, which were discussed above with respect to FIG. 2.

Turning to FIGS. 22A-22B, FIGS. 22A-22B are pictorial illustrations showing various interfaces 1202 for upgrades, such as upgrades 272 discussed above with respect to FIG. 2. General contractors are usually very aware of cost implications to the client 162 when selecting materials or providing suggestions for renovations to one's home or other property. Nevertheless, many clients 162 still would like to see the effect that upgrades 272 may have on the total costs 268 of the proposal 202. Cost estimator platform 172 simplifies the process of including optional upgrades 272, such as those shown in FIGS. 22A-22B, because the such optional upgrades 272 may be included as separate assemblies 204 and any associated line items 210 in one or more interfaces 1702 accessible to the client 162 or other user.

FIG. 22A shows an example of an upgrade for "high-end cabinets", shown as optional upgrade 2204, which has an anticipated labor and materials cost 2208 of $7,858.56. FIG. 22A further includes optional upgrade 2206 which relates to "mid-range cabinets", which have a labor and material cost 2208 of $2,373.68. Accordingly, the user is able to compare costs associated with upgrades that utilize different materials or goods or services.

Further, in one or more non-limiting embodiments, cost estimator platform may provide the general contractor (e.g., proposal creator 160) or any other user a clear breakdown of the percentages and differences in labor, materials, and profit as shown by the graphic 2218 shown in FIG. 22A.

FIG. 22B shows another interface 2212 available in cost estimator platform 172 that provides additional detailed features 2210 for upgrade 2204 ("high end cabinets"). These features 2210 may be helpful for the client 162 to determine whether or not it is worth including such an upgrade 2204.

The total costs 2214 (including labor, taxes, markup, or any other includable cost) may also be displayed to the user so that the user clearly understands how much will be added to the original total costs 268 of the proposal 202 if the one or more optional upgrades 272 are included. If a client would like to include any of the upgrades 2204 or 2206 shown in FIG. 22A and FIG. 22B, the client may simply select the upgrade selector 2216 shown in FIG. 22B and the costs 2214 will be included in the proposal 202 sent to the client 162. The proposal creator 160 can also clearly see that this addition to the proposal 202 has occurred when reviewing the version of the proposal 202 sent back and/or approved by the client 162 (e.g., by reviewing Changes interface 2002 discussed above with respect to FIG. 20).

Prior to cost estimator platform 172, it was discouraged for the general contractor to take a lot of extra time to provide accurate estimates for upgrades, because these are optional items that would take a lot of time and effort to produce. The client 162 may choose to go with the standard (e.g., lower cost) items and features and the general contractor would have to expend a great deal of effort and time to adjust the proposal 202 to either take out or include one or more upgrades 272. The unique structure and makeup of cost estimator platform 172 with its use of assemblies 204, line items 210, linked dimensions 216, and unlinked dimensions 218 that are so tied to the costs 256 of each line item 210 allows the user to play with the proposal 202 relatively easily and to also view the effect of as many upgrades 272 on the total hours and total costs associated with a construction project as desired. This makes the user experience much more pleasant and exciting when viewing and interacting with proposals 202 and cost estimator platform 172.

Turning to FIG. 23, FIG. 23 provides a pictorial illustration of an interface in cost estimator platform 172 displaying a payment tracking system 276 in accordance with one or more non-limiting embodiments. Payment tracking interface 276, as discussed above with respect to FIG. 2, may allow a general contractor (e.g., proposal creator 160) to keep track of one or more costs for various phases or stages of construction for any given project based on the labor of one or more subcontractors 278 and/or vendors 280. Payment tracking system 272 may be most relevant once a client 162 has booked a proposal 202 and provided funds to the general contractor (e.g., proposal creator 160) for the construction project. As noted with respect to the project management interface 272 shown in FIG. 3, cost estimator platform 172 allows the user to manage and keep track of any booked proposals and projects as well as any pending, unapproved proposal 202.

In one non-limiting embodiment, the interface 2302 for the payment tracking system 276 may be selected from a menu bar, such as menu bar 502 shown in FIG. 5. By selecting the "Budget" 514 icon shown in FIG. 5 and FIG. 23, the user may access one or more payment tracking systems 272, including the one shown in FIG. 23.

Advantageously, the user may view a table 2304 displaying various assemblies 204 and the corresponding subcontractors 278 and vendors 280 working on these assemblies 204 (e.g., entry 2306). Further, the table 2304 may display budgeted costs 2310, actual costs 2312, any amounts paid to a subcontractor or vendor 2314, and any amounts owed but unpaid 2316 to a subcontractor 278 or vendor 280. The table 2312 can break down these elements for each subcontractor 278 or vendor 280 construction phases in the proposal 202.

In one or more non-limiting embodiments, cost estimator platform 172 allows the funds from a client 160 to be stored in an escrow style account that is associated or accessible by the general contractor (e.g., proposal creator 160). In one or more non-limiting embodiments, the administrative entity, such as administrative entity 170 shown in FIG. 1, may act as the holder of any funds provided by the client 162 for the construction, renovation, or repair work related to proposal 202. If client 162 books the project related to proposal 202, the client 162 may send funds (whether using digital or non-digital currency) to an account associated with administrative entity 170. The administrative entity 170 remains connected to and monitors the progress of any construction work related to proposal 202. Further, upon completion of any line item 210, the subcontractor 278 or vendor 280 can provide their total hours to the general contractor by entering in that information into an interface, such as interface 2302. Further, the subcontractor 278 or vendor 280 can check off any of the line items 210 associated with proposal 202 as being complete. The general contractor 160 can view the entered hours and the line items 210 that have been checked off as complete. The general contractor 160 can also view the amount owed 2318 to a subcontractor 278 or vendor 280. If necessary, the general contractor may dispute the amount entered with the subcontractor 278 or vendor 280 and change the amount.

Alternatively, the general contractor may approve of the amount entered and reflect this in the table 2312. Upon approval of the completion of services for any given phase, the general contractor 160 may mark the amount owed 2318 to the subcontractor 278 or vendor 280 as being approved. Upon indication and recording of this approval by the general contractor 160 in cost estimator platform 172 (e.g., in table 2312), the administrative entity 170 can transfer the amount 1818 from the bank account holding client funds to the designated subcontractor 278 or vendor 280. Accordingly, cost estimator platform 172 includes a method and system for holding valuable funds from client 160 in an escrow style account, whereby the funds are only transferred to the designated parties with the help of a third party, such as the administrative entity 170. This system may help reduce any disputes between the client 162 and general contractor 160 that may arise regarding payment and payment transfer. Further, any payments provided to a subcontractor 276 or vendor 280, regardless of whether an escrow style account is used, may helpfully be documented and kept track of using payment tracking system 276. Further, payment tracking system 276 provides additional documentation as to when a line item 210 has been completed by the general contractor 160, subcontractor 278, and/or vendor 280.

One of the unique aspects of payment tracking system 276 in cost estimator platform 172 is that each line item 210 acts as its own self-contained entity having all of the relevant costs 256 and phases of construction (e.g., 1104 shown in FIG. 11) listed and entered as fields for each line item 210. Accordingly, it is possible using the cost estimator platform 172 system for a user to check off each line item 210 upon the completion of that line item 210 regardless of whether the full construction work has been completed for a property. This is not usually possible with existing methods, because costs 256 do not usually include the breakdown of costs 256 for labor 258, materials 260, markup 262, as well as taxes 268, as well as the effect of any discounts 1612 or adjustments 1620.

Figure 24:
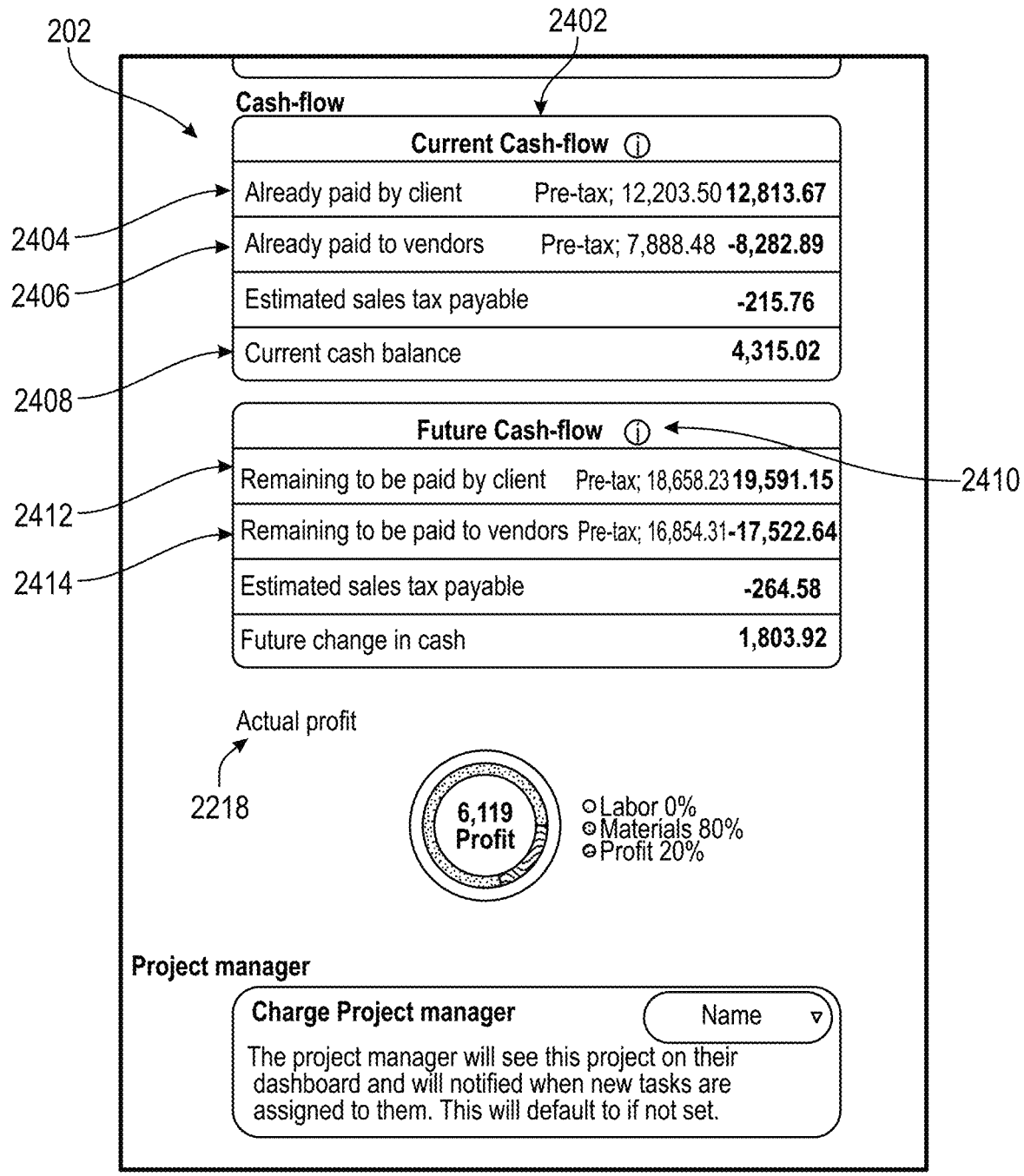
FIG. 24 is a pictorial illustration of an interface for viewing and keeping track of cash flow and payments made to vendors in accordance with an illustrative embodiment.

FIG. 24 is another interface showing additional aspects of the payment tracking system 276 for cost estimator platform 172. The interface shown in FIG. 24 includes any information about current cash-flow 2402 as well as future cash flow 2410. The information available under current cash-flow 2402 may convey and display any payments paid by a client 2404, paid to vendors 2406, and the current cash balance 2408. Further, under future cash-flow 2410, the information displayed may relate to any remaining amounts of payments to be paid to a client 2412 or remaining amount of payment to be paid to vendors 2414. The interface shown in FIG. 24 is an example of an interface that may usefully summarize this type of information about current cash-flow 2402 and future cash-flow 2410 for the contractor in charge (e.g., proposal creator 160). Further, the interface may display any actual profits 2218 using any type of breakdown of labor, materials, and profit graphical display (e.g., such as the chart shown in FIG. 24).

Figure 25A:
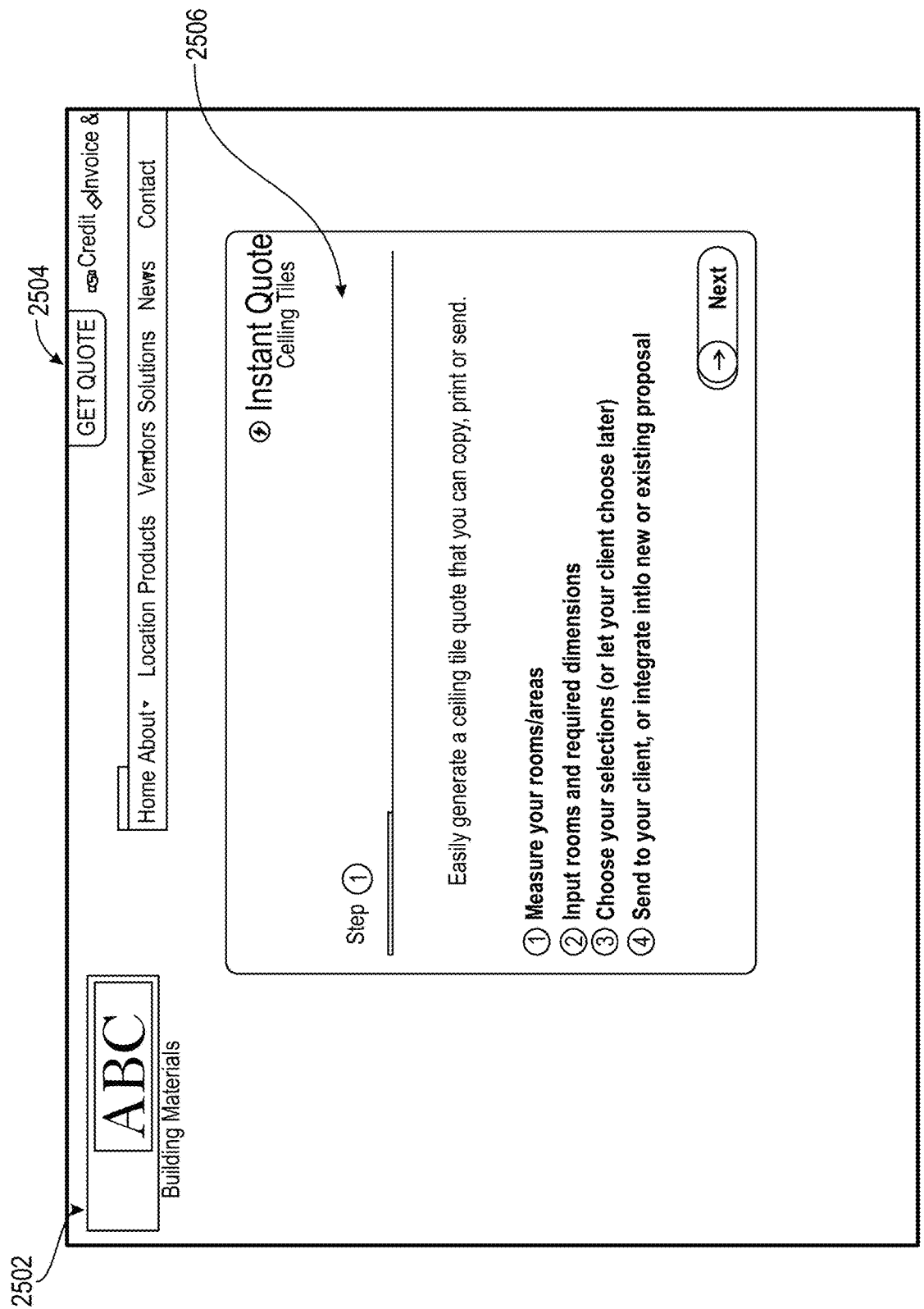
FIG. 25A is a pictorial illustration of a website that incorporates a widget or built in application of cost estimator platform in accordance with an illustrative embodiment.
Figure 25B:
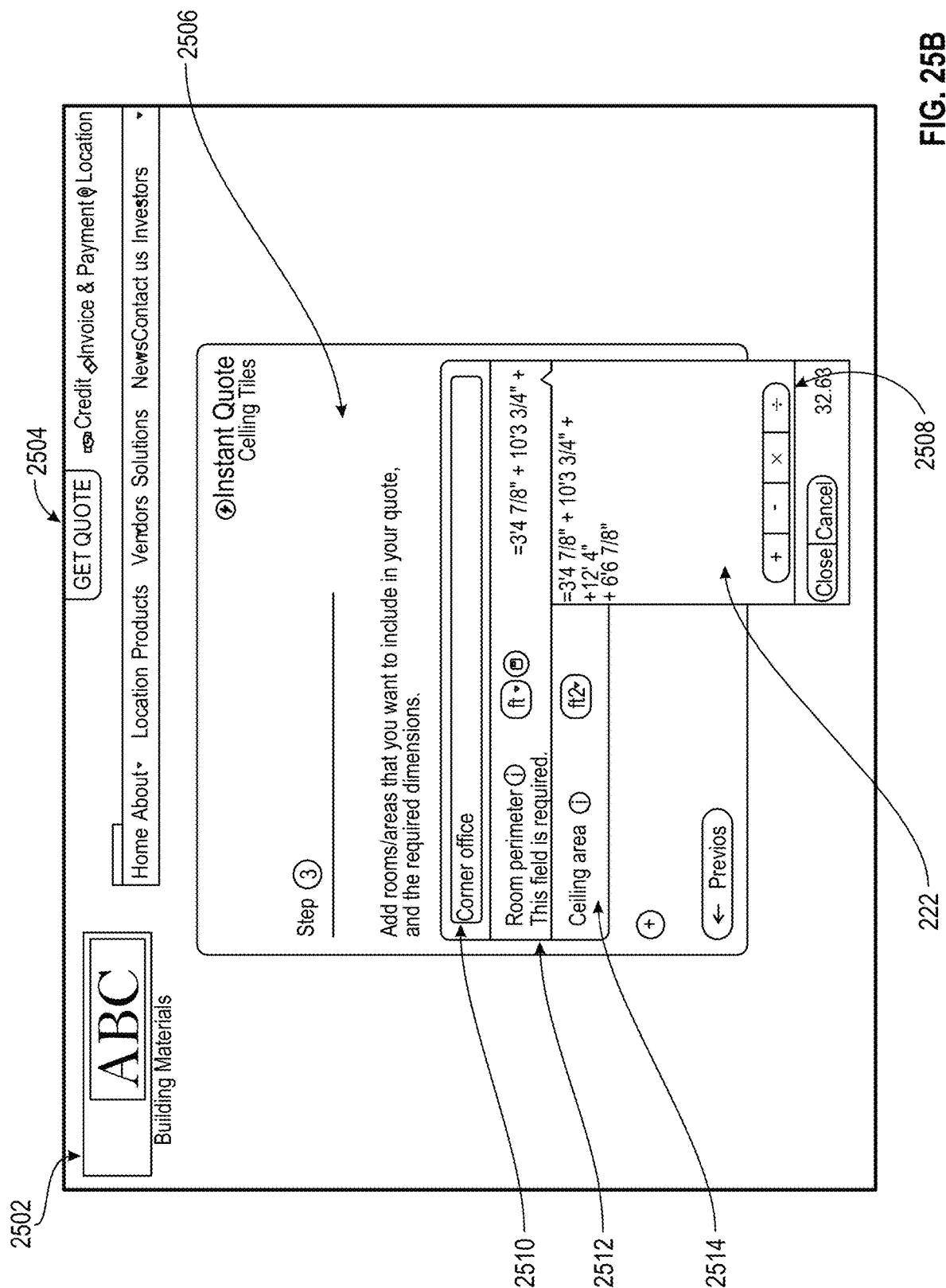
FIG. 25B is a pictorial illustration of the widget shown in FIG. 25A in accordance with an illustrative embodiment.

FIG. 25A and FIG. 25B provide pictorial illustrations of another use for cost estimator platform 172. Notably, FIG. 25A and FIG. 25B show how cost estimator platform 172 may be used in a third party website 2502 as a widget 2506 to obtain a quote 2504 related to construction, renovation, or repair services from the owners or other authorized users of the third party website 1902. One of ordinary skill may also foresee that widget 2506 may be used to obtain quotes for other types of services other than construction, renovation, and/or repair services.

Widget 2506 may be a shortcut for a user to access specific features and components of cost estimator platform 172. In one or more non-limiting embodiments, widget 2506 may act as a component of a third party website, such as third party website 2502 shown in FIG. 25A and FIG. 25B, that enables a user to perform a function or access services associated with cost estimator platform 172.

In this case, widget 2506 asks an interested client or other user to provide certain relevant information entered into the widget 2506 and used by cost estimator platform 172 to provide a quote 2504 from the third party website directly to the interested client or other user. For example, the third party website 2502 may provide ceiling tiles and the interested buyer wants to receive a quote for the cost to provide ceiling tiles for a particular location or room. In this case, the particular location or room is the "corner office" 2510 entered into the widget 2506. The "corner office" 1910 may be treated as an assembly 204 and/or a line item 210 in cost estimator platform 172. The widget 2506 may further prompt or require from the user specific dimensions, similar to dimensions 220 discussed above with respect to FIG. 2. Such dimensions 220 may include linked dimensions 216 that correspond to specific parameters 224 or unlinked dimensions 218 if that is needed that correspond to amount or quantity of a material or good.

As shown in FIG. 25B, in order to receive a quote related to total costs for installing ceiling tiles, the user is prompted to provide the values associated with the room perimeter parameter 2512 and the ceiling area parameter 2514 (which may be parameters in accordance with parameter 224 discussed above in FIG. 2). A calculating interface 2508 may also be displayed to the user, whereby calculating interface 1908 is in accordance with calculating interface 222 and 902 discussed above with respect to FIG. 2 and FIG. 9. Calculating interface 2508 may be used by the user to enter in the relevant numerical values and/or make calculations.

The widget 2506 may receive the required dimensions and information about the relevant rooms/areas and send to the owners or authorized users of the third party website 2502. In one or more non-limiting embodiments, the interested client or buyer may be provided with an instant quote in response to the entered dimensions and information or may receive a quote later via email, for example, or another type of contact with owners of the third party web site 2502. Advantageously, the widget 2506 draws on components of cost estimator platform 172 to quickly obtain relevant dimensions and provide construction related proposals 202 and quotes to an interested party in a quicker and more accurate fashion than the conventionally available methods.

Additional features and options of use for cost estimator platform 172 are further provided below. As noted above, cost estimator platform 172 includes a system where each line item 210 acts as an entity on its own with all of the required costs 256 and phases of construction documented and include with the line item 210 interfaces (e.g., interface 1002 shown in FIG. 11). Accordingly, in one or more non-limiting embodiments, a user may be provided with the ability to view a virtual 2D or 3D model that represents the completed results of a construction, renovation, or repair work associated with proposal 202. In other words, the user may be provided with a 2D or 3D model of the end result for a kitchen or bathroom or other area where construction work takes place and may be able to take a tour of this 2D or 3D model to fully visualize and understand the final look and result. Further, the user may be able to interact with a device to view a complete listing of any costs 256 associated with any feature, fixture, or phase of construction as shown in the virtual 2D or 3D model. The device may be any type of device for viewing such models, including, but not limited to virtual goggles or glasses. Alternatively, the user may view the model from a screen of a computing device, such as computing device 100 shown in FIG. 1. In addition to passively viewing the 2D or 3D model or rendering, the user is also able to interact with the model using cost estimator platform 172. For example, the user is able to swipe or otherwise select the model and view or even change any included costs, fixtures, or features using cost estimator platform 172.

In one non-limiting embodiment, the user is able to view the complete listing of costs 256 for each fixture or feature, because of how cost estimator platform 172 has each line item 210 as including all of the required costs 256, as discussed above with respect to FIGS. 2-25B. A schedule can be created automatically because labor time and cost 258 required is calculated on each line item 210, based on stored and external values, as well as the linked dimensions 216 and unlinked dimensions 218. Order of operations is also stored on each line item 210 which when combined with crew sizes, and assignment of line items 210 to different crews, allows a Gantt chart to automatically be generated with the correct order of operations and the time in days/hours of each line item 210.

Each line item 210 or assembly 204 can relate to a 3D or 2D model, as discussed above, with the linked dimensions 216 and unlinked dimensions 218 affecting both the total price 268 (e.g. as shown in FIG. 21) and the 3D or 2D model. Assemblies 204 can be used to group line items 210 together. In one or more non-limiting embodiments, both the assembly 204 and line item 210 can be positioned on a grid, or in a space, and be combined to create a whole model (e.g., a 2D or 3D model of a house or other property undergoing renovation).

Once the model is assembled, whether as a floorplan, elevation, drawings, or a 3D model, all the line items 210 and assemblies 204 can be modified by the viewer, changing finishes, upgrading, moving, or changing dimensions. All these changes will automatically change the model dimensions and positioning in real-time, which will affect the cost/price/profit in real-time and change other related components, such as a materials list and proposal 202 in real-time.

Certain costing information is stored externally, so that every time an assembly 204 is added or a proposal (e.g., proposal 202) is created, labor costs (e.g., 258), currency changes, and material cost fluctuation are all updated as well. For example, the labor costs 258 associated with installation of a hardwood floor may be listed as $20.00. Because this amount can change with time, it is externally stored, and the live current value of that cost is loaded into each assembly 204 or line item 210 that labor cost 258 is used or added.

Certain cost information is stored on line items 210 internally, for example the time required per unit. For example, the time required for installing a hard wood floor may be the type of variable that is stored internally. Other examples include the materials that are required per unit, and how the materials are purchased, for example by box and how many square feet are in a box. Cost estimator platform 172 is also configured to store the type of labor required and the current live cost of the labor per unit of time, which may be provided based on the most current estimate.

The information stored with each interface for the line items 210 also unique allows for detailed materials purchase lists. Material purchase units, with waste factor, and minimum purchase amounts or purchase units (e.g., per box) makes it possible to create instant materials lists and materials costs based on how the materials are actually purchased in the real world, which is what enables instant ordering. Accordingly, the linked dimensions 216 and assembly 204 hierarchy is what enables instant materials purchases.

The hierarchical structure of assemblies 204 paired along with the linked dimensions 216 and unlinked dimensions 218 and the internal and externally stored costing information allows each and every line item 210 inside of cost estimator platform 172 to be a completely viable atomized "project" all on its own. Each line item 210 is fully self-contained and has its own full cost, markup, price, as well as its full share of any project-level price adjustments, discounts, taxes so the profit/loss (e.g., as shown in FIGS. 11, 13, and 21) for each item can be independently determined as well as the total amount of labor/work time required to complete that line item 210.

The individual viability of line items 210 may make the escrow system payment tracking system 276, as described above in one or more non-limiting embodiments with respect to FIG. 23, to be possible. Each line item 210 can be checked as complete, which makes it possible to instantly know what share of that line item 210's costs 256 and profit 270 belongs to the general contractor 160 and what share belongs to the subcontractor 278 or vendor 280.

It is noted that, in some cases, a subcontractor 278 can also have further divided up projects assigned to them in terms of labor and/or materials. Having individually viable line items 210 can instantly provide the knowledge of how payments need to be divided and which amount needs to be transferred to which party, even though to the client 162, the funds may appear provided for the payment of a single line item 210. The coordination of this information using cost estimator platform 172 and its payment tracking system 276 is only possible because the line item 210 is fully viable as its own mini project, which is possible at scale because of the use of linked dimensions 216, unlinked dimensions 218, and the hierarchy of assemblies 204 and line items 210.

Additional benefits of cost estimator platform 172 include a 3-way approval system for line items 210, which may be tracked based on ongoing automatically generated versions/change-order. Line items 210 may be marked as approved or unapproved by the client 162 (which can be an end consumer, or another contractor), the contractor who created the line item 210 (e.g., general contractor 160 or subcontractor 278), and the vendor 280 (e.g. can be materials supplier, or another subcontractor 278). These approvals are based on which version/change-order they are attached to. Versions/change-orders are generated automatically whenever a contractor, client, vendor or employee makes changes to a project as reflected in proposal 202 using cost estimator platform 172. Each affected party is then prompted to approve the new 'version' of the project, which acts as a version monitoring system.

Line items 210 that have had substantial changes (e.g., changes to the name, price, cost or any other change that substantially alters the cost, price or scope of that line item 210), are marked as being a part of the new version/change-order and that line item 210 may be marked as being approved, pending or declined for each version/change-order.

The version/change-order can be thought of as collections of changes to line items 210, which allows the individual line items 210 (which are fully viable on their own) to be tracked and approved or declined in groups, which allows the process to operate at scale with many line items 210 (e.g., hundreds or thousands) at a time with ease in a way that makes sense to the consumer 162 as well as to the general contractor 160. The tracking of changes allows the consumer or contractor to easily see what was changed, how, when and by whom.

Having each line item 210 individually viable also allows for automated bid requests. Because each line item 210 stores its own trade-type and construction-stage (e.g., as shown in FIG. 11), bid requests can be automatically sent to known or unknown subcontractors 278 that are marked as doing that type of work.

A bid request creates a project for the subcontractor 278 with the general contractor 160 listed as the client. As the bid is accepted, the subcontractor 278's project is accepted. As either party makes changes, and once those changes are approved by both parties, those changes are merged into each project with the general contractor 160's cost displayed as being the same as the subcontractor 278's price. If that also generates a version/change-order for the general contractor 160, it will also prompt the actual client 162 to accept the changes. The viability of line items 210 allows for the ongoing de-risking of a construction project by allowing for fluid and real-time multi-party approval process that maintains costs and schedule.

Figure 26:
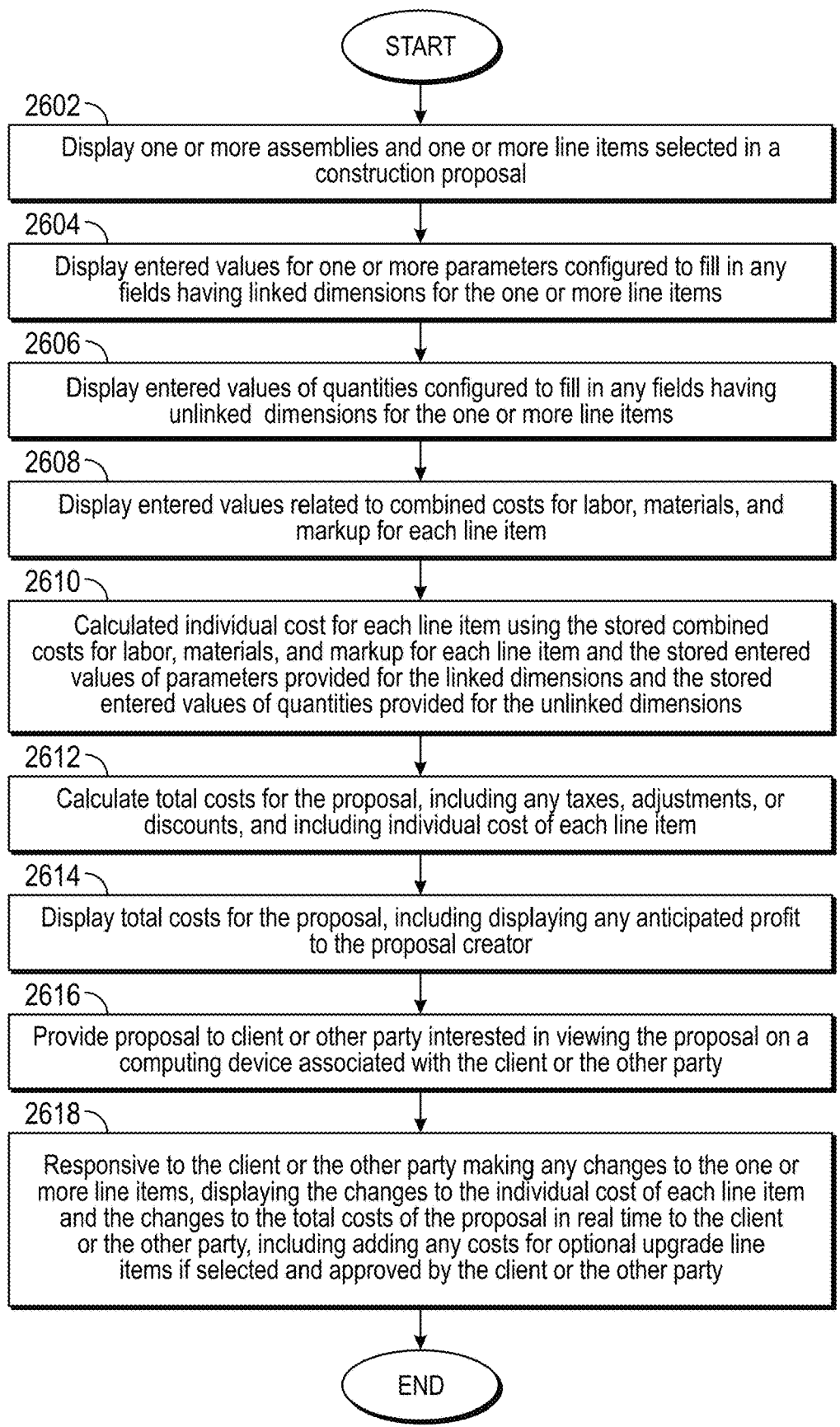
FIG. 26 is a flowchart of an exemplary method of using cost estimator platform in accordance with an illustrative embodiment.

Turning to FIG. 26, FIG. 26 provides a flowchart of an exemplary method for using some of the features and functions of a computer based software program (e.g., cost estimator platform 172) for providing construction related proposals and quotes to a client or other interested party. In one or more non-limiting embodiments, the client or other interested party may utilize cost estimator platform 172, including any of its components and features described herein, and included in one or more non-limiting embodiments in FIGS. 1-25B.

At step 2602, the process may begin by displaying the one or more assemblies 204 and one or more line items 210 selected in a construction proposal 202. In one or more non-limiting embodiments, the construction proposal 202 may be created by proposal creator 160 using his or her computing device 100 as shown in FIG. 1

At step 2604, cost estimator platform 172 may be configured to display any entered values for one or more parameters 224 (e.g., as shown in FIG. 2) configured to fill in any field 814 (e.g., as shown in FIG. 8) having linked dimensions 216 for the one or more line items 210. At step 2606, cost estimator platform 172 may be configured to store any entered values for any quantities or amounts configured to fill in any fields 814 having unlinked dimensions 218 for the one or more line items 210 (e.g., as shown in FIG. 8 and FIG. 12). The entered values for such fields 814 may be obtained and/or provided to a proposal creator 160 by a client 162 or other interested party 168.

At step 2608, cost estimator platform 172 may be configured to display any entered values related to costs for labor 258, materials 260, and markup costs 262 for each line item 210 (e.g., as shown in FIG. 11 and FIG. 13). Such entered values for costs may also be provided by any party, including either the proposal creator 160 or other party 168, including subcontractors 278 and vendors 280.

At step 2610, the process may continue with the calculating of the individual cost 818, as shown in FIG. 8, for each line item 210 using the stored combined costs 1112 for labor, materials, and markup costs for each line item and the stored entered values of parameters 224 provided for the linked dimensions 216 (e.g. as shown in FIG. 8 and FIG. 11). Further, this step may include calculating the individual cost 818 for each line item using the stored combined costs 1112 for labor, materials, and mark up costs for each line item and the stored entered values of quantities 814 provided for the unlinked dimensions 218 (e.g., as shown in FIG. 8 and FIG. 13).

At step 2612, the process may continue with the calculating of the total costs 268 of the proposal 202 (e.g., as shown in FIG. 2 and FIG. 21), including adding in any taxes 284, adjustments 2120, or discounts 2112, and including adding up the individual costs 818 of each line item 210 (e.g., as shown in FIG. 8 and FIG. 21).

At step 2614, the process may include displaying the total costs 268 of the construction proposal 202, including displaying any profit 1614 to the proposal creator 202 (e.g., as shown in FIG. 2 and FIG. 21). At step 2616, the process may include providing the construction proposal 202 to the client 162 or another party 168 interested in viewing the proposal 202 on a computing device associated with either the client 162 or the other party 168 (e.g., as shown in FIG. 2).

At step 2618, responsive to the client 162 or the other party 168 making any changes to the one or more line items 210, cost estimator platform 172 may be configured to display the changes to the individual costs 818 of each line item 210 and the changes to the total costs 268 of the proposal in real time to the client 162 or the other party 168 (e.g. as shown in FIG. 14A and FIG. 14B), including adding in any costs for any optional upgrade line items 272 (e.g. as shown in FIG. 2 and FIGS. 22A-22B) if selected and approved by the client 162 or the other party 168. Many other steps and features may be implemented in addition to the above steps using cost estimator platform 172. Additional advantages and benefits are foreseeable to one of ordinary skill in the art and are within the scope of the invention.

Figure 27:
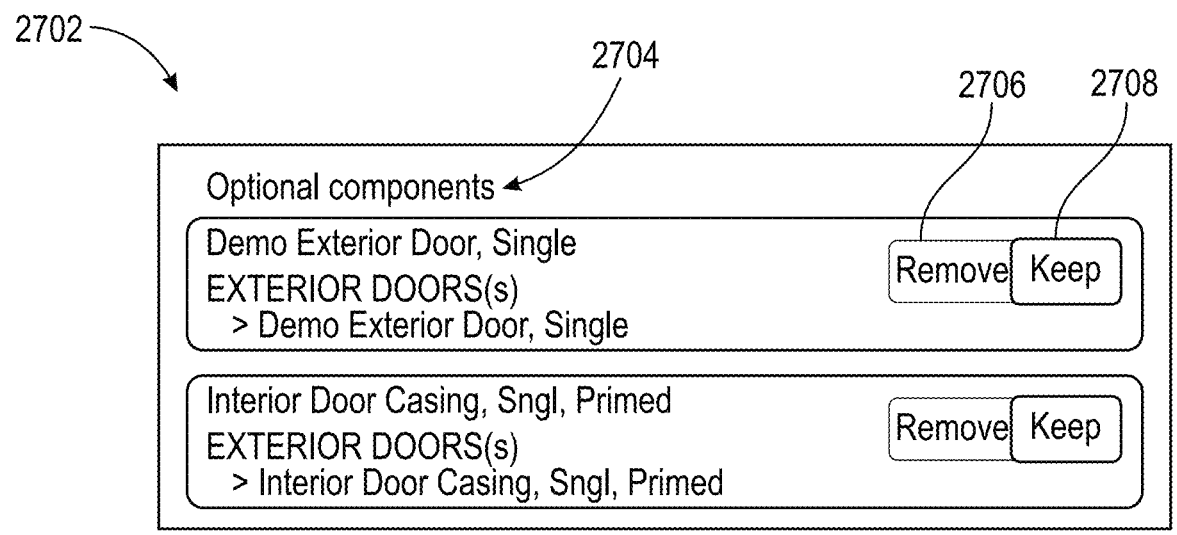
FIG. 27 is a pictorial illustration of an exemplary interface for an assembly that can be displayed after selection optional upgrade line items.

FIG. 27 shows a pictorial illustration for a table that may appear if a client 162 or other party (e.g., contractor or subcontractor) selects optional items 2704, such as, but not limited to, optional upgrade items 272. The display 2702 may include icons for selecting to remove 2706 or to keep 2708 one or more optional components 2704. Examples shown in FIG. 27 show a single "exterior door" and single "interior door" that the client 162 or other party can choose to remove 2706 or keep 2708 in the proposal 202. Accordingly, once a proposal 202 has been prepared and/or sent to client 162 or other third party, FIG. 27 illustrates how alterable and editable the proposal 202 is structured to be in cost estimator platform 172.

As noted above, cost estimator platform 172 offers a better system and method for alleviating concerns of clients 162. Current methods for estimating construction, renovation, and repair projects for clients 162 are known for being inaccurate and vague in their overall details. Too often, clients 162 are left wondering whether they are being taken advantage of or whether they are working with a reliable general contractor and/or subcontractor 278 who is fulfilling the client 162's expectations or not.

As noted above, cost estimator platform 172 provides a real-time interactive proposal 202 for clients 162 to easily use to view all the steps and phases of a construction, renovation, or repair project. Further clients 162 are provided with options to upgrade and modify or change any proposals 202. The proposals 202 can all be provided without requiring contact (i.e. no contact) or meeting between the general contractor (e.g., proposal creator 160) and the client 162. Normally, clients 162 have to go to a vendor 280 site to view materials and equipment for purchase and the various differences or options available. With cost estimator platform 172, all the features and attributes of a specific type of equipment or material can be described and shown in the proposal 202 to the client 162 using images and words (e.g., as shown in FIGS. 17-18 and 22A-22B) and even models in some cases. Further, the prices or costs 256, as shown in FIG. 2, provided in the proposal 202 reflect the most accurate, up to date prices for any labor 258, materials 260, and markup 262 included in the proposal 202. In one or more tested cases, the cost estimator platform 172 helped to reduce normal estimating time to estimate and quote a project by 78 percent. The cost estimator platform 172 allows the contractor (e.g., proposal creator 160) and client 162 to have a better experience during any type of construction. Cost estimator platform 172 provides the client 162 with greater control about the final appearance of the construction or renovation and also clearer understanding of costs 256.

Cost estimator platform 172 offers a unique ecommerce platform not available for construction and renovation. Cost estimator platform 172 may uniquely benefit a number of individuals and entities, including, but not limited to, any residential or commercial construction company looking for a better way to build and send proposals 202, any contractor struggling with streamlining estimates, re-estimates, and change orders, and any construction retailer (e.g., vendor 280) that wants a visual way to include all their items and feature them through text and graphics within the proposal (202) (including upgrades 272).

Additionally, the cost estimator platform 172 uniquely allows contractors to pay their subcontractors 278 and/or vendors 280 with a click of a button once work has been completed and approved by the contractor (e.g., as shown in FIG. 23) and not worry about matching purchase orders with invoices, which is typically how many contractors manage and track payments owed to other parties.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or table of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A system comprising:
a processor; and
system memory coupled to the processor and storing instructions configured to cause the processor to locally implement part of a distributed cost estimator platform in the system memory, including:
present one or more initial construction proposal template interfaces at a display device;
receive one or more construction item selections through the presented initial construction proposal template interfaces;
receive one or more construction assembly selections through the presented initial construction proposal template interfaces,
wherein the one or more construction assembly selections assemblies are labels that identify a specific part or area of a house or building or other location for a construction, renovation, or repair project, wherein each of the one or more assemblies represent and act as a header for different subgroups of one or more line items,
wherein the one or more line items are assigned to or included under each relevant assembly of the one or more assemblies,
wherein the one or more line items are labels that further identify services or materials or equipment or other features to be provided by a contractor or subcontractor or vendor to a party;

receive pricing for each line item of the one or more line items through the presented initial construction proposal template interfaces, wherein the pricing reflects costs associated with materials or labor or a combination of materials and labor and mark up for each line item;

present a set of parameters interface at the display device, wherein the set of parameters interface includes parameter fields for each one of a following parameter: floor area, ceiling area, interior wall perimeter, ceiling height, interior wall area, exterior wall perimeter, exterior height to roof, an exterior wall area, building footprint, a roof perimeter length, roof surface area, lot perimeter, lot area, and roof pitch;

receive a first set of entered parameter dimensions in designated fields through the set of parameters interface, wherein the one or more parameters represent specific measurements and dimensions necessary to a cost calculation for each line items of the one or more line items;

link the designated fields for the one or more parameters for each line item of the one or more line items that utilizes the one or more parameters in a cost calculation, further comprising linking one or more relevant entered dimensions from the first set of entered dimensions in the cost calculation for each line item of the one or more line items and for each linked parent assembly and linked child assembly;

electronically communicate the linked designated fields via computer network from the system memory to data storage;

receive a change to the first set of entered dimensions in the linked designated fields;

electronically and automatically access the linked designated fields from the data storage via the computer network in response to the received change;

automatically, and essentially in real-time, update the pricing and costs for each line item in the one or more assemblies including automatically updating each line item for each linked parent assembly and each linked child assembly further comprising;

update any change made to the first set of entered dimensions in the linked designated fields to the pricing and costs for each parent assembly and each sub-assembly in a hierarchical arrangement, wherein the any change cascades in a hierarchical manner up and down each sub-assembly and then each parent assembly in order to reflect appropriate changes to the pricing and costs of each sub-assembly and each parent assembly;

receive a second set of entered parameter dimensions in designated fields through the set of parameters interface for one or more parameters having unlinked dimensions for the one or more line items, wherein the one or more parameters having unlinked dimensions are not linked or coupled together;

calculate the individual cost for each line item;

calculate total costs for the construction proposal, including any taxes, adjustments, or discounts;

send electronic communication via the computer network presenting optional upgrade line items to the party as selectable options within the construction proposal, in response to subsequent electronic communication received from the party selecting one of the optional upgrade line items, reflect inclusion of the optional upgrade line item and any changes to the calculated total costs of the construction proposal in real-time in the construction proposal to the party and electronically communicating the optional upgrade line items and changes to calculated total costs via the computer network from system memory to the data storage; and present a payment flow tracking interface tracking payment flow from the party to a general contractor, and tracking payment flow from the general contractor to a sub-contractor or to a vendor, further comprising automatically:

electronically access the one or more construction item selections, the one or more construction assembly selections, the linked designated fields, the one or more parameters with unlinked fields, and an optional upgrade from the data storage via the computer network;

derive a layout of the payment flow tracking interface based on the number of and content contained in: the one or more construction item selections, the one or more construction assembly selections, the linked designated fields, the one or more parameters with unlinked fields, and an optional upgrade; and present the payment flow tracking interface in accordance with the derived layout at the display device, including:

associate a financial account of the party with the cost estimator platform for transferring funds from the party to the general contractor; and track completion of the one or more line items as included in the construction proposal that the vendor or the sub-contractor are responsible for completing;

receive indication through the payment flow tracking interface and present at the payment flow tracking interface that the vendor or the sub-contractor has completed the one or more line items; and upon approval of the payment by the general contractor by selecting a selection tool at the payment flow tracking interface, automatically transfer funds from the financial account to a separate vendor account or sub-contractor account directly.

2. The system of claim 1, wherein the one or more processors are further configured to provide the construction proposal to the client or the other party by sending the construction proposal to a computing device of the client or a computing device of the other party.

3. The system of claim 1, wherein the first set of entered dimensions for the one or more parameters for the linked designated fields comprise measurements related to area, length, volume, height, count, depth, or any other type of measurement.

4. The system of claim 1, wherein the one or more processors are further configured to provide an interface that displays combined costs for labor, materials, and markup for each line item.

5. The system of claim 1, wherein the one or more processors are further configured to, responsive to the client or the other party making any changes to the one or more line items, automatically update the construction proposal and showing changes to the calculated individual costs for each line item and the calculated total costs for the construction proposal.

6. The system of claim 1, further comprising, including images and text relating to features and attributes of the optional upgrade line items.

7. The system of claim 1, wherein the one or more processors are further configured to link selections together for the one or more line items that include hidden costs that need to be factored into the construction proposal.

8. The system of claim 1, further comprising automatically converting a value for the first set of entered dimensions or the second set of entered dimensions entered in one type of measurement system to another type of measurement system in order to perform the calculation for the individual cost for the each line item, wherein the one type of measurement system comprises a metric system or an imperial system.

9. The system of claim 1, wherein the one or more processors are further configured to calculate a number or amount by selecting a specific symbol of a set of symbols associated with the one or more parameters on the calculating interface and entering additional numbers or values and using calculating functions included on the calculating interface, wherein the calculating functions comprise addition, subtraction, division, multiplication, and square root calculations.

* * * * *